(12) United States Patent
Hoglund et al.

(10) Patent No.: US 9,310,091 B2
(45) Date of Patent: Apr. 12, 2016

(54) HVAC CONTROLLER WITH CHECKOUT UTILITY

(75) Inventors: Steven R. Hoglund, Minneapolis, MN (US); Paul G. Schwendinger, St. Louis Park, MN (US)

(73) Assignee: Honeywell International Inc., Morris Plains, NJ (US)

( * ) Notice: Subject to any disclaimer, the term of this patent is extended or adjusted under 35 U.S.C. 154(b) by 1525 days.

(21) Appl. No.: 12/964,542

(22) Filed: Dec. 9, 2010

(65) Prior Publication Data

US 2011/0077780 A1   Mar. 31, 2011

Related U.S. Application Data

(63) Continuation of application No. 11/697,771, filed on Apr. 9, 2007, now Pat. No. 7,904,830, which is a continuation-in-part of application No. 11/564,879, filed on Nov. 30, 2006, now Pat. No. 7,693,591.

(51) Int. Cl.
*F24F 11/00* (2006.01)
*G06F 3/048* (2013.01)
*G06F 3/0482* (2013.01)

(52) U.S. Cl.
CPC .......... *F24F 11/0012* (2013.01); *G06F 3/0482* (2013.01); *F24F 2011/0064* (2013.01); *F24F 2011/0091* (2013.01)

(58) Field of Classification Search
CPC ..................... F24F 11/0012; F24F 2011/0064; F24F 2011/0091; F24F 2011/0068; F24F 2011/0067; F24F 2011/0072; G05B 2219/2614; G05B 2219/2642; G05B 19/042; G05B 19/0428; G05B 15/00; G05B 19/409; G05B 23/0272; G05B 2219/23067; G05B 2219/25068; G05B 2219/2638; G05B 2219/32128; G05B 2219/25092
USPC .................. 715/702, 717, 771, 740, 817, 864
See application file for complete search history.

(56) References Cited

U.S. PATENT DOCUMENTS

| | | | |
|---|---|---|---|
| 3,664,414 | A | 5/1972 | Raleigh |
| 3,892,104 | A | 7/1975 | Klee et al. |
| 4,071,745 | A | 1/1978 | Hall |

(Continued)

FOREIGN PATENT DOCUMENTS

SI   20556   10/2001

OTHER PUBLICATIONS

Aprilaire, "Intelligent Zoned Comfort Control System," Owners Manual Model 6504, pp. 1-12, prior to Nov. 30, 2006.

(Continued)

*Primary Examiner* — Amy M Levy
(74) *Attorney, Agent, or Firm* — Seager, Tufte & Wickhem, LLP

(57) ABSTRACT

A zone control panel that is easy and intuitive to use and to program. In some embodiments, a zone control panel may be configured to have an easy to use, single level menu structure with, for example, a configuration mode and/or a checkout mode. The configuration mode may, if present, include a number of menu screens sometimes without any sub-menu levels. Likewise, the checkout mode may, if present, include a number of menu screens sometimes without any sub-menu levels. A mode selector may be provided to select a particular mode, after which, the menu screens that correspond to the selected mode may be sequentially displayed to the user. Other features and aspects are also disclosed.

12 Claims, 66 Drawing Sheets

(56) References Cited

U.S. PATENT DOCUMENTS

| | | | |
|---|---|---|---|
| 4,205,381 | A | 5/1980 | Games et al. |
| 4,335,320 | A | 6/1982 | Garver |
| 4,338,791 | A | 7/1982 | Stamp, Jr. et al. |
| 4,495,986 | A | 1/1985 | Clark et al. |
| 4,501,125 | A | 2/1985 | Han |
| 4,530,395 | A | 7/1985 | Parker et al. |
| 4,795,088 | A | 1/1989 | Kobayashi et al. |
| 4,830,095 | A | 5/1989 | Friend |
| 4,843,084 | A | 6/1989 | Parker et al. |
| 4,932,466 | A | 6/1990 | Foster |
| 5,024,265 | A | 6/1991 | Buchholz et al. |
| D319,429 | S | 8/1991 | D'Aleo et al. |
| 5,042,265 | A | 8/1991 | Baldwin et al. |
| 5,092,394 | A | 3/1992 | Foster |
| 5,129,234 | A | 7/1992 | Alford |
| D329,226 | S | 9/1992 | Holbrook |
| 5,161,608 | A | 11/1992 | Osheroff |
| 5,170,935 | A * | 12/1992 | Federspiel et al. ......... 236/44 C |
| 5,245,835 | A | 9/1993 | Cohen et al. |
| 5,303,767 | A | 4/1994 | Riley |
| 5,318,104 | A | 6/1994 | Shah et al. |
| 5,344,069 | A | 9/1994 | Narikiyo |
| 5,348,078 | A | 9/1994 | Dushane et al. |
| 5,449,319 | A | 9/1995 | Dushane et al. |
| 5,481,481 | A * | 1/1996 | Frey et al. ............ 700/276 |
| 5,495,887 | A | 3/1996 | Kathnelson et al. |
| 5,671,351 | A * | 9/1997 | Wild et al. ............ 714/38.13 |
| 5,751,572 | A | 5/1998 | Maciulewicz |
| 5,816,059 | A * | 10/1998 | Ficchi et al. ............ 62/127 |
| 5,818,194 | A | 10/1998 | Nordby |
| 5,829,674 | A | 11/1998 | Vanostrand et al. |
| 5,860,473 | A | 1/1999 | Seiden |
| 5,944,098 | A | 8/1999 | Jackson |
| 5,983,890 | A | 11/1999 | Thomas et al. |
| 6,179,214 | B1 * | 1/2001 | Key et al. ............ 236/51 |
| 6,196,467 | B1 | 3/2001 | Dushane et al. |
| D449,279 | S | 10/2001 | Takach, Jr. et al. |
| D454,544 | S | 3/2002 | Takach, Jr. et al. |
| 6,402,043 | B1 | 6/2002 | Cockerill |
| 6,540,148 | B1 | 4/2003 | Salsbury et al. |
| 6,574,581 | B1 | 6/2003 | Bohrer et al. |
| 6,705,533 | B2 | 3/2004 | Casey et al. |
| 6,711,471 | B2 | 3/2004 | Kidder |
| 6,725,914 | B2 | 4/2004 | Petterson |
| 6,826,454 | B2 * | 11/2004 | Sulfstede ............ 700/276 |
| 6,851,621 | B1 | 2/2005 | Wacker et al. |
| 6,856,841 | B2 | 2/2005 | Peterson |
| 6,874,693 | B2 | 4/2005 | Readio et al. |
| 6,879,881 | B1 | 4/2005 | Attridge, Jr. |
| 6,964,174 | B2 | 11/2005 | Shah |
| 6,967,565 | B2 | 11/2005 | Lingemann |
| 6,986,708 | B2 | 1/2006 | Demster |
| 6,997,390 | B2 | 2/2006 | Alles |
| 7,000,849 | A | 2/2006 | Ashworth et al. |
| 7,017,827 | B2 | 3/2006 | Shah et al. |
| 7,047,092 | B2 | 5/2006 | Wimsatt |
| 7,055,759 | B2 | 6/2006 | Wacker et al. |
| 7,106,019 | B2 | 9/2006 | Becerra et al. |
| 7,114,554 | B2 | 10/2006 | Bergman et al. |
| 7,130,719 | B2 | 10/2006 | Ehlers et al. |
| 7,130,720 | B2 | 10/2006 | Fisher |
| 7,146,253 | B2 * | 12/2006 | Hoog et al. ............ 700/276 |
| 7,150,408 | B2 | 12/2006 | DeLuca |
| 7,156,316 | B2 | 1/2007 | Kates |
| 7,188,002 | B2 | 3/2007 | Chapman, Jr. et al. |
| 7,228,693 | B2 | 6/2007 | Helt |
| 7,320,362 | B2 | 1/2008 | Nichols |
| 7,360,370 | B2 | 4/2008 | Shah et al. |
| D590,352 | S | 4/2009 | Jacoby et al. |
| 7,558,648 | B2 | 7/2009 | Hoglund et al. |
| 7,693,583 | B2 | 4/2010 | Wolff et al. |
| 7,693,591 | B2 | 4/2010 | Hoglund et al. |
| 2003/0103075 | A1 | 6/2003 | Rosselot |
| 2004/0194484 | A1 | 10/2004 | Zou et al. |
| 2004/0262410 | A1 | 12/2004 | Hull |
| 2005/0040248 | A1 | 2/2005 | Wacker et al. |
| 2005/0040250 | A1 * | 2/2005 | Wruck ............ 236/51 |
| 2005/0043907 | A1 | 2/2005 | Eckel et al. |
| 2005/0154496 | A1 * | 7/2005 | Chapman et al. ............ 700/278 |
| 2005/0156049 | A1 | 7/2005 | Van Ostrand et al. |
| 2005/0159847 | A1 | 7/2005 | Shah et al. |
| 2005/0159924 | A1 | 7/2005 | Shah et al. |
| 2005/0228607 | A1 * | 10/2005 | Simons ............ 702/122 |
| 2006/0004492 | A1 | 1/2006 | Terlson et al. |
| 2006/0185373 | A1 * | 8/2006 | Butler et al. ............ 62/181 |
| 2007/0045429 | A1 | 3/2007 | Chapman, Jr. et al. |
| 2007/0050732 | A1 | 3/2007 | Chapman, Jr. et al. |
| 2007/0057075 | A1 | 3/2007 | Votaw et al. |
| 2007/0225868 | A1 | 9/2007 | Terlson et al. |
| 2007/0228183 | A1 * | 10/2007 | Kennedy et al. ............ 236/1 C |
| 2008/0128523 | A1 | 6/2008 | Hoglund et al. |
| 2008/0134087 | A1 | 6/2008 | Hoglund et al. |
| 2008/0134098 | A1 | 6/2008 | Hoglund et al. |

OTHER PUBLICATIONS

Robertshaw, "SlimZone Premier Zone Control System," Installation and Operation Manual, pp. 1-32, prior to Nov. 30, 2006.
http://www.appliancemagazine.com/printphp?article=1463&zone=211&first=1, Appliance Magazine.com, "High-Efficiency HVAC Motor," 1 page, Jul. 2006.
http://www.ewccontrols.com/ultrazone/new_stuff.htm, "Newest Product, UZC4," 3 pages, Oct. 20, 2005.
http://www.geindustrial.com/cwc/products?pnlid=4&id=ecmph, GE Consumer and Industrial Electrical Distribution, ECM Product Information, 1 page, printed Feb. 28, 2007.
http://www.geindustrial.com/cwc/products?id=ecm&famid=23, GE Consumer and Industrial Electrical Distribution, GE ECM 2.3 Series Product Information, 2 pages, printed Feb. 28, 2007.
http://www.hvac-talk.com/vbb/printthread.php?t=99837&pp=40, "HVAC-Talk: Heating, Air & Refrigeration Disscussion," 5 pages, on or before Nov. 30, 2006.
http://www.hvac-talk.com/vbb/showthread.php?t=121627&hightlight=zone+timer, "Multi Stage Control—Zone Board or Tstat," 2 pages, Nov. 17, 2006.
http://www.hvac-talk.com/vbb/showthread.php?t=75867&highlight=DEHUM+zone+control, "Update on 4-Zone Arzel + Tappan Installation," 5 pages, May 2005.
http://www.jacksonsystems.com/index.php?module=z600, Jackson Systems, LLC, "Coming in March, Residential and Light Commercial Zone Control (Z-600) Two Position," 2 pages, at least as early as Feb. 8, 2007.
http://www.lennoxcommercial.com/support/faq.asp?a=a&category2&question=76, Lennox, "What is a Variable Speed Furnace?" 2 pages, 2007.
http://www.weinstall.ca/two_stage_heating.htm, "Clarkson Comfort Zone Two Stage Heating Variable Speed Furnace Systems," 2 pages, printed Jan. 26, 2007.
http://www.westinghousehvac.com/wh92_2stgvarspd.asp, Westinghouse Cooling and Heating, "92.1%* AFUE Two-Stage Variable Speed Gas Furnace," 2 pages, printed Jan. 26, 2007.
ABB, "To Measure is to Know, DIN Rail Mounted Electricity Meters," 12 pages, Jan. 2006.
ABB "Enclosures and Cable Systems Overview," 10 pages, Nov. 2002.
ABB Installation Material, 2 pages, prior to Nov. 30, 2006.
Arzel Zoning Technology Inc., Product Catalog, 8 pages, 2006.
Bryant Heating & Cooling Systems, Model 340MAV, 350MAV, 355MAV, Condensing Gas Furnace, User's Information Manual, 2 pages, prior to Nov. 30, 2006.
Bryant, Thermidistat Control, TSTAT Installation and Start-Up Instructions, pp. 1-12, Aug. 1999.
Carrier, 3V Control System, VVT Zone Controller, Pressure Dependent Controller, Installation, Start-Up and Configuration Instructions, pp. 1-60, Oct. 2004.
Carrier, 58MVB 4-Way Multipoise Variable-Capacity Condensing Gas Furnace, Installation, Start-Up and Operating Instructions, 2 pages, Aug. 2005.

(56) References Cited

OTHER PUBLICATIONS

Drew, "Proper Staging Techniques for Multi-Stage Thermostats," XCI Corporation, 4 pages, Dec. 2002.
Durozone ED3 Zoning Panel, 2 pages, 2004.
EWC Control Inc., Model NCM 300 Zone Control System Technical Bulletin, pp. 1-12, 2000.
EWC Control Inc., Model UZC4 Zone Control Technical Bulletin, pp. 1-24, Dec. 12, 2005.
GE Industrial Systems, "Troubleshooting GE ECM Driven Systems," 2 pages, prior to Nov. 30, 2006.
GE ECM, "The X13 Blower Demo," pp. 1-13, 2006.
Honeywell, EMM-3 Electronic MiniZone Panel Product Data, pp. 1-12, Oct. 2002.
Honeywell, EMM-3U Universal Electronic Minizone Panel, Product Data, pp. 1-16, Nov. 2002.
Honeywell, TZ-4 TotalZone Zone Control Panel, Product Data, pp. 1-20, Dec. 2002.
Jackson Systems, "Z-600 Zone Control Comfort System," 4 pages, at least as early as Dec. 29, 2006.
Lennox Industries Inc., G61 MPV Series Unit, Installation Instructions, 2 pages, Sep. 2006.
Lennox Industries Inc., Harmony III Zone Control System, Homeowner's Manual, 6 pages, Jan. 2005.
Lennox Industries Inc., Harmony III Zone Control System, Installation Instructions, 30 pages, Jan. 2006.
Lennox, "Harmony III Zoning System, Dave Lennox Signature Collection," 4 pages, May 2005.
RobertShaw, "Slimzone Premier Zone Control Panel," 2 pages, 2004.
Siemens, "3144 Building Technologies, HVAC Products, Universal Controllers RMU710, RMU720, and RMU730," pp. 1-15, Feb. 13, 2006.
Schneider Electric, "Square DQO Load Centers and Circuit Breakers, Unsurpassed Circuit Protection and Application Flexibility," 8 pages, 2004.
Taco Hydronic Components and Systems, Electronic Controls Catalog #100-5.0, 4 pages, Sep. 1, 2003.
Trane, "Tracker Version 12 Building Automation System," pp. 1-32, May 2003.
Variable Speed Motor Control Installation Instructions, pp. 1-29, Jul. 2006.
White Rodgers, "CZ-4 Master Control Panel," 6 pages, at least as early as Dec. 29, 2006.
XCI Controls, SmartZone System Manual, 20 pages, Oct. 3, 2005.
Zonefirst, "Masterzone Heat Pump Zoning System, Model MMH3," 2 pages, prior to Nov. 30, 2006.
Zonefirst, Mini-Masterzone Zoning System—3 Zones, Installation and Operating Instructions, 4 pages, 2003.
Zonex, "DIGI3U 3-Zone Universal Controller for G/E or Heat Pump Applications," 2 pages, at least as early as Dec. 2, 2006.

\* cited by examiner

HVAC CONTROLLER WITH CHECKOUT UTILITY

This application is a continuation of co-pending U.S. patent application Ser. No. 11/697,771, filed Apr. 9, 2007, and entitled "HVAC ZONE CONTROL PANEL MENU STRUCTURE", which is a continuation-in-part of U.S. patent application Ser. No. 11/564,879, filed Nov. 30, 2006, and entitled "HVAC ZONE CONTROL PANEL WITH CHECKOUT UTILITY", both of which are incorporated herein by reference.

TECHNICAL FIELD

The present invention relates generally to HVAC equipment and more particularly to zone control panels for controlling HVAC equipment.

BACKGROUND

A variety of residential and commercial buildings have HVAC equipment that may, for example, provide conditioning such as heating, cooling, ventilation, filtration, humidification, and/or dehumidification to improve the environment within the residential and/or commercial building.

In some instances, a building may be divided into two or more zones that may be relatively independently conditioned in order to provide more precise control of the environment throughout the building. A thermostat or other controller may be located within each zone, and each thermostat or other controller may be electrically connected to a zone control panel that is configured to receive signals (e.g. requests) from the thermostats and provide appropriate commands to HVAC equipment in response to the requests.

In some cases, a zone control panel may be programmed or customized for a particular application. A need remains for zone control panels that are easy and intuitive to use.

SUMMARY

The present invention pertains to zone control panels that are relatively easy and intuitive to configure and use. In some instances, a zone control panel may be configured to have an easy to use menu structure having, for example, a configuration mode and/or a checkout mode. In some embodiments, the configuration mode may, if present, include a number of single level menu screens without any sub-menu levels, but this is not required in all embodiments. Similarly, the checkout mode may, if present, include a number of single level menu screens without any sub-menu levels, but again, this is not required in all embodiments.

When a particular mode includes a single level menu structure, the mode may be traversed by moving either forwards or backwards through the single-level menu screens, thereby reducing the perceived complexity of the menu structure. In some embodiments, two or more buttons may be provided that have unique and constant functions for manipulating the single level menus and/or for setting one or more parameters specified in the menus of the zone controller. For example, there may be a forward button for traversing forward through the single level menu screens, a back button for traversing backwards through the single level menu screens, and one or more parameter select buttons for selecting and/or changing the value of selected parameters via the menu screens. In some embodiments, these buttons may be dedicated to performing these tasks, and may be marked with indicia that indicate to the user the dedicated task. While this is not required in all embodiments, when so provided, this may increase the intuitive nature of the zone control panel user interface.

In some embodiments, a mode selector may be provided, which may allow a user to select a particular mode of the zone control panel, such as a configuration mode and/or a checkout mode. In some cases, the mode selector may be a separate dedicated button on the zone control panel, but this is not required in all embodiments. It is also contemplated that a mode indicator may be provided to provide a visual indication of the selected mode, but again this is not required in all embodiments. When in a selected mode, the zone control panel may display only the menu screens that are associated with the selected mode.

In some instances, the zone control panel may be configured to determine if changes were made to one or more parameters of the zone control panel via the menu screens. If changes were made, the zone control panel may query the user as to whether the changes should be saved or not. For example, and in one illustrative embodiment, a mode selector is used to select a particular mode. Once in the selected mode, the user may move about the menu screens for that particular mode, and review and/or change one or more parameter values, as desired. The zone control panel may track if any changes were made to any of the zone control parameters. If changes were made, the zone control panel may query the user as to whether the changes should be saved. If the user answers in the affirmative, the changes are saved. If the user answers in the negative, the changes are discarded. This query may be provided prior to exiting the selected mode, but this is not required. If no changes were made by the user, the zone control panel may simply exit the selected mode without querying the user.

In some embodiments, one or more of the menu screens may enable a user to select a number of zones that the zone control panel should control. For example, a zone control panel may be capable of controlling four zones, but a particular building may only have three zones. In such a case, the user may use one or more menu screens to select the number of zones that are actually present in the building. The zone control panel may then control the zones based, at least in part, on the number of selected zones, rather than on the four zone capability of the illustrative zone controller. In some cases, the zone control panel may have a controller that uses a control algorithm that accepts as an input the number of zones to actually control. The control algorithm may control the zones differently depending on the number of selected zones.

In some instances, a zone control panel may be provided that allows a user to specify a thermostat type for each or selected zones. By knowing the thermostat type, the zone control panel may interpret the signals received from each connected thermostat based on the indicated thermostat type. This may simplify, for example, the setup and/or configuration of the zone control panel.

The above summary of the present invention is not intended to describe each disclosed embodiment or every implementation of the present invention. The Figures and Detailed Description that follow more particularly exemplify these embodiments.

BRIEF DESCRIPTION OF THE FIGURES

The above summary of the present invention is not intended to describe each disclosed embodiment or every implementation of the present invention. The Figures, Detailed Description and Examples which follow more particularly exemplify these embodiments.

Figure 1:
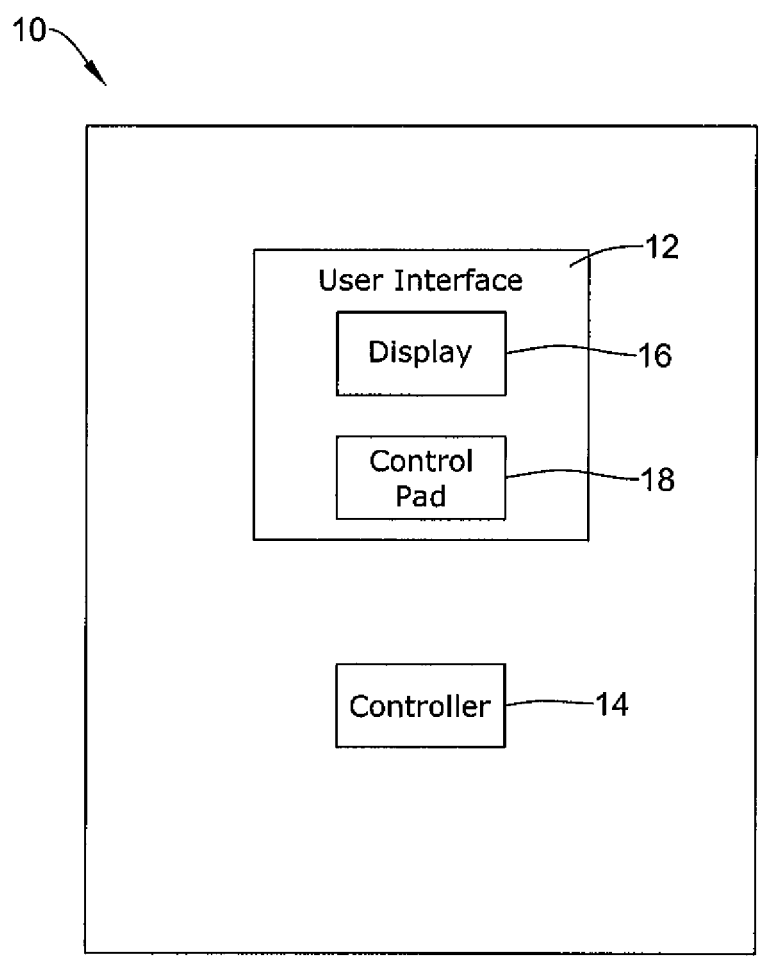
FIG. 1 is a block diagram of an illustrative but non-limiting zone control panel in accordance with the present invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

The following description should be read with reference to the drawings, in which like elements in different drawings are numbered in like fashion. The drawings, which are not necessarily to scale, depict selected embodiments and are not intended to limit the scope of the invention. Although examples of construction, dimensions, and materials are illustrated for the various elements, those skilled in the art will recognize that many of the examples provided have suitable alternatives that may be utilized.

The present invention pertains generally to multi-zone HVAC systems, in which two or more thermostats are connected to a zone control panel. The two or more thermostats, which may each be located within a distinct zone of a conditioned space, may provide the zone control panel with calls for heat, cooling, filtration, ventilation, fan, and/or the like. The zone control panel may, in turn, provide appropriate instructions or signals to the appropriate HVAC equipment such as heating equipment, air conditioning equipment, ventilation equipment, humidification and/or dehumidification equipment, and/or the like. If the thermostats placed within different zones make different calls for heating, cooling and the like, the zone control panel may provide appropriate instructions or signals to open or close particular zone dampers, typically within the duct work of the HVAC system.

FIG. 1 is a block diagram of an illustrative but non-limiting zone control panel 10. In some cases, zone control panel 10 may include a user interface 12 that may be used to configure, program and/or operate zone control panel 10 or at least certain features thereof. Zone control panel 10 may include a controller 14. Controller 14 may include, for example, a memory and a microprocessor. The memory may be used to store menus, operating instructions and other programming, parameter values and the like, for controlling the zone control panel 10 and the user interface 12. User interface 12 may also include a display 16 and a control pad 18, if desired. While the control pad 18 is shown separate from display 16 in FIG. 1, it is contemplated that the control pad 18 or parts thereof may be implemented as part of the display 16, such as when the display 16 is a touch screen type display, if desired. It is contemplated that display 16 may be any suitable display including, for example, a liquid crystal display, an alphanumeric display, a fixed segment display, a dot matrix display, a touch screen display, or any other suitable display, as desired. More generally, display 16 may be any type of display that conveys appropriate information to a user.

Controller 14 may be adapted to, for example, display menus, operating parameters and the like on display 16 and to accept inputs from control pad 18. One illustrative display 16 and control pad 18 may be better viewed with respect to FIG. 2, which is a front view of an illustrative embodiment of zone control panel 10. In the illustrative embodiment shown in FIG. 2, control pad 18 may include a back button 20 and a next button 22 that may be used to, for example, select among menu items or perhaps to select between sub-menus within a larger menu, if desired. The illustrative control pad 18 may also include a first arrow button 24 and a second arrow button 26. In some cases, first arrow button 24 and/or second arrow button 26 may be used to, for example, select and/or change a parameter or a parameter value.

Figure 2:
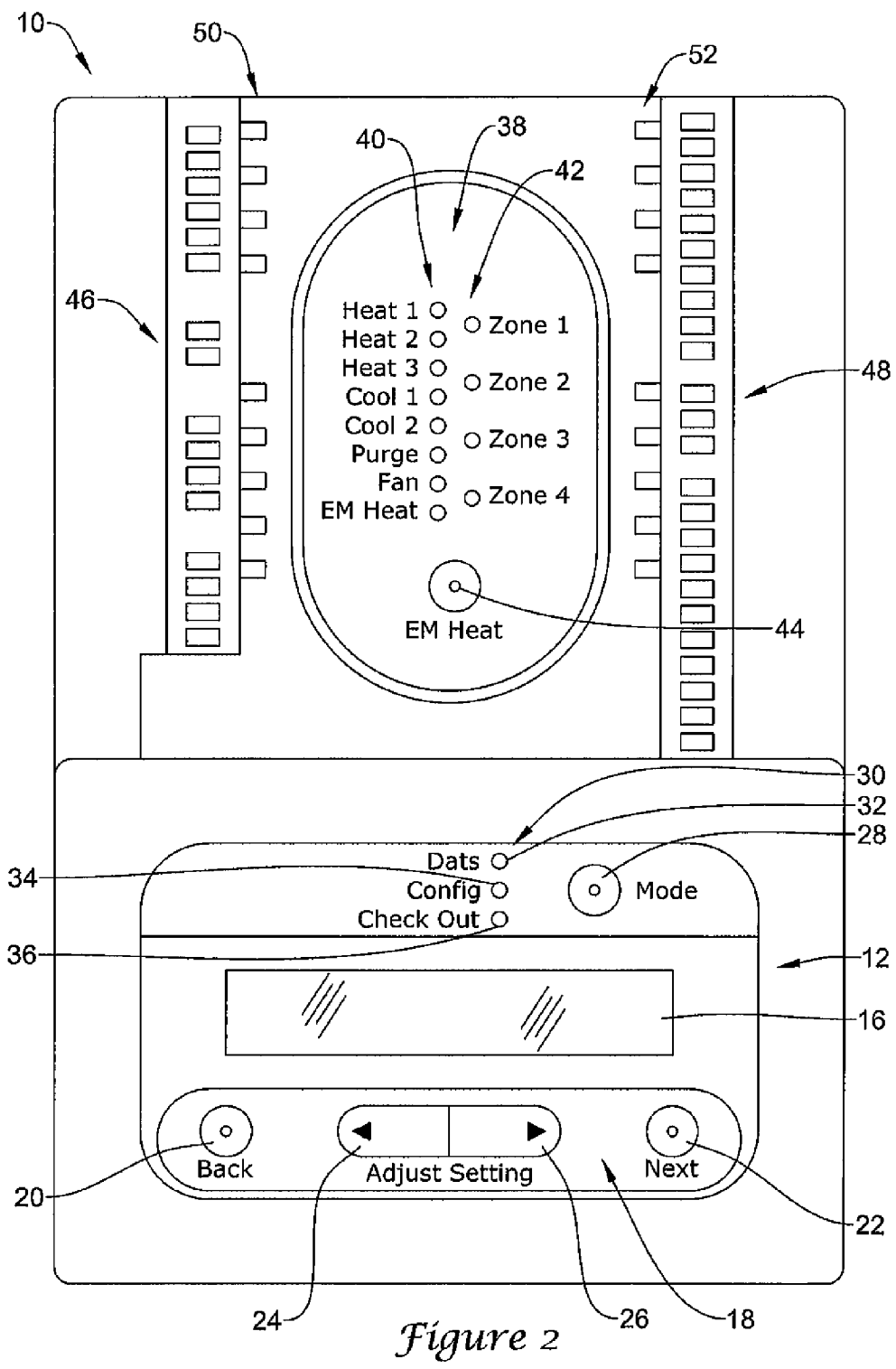
FIG. 2 is a front view of the illustrative but non-limiting zone control panel of FIG. 1.

As illustrated in FIG. 2, control pad 18 may include distinct mechanical buttons such as back button 20, next button 22, first arrow button 24 and second arrow button 26. However, and as indicated above, it is contemplated that at least part of control pad 18 could instead be implemented using a touch screen or may be implemented as soft keys, if desired. If control pad 18 is implemented as part of a touch screen, display 16 may also be formed as part of the same touch screen.

In some illustrative embodiments, user interface 12 may include a mode button 28. A button may include an electromechanical button or any other type of button as desired. It will be appreciated that in some cases, zone control panel 10 may be switched between two or more different modes such as a setup or configuration mode, an operational mode and a checkout mode, for example. Mode button 28 may be configured to permit a user to toggle or cycle between these and potentially other operational modes, if desired.

In some embodiments, the mode button 28, back button 20, next button 22, first arrow button 24 and/or second arrow button 26 may have unique and constant functions for manipulating the single level menus and/or for setting one or more parameters specified in the menus of the zone control panel 10. That is, and in some embodiments, these buttons may be dedicated to performing these tasks, and in some cases, may be marked with distinct markings or indicia that indicate to the user the dedicated task. While this is not required in all embodiments, when so provided, this may increase the intuitive nature of the zone control panel user interface.

In some cases, user interface 12 may also include a mode indicator light set 30 that may provide visual confirmation of the particular mode selected. As illustrated, mode light set 30 includes an operational mode light 32, a configuration mode light 34 and a checkout mode light 36. As mode button 28 is pressed to move between these modes, the appropriate mode light may be illuminated. Any suitable light source may be used, although in some cases, operational mode light 32, configuration mode light 34 and checkout mode light 36 may each include one or more LEDs.

Zone control panel 10 may include a secondary control panel 38. Secondary control panel 38 may, as illustrated, include a bank of HVAC status lights 40. The HVAC status lights 40 may be used to, for example, indicate whether the heating equipment is running, and if so, if the first stage, second stage or third stage heating equipment is running. Similarly, HVAC status lights 40 may be used to indicate the operational status of the cooling equipment, fan, ventilation equipment, and/or the like. In some cases, HVAC status lights 40 may also be used to verify that zone control panel 10 is able to communicate with and/or is properly connected to the appropriate HVAC equipment.

In some illustrative embodiments, secondary control panel 38 may also, if desired, include a bank of zone lights 42. In some cases, zone lights 42 may be used to indicate which zone dampers are open or closed, whether or not zone control panel 10 is able to communicate with each of the zone dampers within each zone, and/or which zones are currently serving heating, cooling or ventilation demands, for example. In some cases, both HVAC status lights 40 and zone lights 42 may be LEDs, although this is not required. Secondary control panel 38 may also include an emergency heat button 44 that can be used to, for example, put the HVAC equipment into an emergency heating mode.

The illustrative zone control panel 10 may also include a first bank 46 of connection points and a second bank 48 of connection points. In some cases, one or both of first bank 46 and/or second bank 48 of connection points, or portions thereof, may be used for electrically connecting each of the remotely located thermostats to zone control panel 10. In some cases, one or both of first bank 46 and/or second bank 48 of connection points, or portions thereof, may be used for electrically connecting zone HVAC equipment and zone dampers to zone control panel 10.

In some instances, zone control panel 10 may include a first bank 50 of apertures disposed along first bank 46 of connection points and a second bank 52 of apertures disposed along second bank 48 of connection points. In some instances, first bank 50 of apertures and/or second bank 52 of apertures may be adapted to provide ventilation. In some cases, first bank 50 of apertures and/or second bank 52 of apertures may be absent.

In some instances, it is contemplated that first bank 50 of apertures and/or second bank 52 of apertures may be adapted to accommodate one or more indicator lights. Such indicator lights, if present, may be used to help confirm electrical connections between zone control panel 10 and one or more pieces of HVAC equipment, one or more zone dampers, and/or the like.

In FIG. 2, zone control panel 10 is shown without any covers, in order to illustrate particular features of zone control panel 10. It will be recognized, however, that zone control panel 10 may include one or more covers that may fit over part or all of zone control panel 10 in order to protect zone control panel 10 from dust, to prevent inadvertent access to controls underneath the cover(s), or even to provide a more aesthetically pleasing appearance. If included, one or more covers may snap fit onto zone control panel 10. In some cases, for example, a cover may be configured to hide essentially all of zone control panel 10, except for secondary control panel 38.

Figure 3:
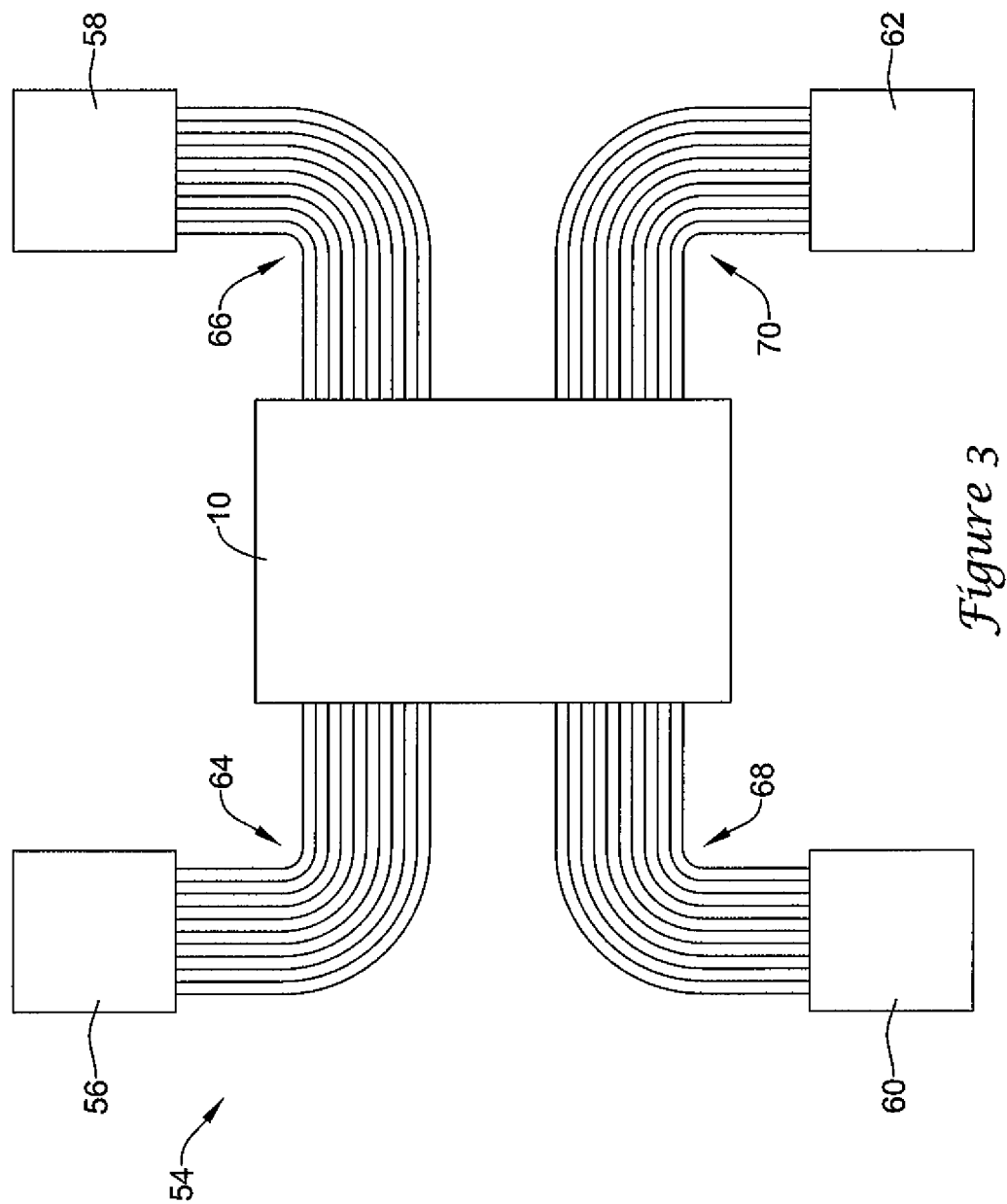
FIG. 3 is a diagrammatic schematic view of an illustrative but non-limiting HVAC control system in accordance with the present invention.

FIG. 3 is a diagrammatic schematic view of an illustrative but non-limiting HVAC control system in accordance with the present invention. The illustrative HVAC control system 54 includes a first thermostat 56, a second thermostat 58, a third thermostat 60 and a fourth thermostat 62 all connected to zone control panel 10. As illustrated, first thermostat 56 is connected through a total of eleven wires 64, second thermostat 58 is connected through a total of eleven wires 66, third thermostat 60 is connected through a total of eleven wires 68 and fourth thermostat 62 is connected through a total of eleven wires 70. In other instances, each thermostat may instead be connected through two, three, four, five, six, seven, eight, nine, ten, or even more than eleven wires, depending on the type of HVAC equipment being controlled and the exact functionality of the thermostats. In other instances, it is contemplated that one or more of the thermostats may be connected to the zone control panel 10 via a wireless connection.

In some instances, zone control panel 10 in general and user interface 12 in particular may be configured for ease of use. Zone control panel 10 may be configured, for example, to operate via one or more menus that each includes a number of menu screens. In some cases, zone control panel 10 may be configured to permit a user to scroll through a menu, from one menu screen to the next, while staying on a single menu level, without hierarchal sub-menus. A single level menu may be considered as including a number of menu screens that may be sequentially viewed, sometimes either in a forwards direction and/or a backwards direction, easily and intuitively. In some instances, a series of menu screens may be viewed sequentially but one or more menu screens may be skipped if, for example, a particular menu screen is not applicable as a result of an option selection or parameter value set in a previous menu screen.

In some instances, a menu may include several menu modes. Zone control panel 10 may, for example, be configured to permit a user to select and then travel through several menu modes. Each menu mode may include a sequential series of menu screens, as referenced above. The following Figures provide examples of menu screens that demonstrate the easy-to-use and intuitive nature of the illustrative zone control panel 10.

Figure 4:
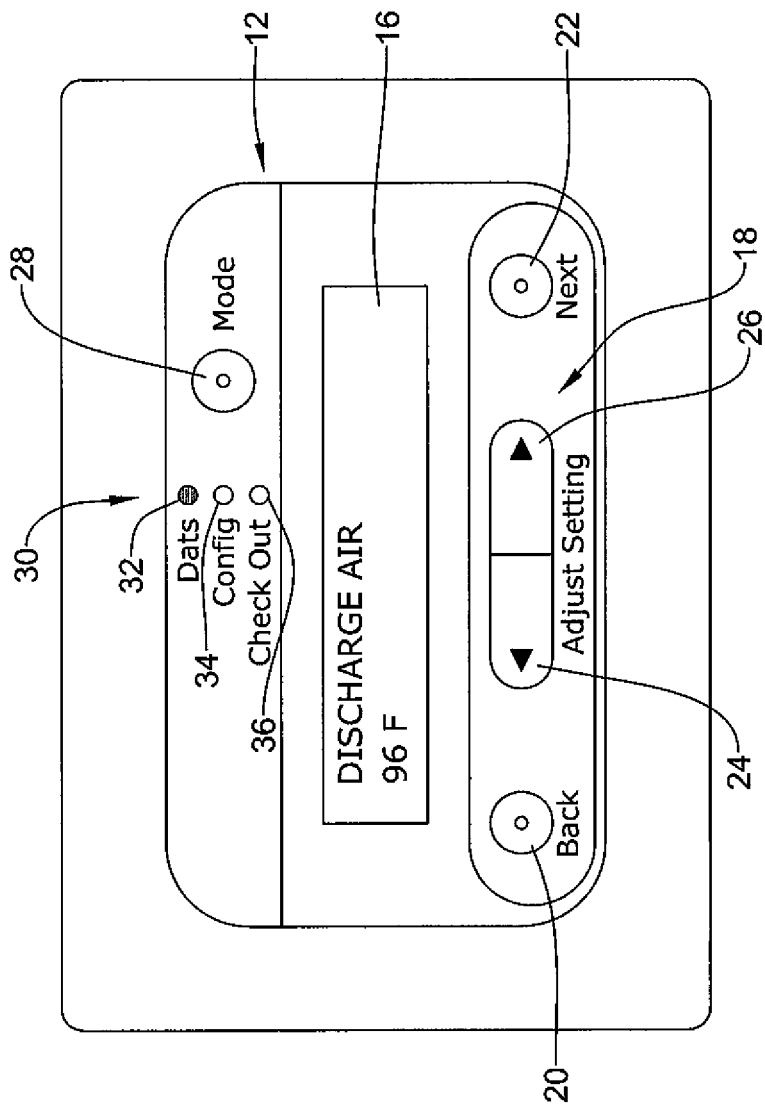
FIG. 4 is a front view of a portion of the illustrative zone control panel of FIG. 1, showing an operating condition.

FIG. 4 shows a portion of zone control panel 10, illustrating a particular operating condition. In particular, FIG. 4 shows user interface 12, including display 16. Zone control panel 10 is illustrated in a DATS (Discharge Air Temperature Sensor) mode. In some instances, this may be considered as the normal run mode, as zone control panel 10 is not in a configuration mode, in which configuration parameters may be set, and is not in a checkout mode, in which connections between zone panel 10 and other equipment may be confirmed.

In the DATS mode, controller 14 (FIG. 1) may be configured or programmed to display a current sensor reading for a discharge air temperature sensor of the HVAC system, as well as displaying easy-to-read text confirming (in addition to operational mode light 32 being lit) what mode zone control panel 10 is in, as well as explaining the meaning and/or context of the sensor reading being displayed on display 16. In some instances, if desired, a user may be able to cause zone control panel 10 to enter a configuration mode by, for example, pressing mode button 28. In some cases, mode button 28 is a dedicated mode select button that has the single function of selecting the mode of the user interface 12 and/or zone control panel 10.

Figure 5:
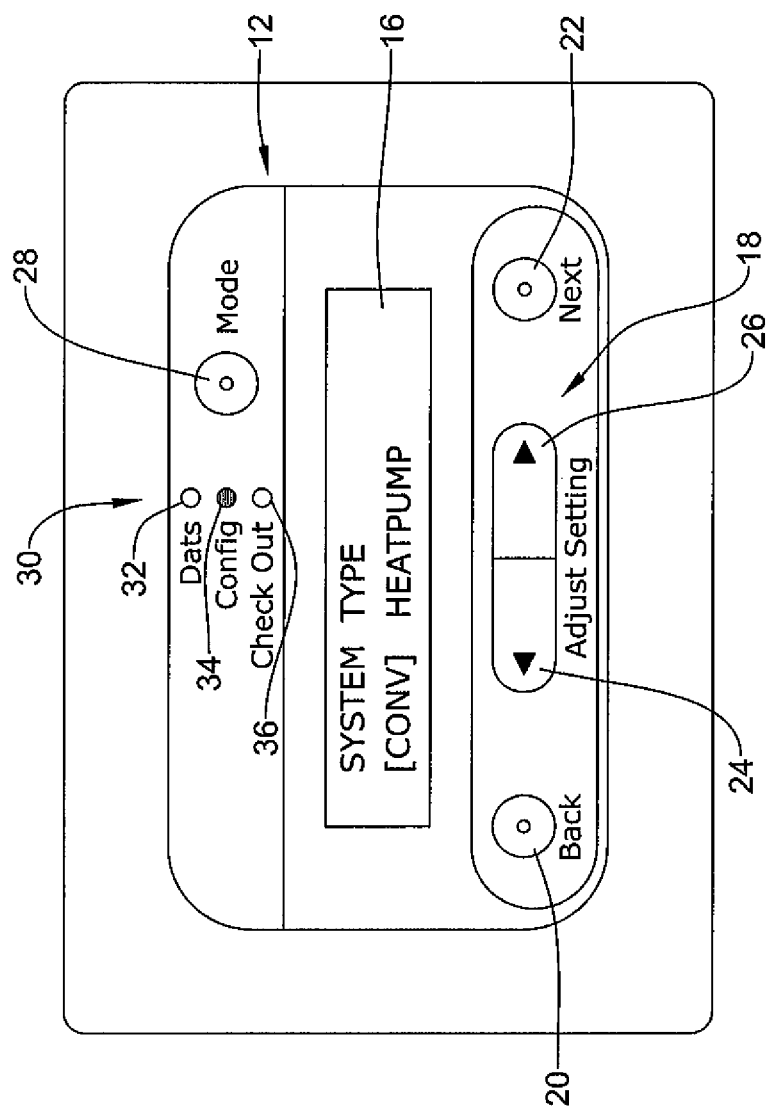
FIGS. 5 through 22 are front views of a portion of the illustrative zone control panel of FIG. 1, showing aspects of a zone control panel configuration mode in accordance with the present invention.

FIGS. 5 through 22 show various menu screens that may be displayed upon user interface 12 when zone control panel 10 is in its configuration mode. FIG. 5, in particular, shows the menu screen that may appear when mode button 28 is pushed once while zone control panel 10 is in its DATS mode. In FIG. 5, it can be seen that operational mode light 32 is no longer illuminated while configuration mode light 34 is now illuminated. As seen on display 16, a user is being asked to specify the type of system that zone control panel 10 is connected to.

In the illustrated embodiment, controller 14 (FIG. 1) asks the user to pick between a conventional system and a heat pump system. It is contemplated that additional options may be provided, such as a geothermal system or perhaps an HVAC system that is entirely powered by site-generated electricity such as solar or wind power. In some cases, controller 14 may be programmed to default to a particular setting, and the user may then toggle between the default setting and other setting(s). As illustrated, a conventional system is now selected, but a user may toggle to the heat pump option simply by pressing second arrow button 26. Once a system type is selected, a user may move to the next menu screen in sequence by pressing next button 22.

Figure 6:
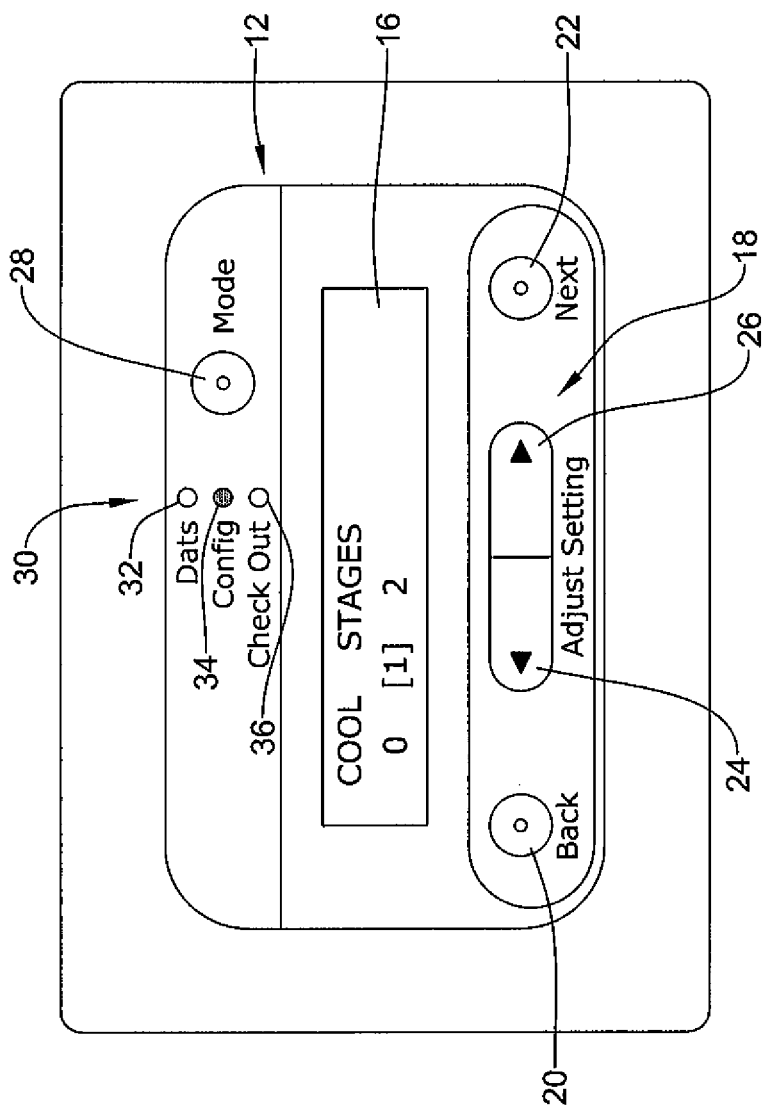

FIG. 6 provides a view of zone control panel 10 displaying the next menu screen. In this menu screen, controller 14 (FIG. 1) asks the user to configure the number of cooling stages. Display 16 provides both a textual description of the parameter to be set as well as the parameter values to choose from, thereby assisting the user in operating zone control panel 10. It should be recognized that in some cases, what is displayed in a particular menu screen (such as those shown in FIG. 6) may be dependent upon previous parameter selections. For example, selecting a number of cooling stages may depend, at least in part, on the previous selection of a conventional system type. If another system type had been selected, it should be recognized that controller 14 may instead be requesting a different parameter selection at this point.

In the illustrated embodiment, controller 14 (FIG. 1) permits a user to specify whether there are 0, 1 or 2 cooling stages that may be controlled via zone control panel 10. In some cases, these options may be different. In some instances, a user may, for example, be asked to choose whether there are 0 or 1 cooling stages only. Perhaps more than 2 cooling stages may be present, and thus controller 14 may permit a user to select between 0, 1, 2, 3, 4 or even more cooling stages. A user may scroll back and forth between the options displayed on display 16 by pressing either the first arrow button 24 and/or the second arrow button 26. As shown, one cooling stage has been selected. Once the number of cooling stages has been selected, a user may move to the next menu screen in sequence by pressing next button 22.

Figure 7:
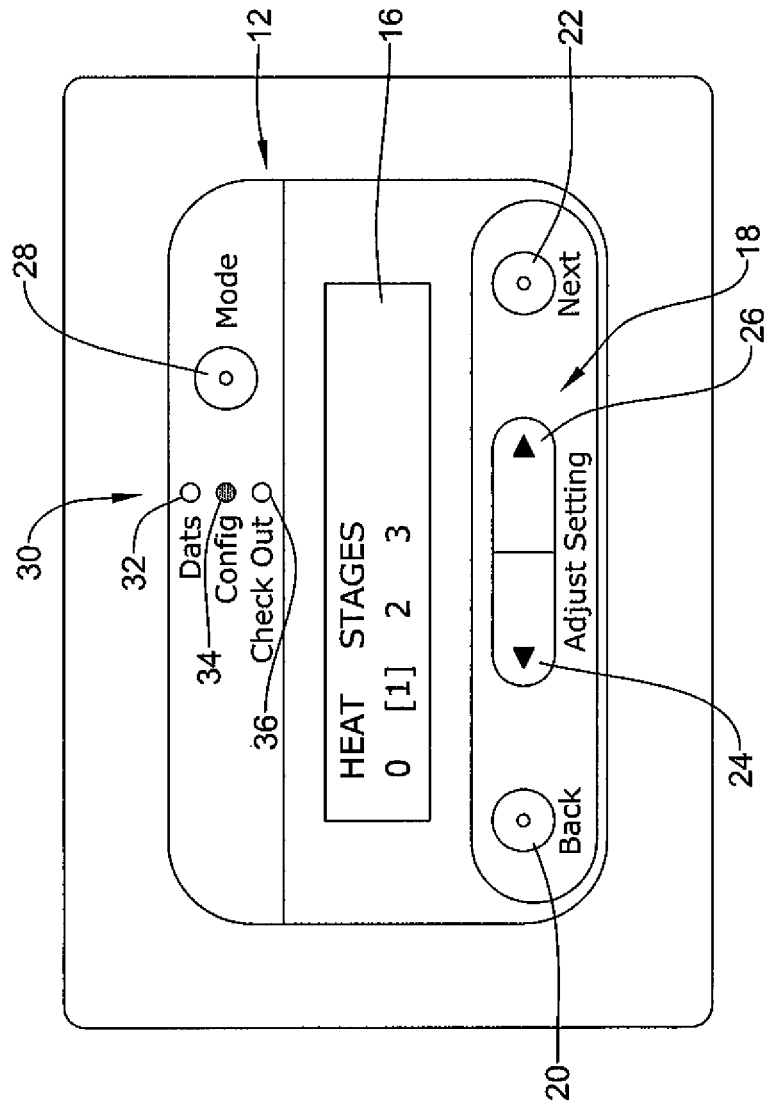

FIG. 7 provides a view of zone control panel 10 displaying the next menu screen. In this menu screen, controller 14 (FIG. 1) asks the user to configure the number of heating stages. Display 16 provides both a textual description of the parameter to be set as well as the parameter values to choose from, thereby assisting the user in using zone control panel 10. It should be recognized that in some cases, what is displayed in a particular menu screen (such as those shown in FIG. 7) may be dependent upon previous parameter selections. For example, selecting a number of heating stages may depend, at least in part, on the previous selection of a conventional system type. If another system type had been selected, it should be recognized that controller 14 may instead be requesting a different parameter selection at this point.

In the illustrated embodiment, controller 14 (FIG. 1) permits a user to specify whether there are 0, 1, 2, or 3 heating stages that may be controlled via zone control panel 10. In some cases, these options may be different. In some instances, a user may, for example, be asked to choose whether there are 0 or 1 heating stages only. Perhaps more than 3 heating stages may be present, and thus controller 14 may permit a user to select between an appropriate number of heating stages. A user may scroll back and forth between the options displayed on display 16 by pressing either the first arrow button 24 and/or the second arrow button 26. As shown, one heating stage has been selected. Once the number of heating stages has been set, a user may move to the next menu screen in sequence by pressing next button 22. Note also, that a user may move to a previous menu screen by pressing the back button 20, at which time the user may change a previous parameter selection if desired.

In some embodiments, one or more of the menu screens may enable a user to select a number of zones that the zone control panel 10 should control. For example, the zone control panel 10 may be capable of controlling four zones, but a particular building may only have three zones. In such a case, the user may use one or more menu screens to select the number of zones that are actually installed and/or connected in the building. The zone control panel may then control the zones based, at least in part, on the number of selected zones, rather than on the four zone capability of the illustrative zone control panel 10. In some cases, the controller 14 of the zone control panel 10 may uses a control algorithm that accepts as an input the number of zones to actually control. The control algorithm may control the zones differently depending on the number of selected zones.

Figure 8:
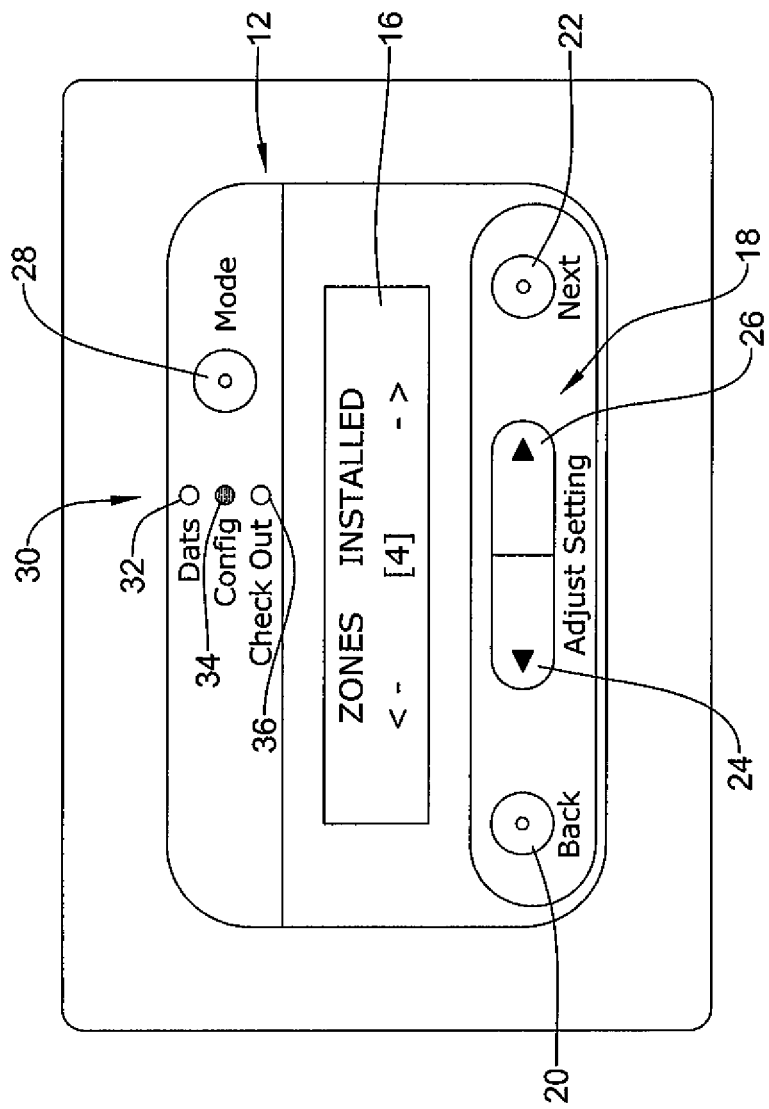

FIG. 8 provides a view of zone control panel 10 displaying the next menu screen from FIG. 7. In this menu screen, controller 14 (FIG. 1) asks the user to specify how many different zones are to be controlled via zone control panel 10. Display 16 provides textual information identifying the parameter to be set as well as options for its numerical value. In some cases, this may make zone control panel 10 easier and more intuitive to use. In some instances, controller 14 may display a numerical value that can be incremented by pressing the second arrow button 26 and/or decremented by pressing the first arrow button 24, rather than simply presenting predetermined options that a user may scroll between.

As illustrated, display 16 may provide visual representations of the button or buttons that may be used to set or change the displayed parameter. For example, as illustrated, display 16 shows a left arrow on the left side of the displayed parameter value (corresponding to left arrow button 24) and a right arrow on the right side of the displayed parameter value (corresponding to right arrow button 26). Moreover, and in some embodiments, the left arrow on the left side of the display 16 may be similar to the indicia or markings on the left arrow button 24, and the right arrow on the right side of the display 16 may be similar to the indicia or markings on the right arrow button 26. As a result, a user may be better informed as to how to change the value of the displayed parameter. The visual representations of the appropriate buttons may be considered as helping the user to understand operation of zone control panel 10 and thus may help make zone control panel 10 more intuitive and easy-to-use. As shown, the user has specified that four zones are present. Once this has been set, a user may move to the next menu screen in sequence by pressing next button 22.

Figure 9:
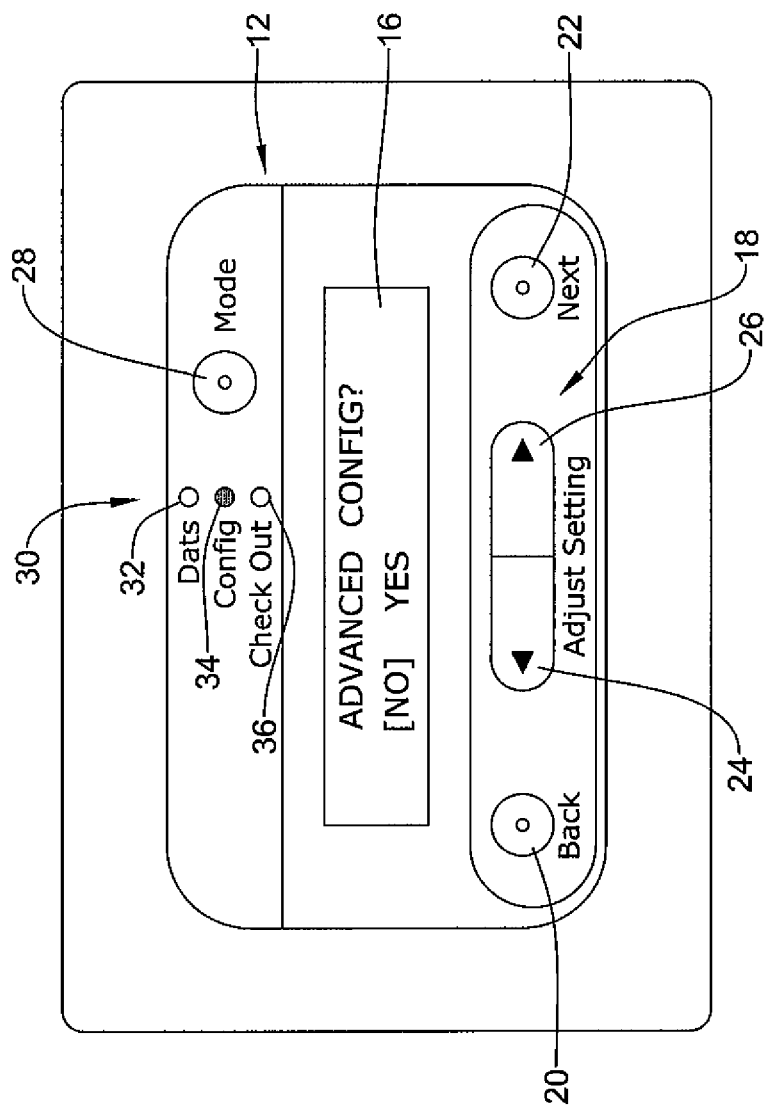
Figure 10:
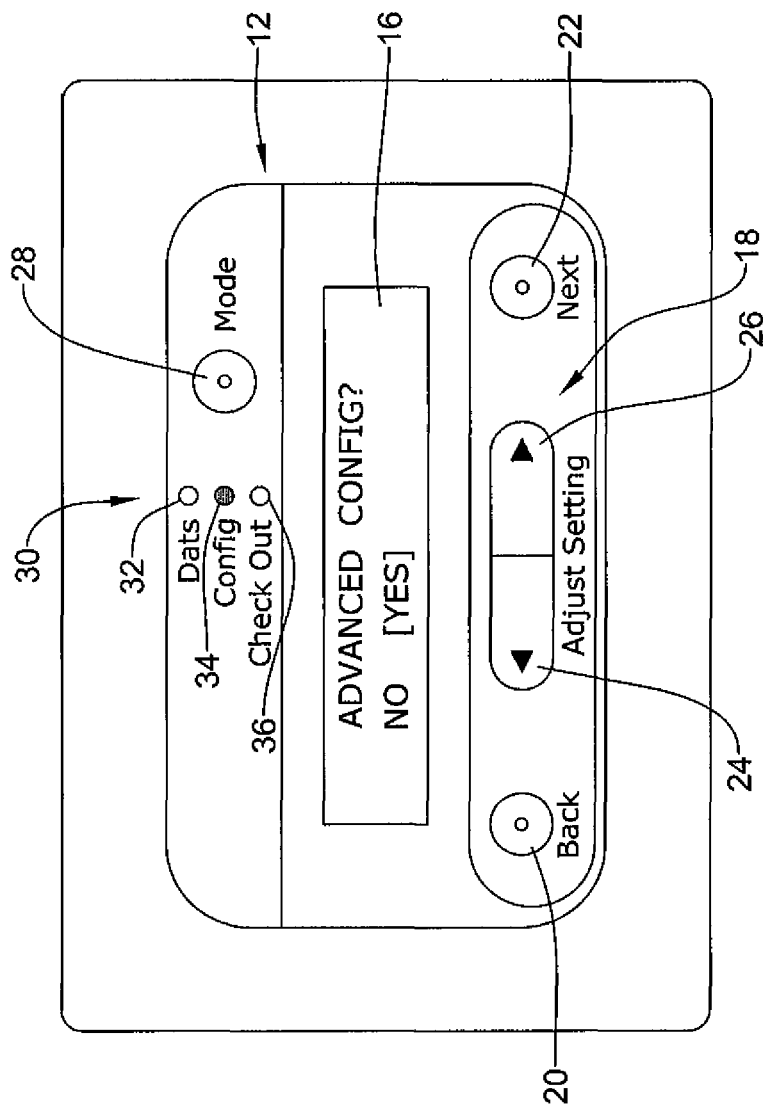

FIG. 9 provides a view of zone control panel 10 displaying the next menu screen from FIG. 8. In this menu screen, controller 14 (FIG. 1) asks the user whether he or she wishes to travel through the advanced configuration menu screens. Display 16 provides both a textual description of the question as well as the available answers to toggle between in order to assist the user. A user may toggle back and forth between NO and YES options displayed on display 16 by pressing either the first arrow button 24 and/or the second arrow button 26. In FIG. 9, a user has selected NO. Pressing the next button 22 will cause controller 14 to advance to a menu screen represented in FIG. 19. However, if a user selects YES, as shown in FIG. 10, controller 10 will display the first of one or more advanced configuration menu screens as shown in FIG. 11.

Figure 11:
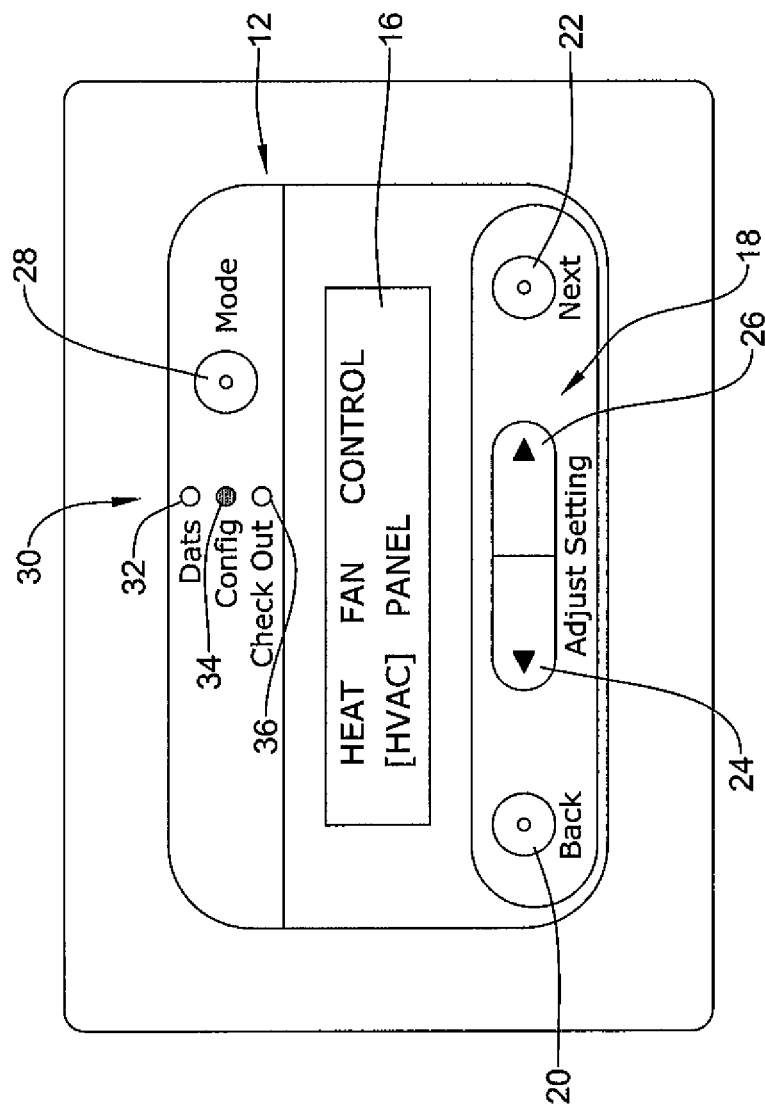

In FIG. 11, controller 14 (FIG. 1) asks the user to specify whether heat fan control should be controlled by the HVAC equipment itself or if zone control panel 10 should be configured to override the HVAC equipment. Display 16 provides both a textual description of the question as well as the available answers to toggle between in order to make zone control panel 10 easier to use. A user may toggle between the options displayed on display 16 by pressing either the first arrow button 24 and/or the second arrow button 26. In the illustrated embodiment, a user has specified that the HVAC equipment should control the heat fan. Once this has been set, a user may move to the next menu screen in sequence by pressing next button 22.

Figure 12:
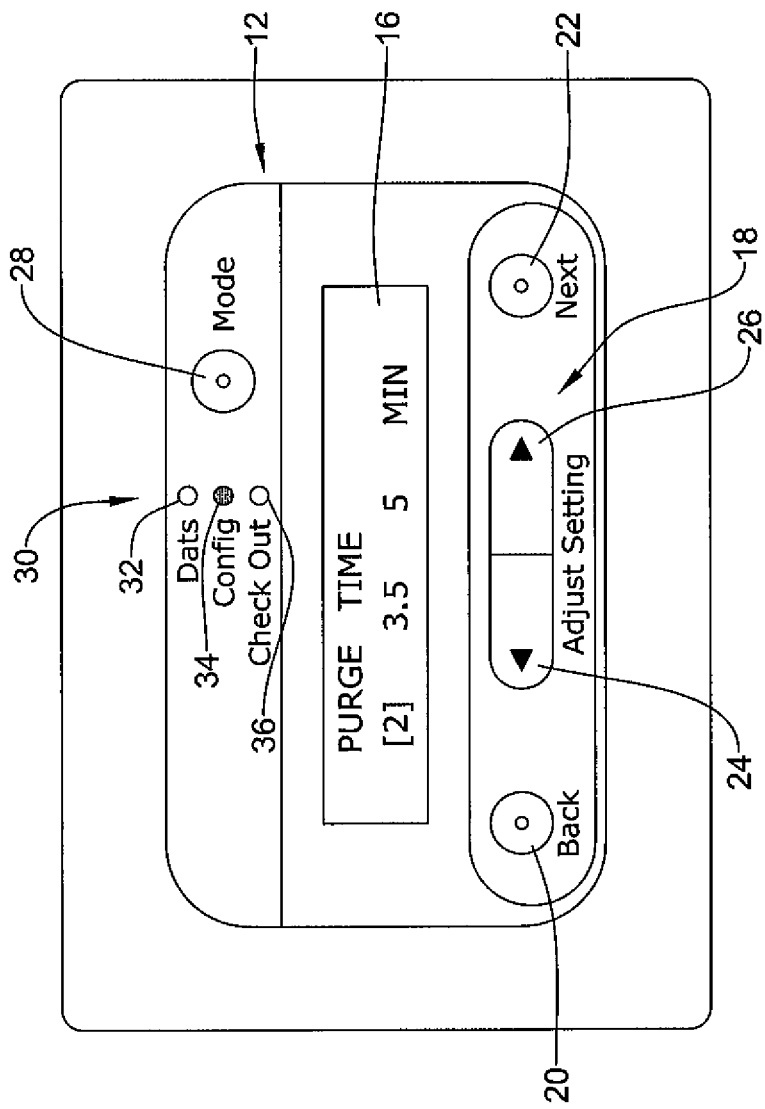

FIG. 12 provides a view of zone control panel 10 displaying the next menu screen from FIG. 11. In this menu screen, controller 14 (FIG. 1) asks the user to set a purge time. Display 16 provides both a textual description of the parameter to be set as well as the parameter values to choose from, thereby providing ease of use. A user may toggle back and forth between options displayed on display 16 by pressing either the first arrow button 24 and/or the second arrow button 26. In the illustrated embodiment, a user has selected a purge time of 2 minutes. Once this has been set, a user may move to the next menu screen in sequence by pressing next button 22.

Figure 13:
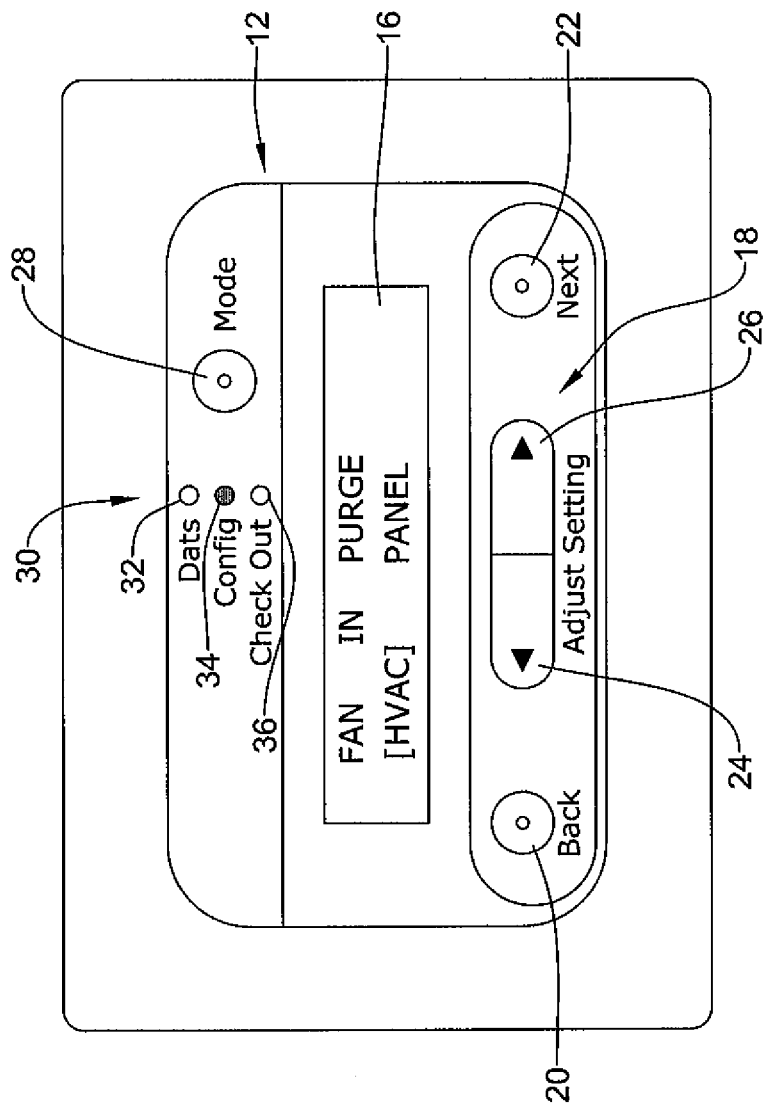

FIG. 13 provides a view of zone control panel 10 displaying the next menu screen. In this menu screen, controller 14 (FIG. 1) asks the user to specify fan control during purge time. Display 16 improves ease of use by providing both a textual description of the parameter to be set as well as the parameter values to choose from. A user may toggle back and forth between options displayed on display 16 by pressing either the first arrow button 24 and/or the second arrow button 26. In the illustrated embodiment, a user has specified that the HVAC equipment provide fan control during purge time. Once this has been set, a user may move to the next menu screen in sequence by pressing next button 22.

Figure 14:
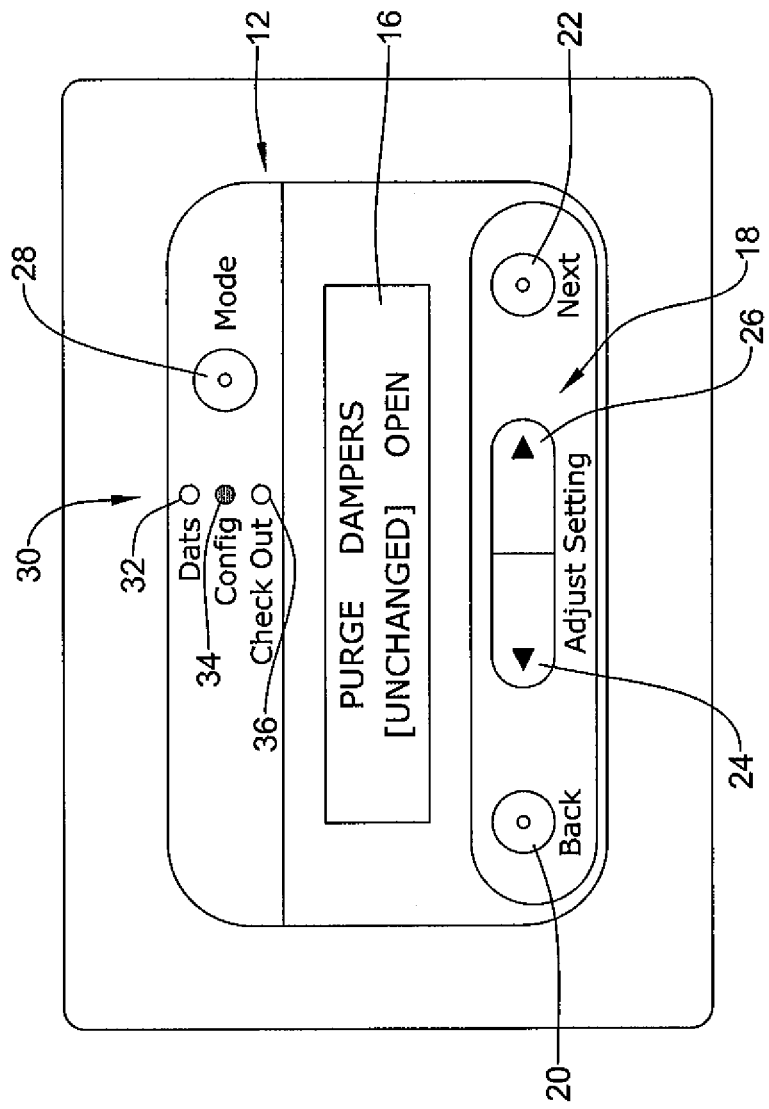

FIG. 14 provides a view of zone control panel 10 displaying the next menu screen. In this menu screen, controller 14 (FIG. 1) asks the user to specify whether the dampers should be opened or left unchanged during purge time. Display 16 provides both a textual description of the parameter to be set as well as the parameter values to choose from, thereby making zone control panel 10 easier to use. A user may toggle back and forth between options displayed on display 16 by pressing either the first arrow button 24 and/or the second arrow button 26. In the illustrated embodiment, a user has specified that the dampers remain unchanged during purge time. Once this has been set, a user may move to the next menu screen in sequence by pressing next button 22.

Figure 15:
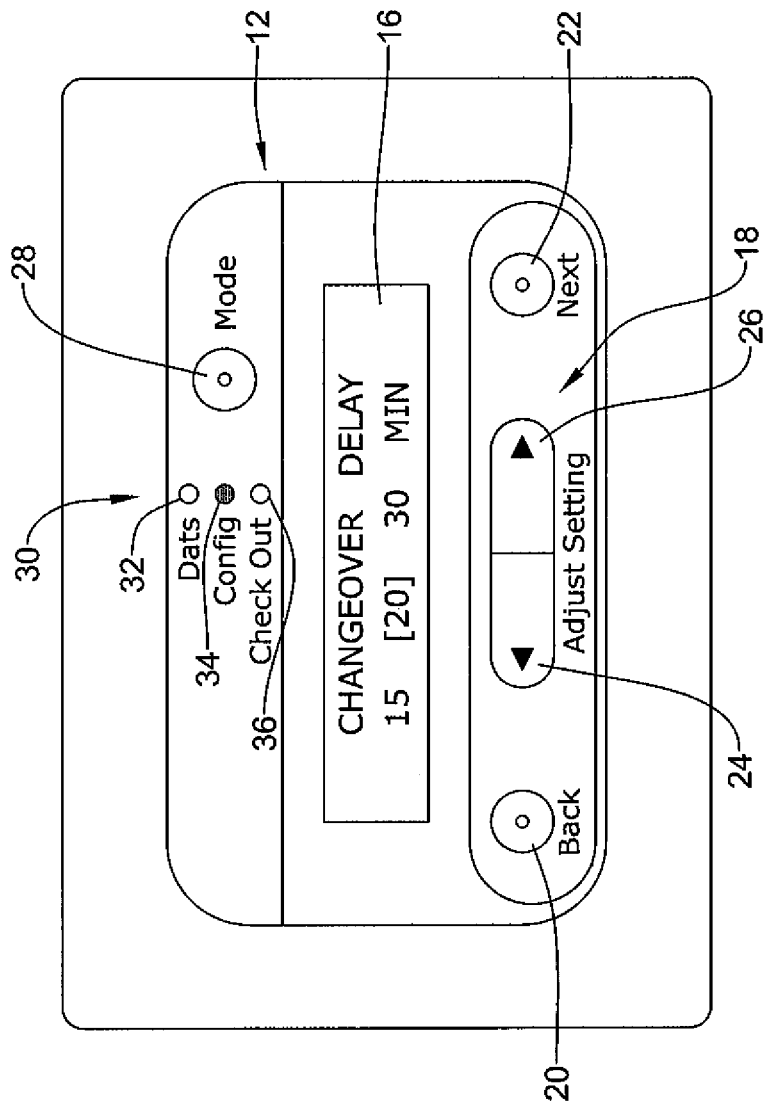

FIG. 15 provides a view of zone control panel 10 displaying the next menu screen. In this menu screen, controller 14 (FIG. 1) asks the user to specify a changeover delay. Display 16 provides both a textual description of the parameter to be set as well as the parameter values to choose from in order to assist a user. A user may toggle back and forth between options displayed on display 16 by pressing either the first arrow button 24 and/or the second arrow button 26. In the illustrated embodiment, a user has specified a twenty minute changeover delay. Once this has been set, a user may move to the next menu screen in sequence by pressing next button 22.

Figure 16:
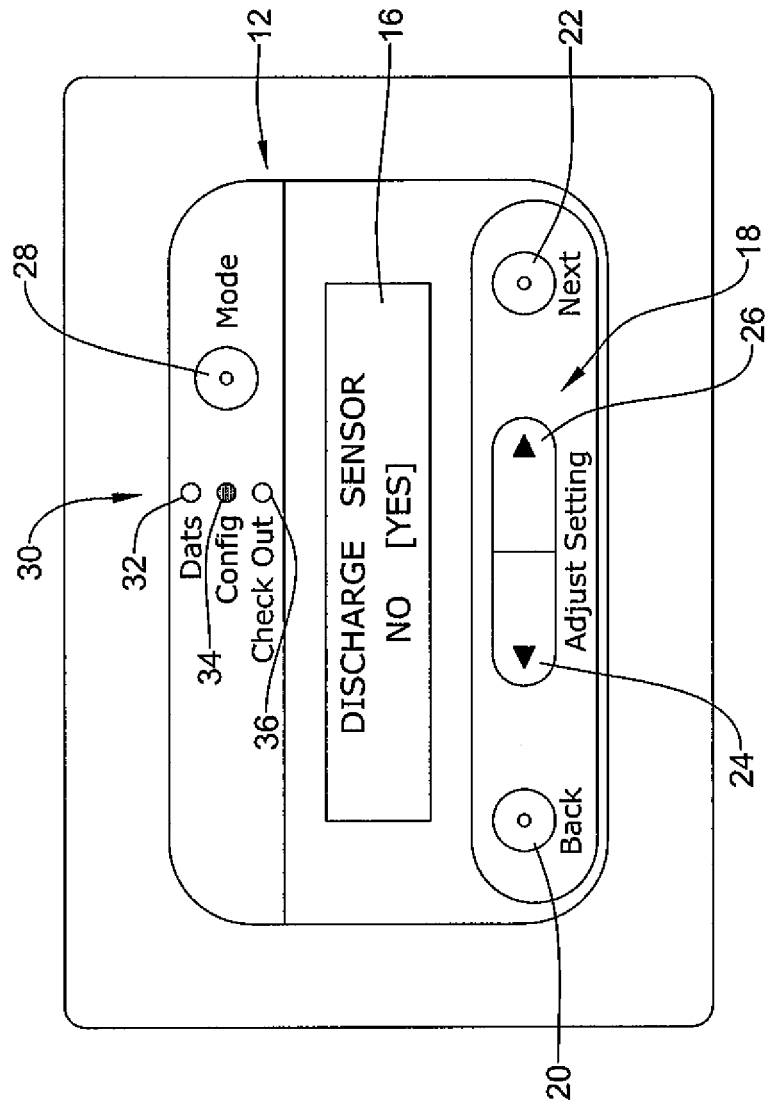

FIG. 16 provides a view of zone control panel 10 displaying the next menu screen. In this menu screen, controller 14 (FIG. 1) asks the user to specify whether or not there is a discharge temperature sensor connected to zone control panel 10. Display 16 provides both a textual description of the parameter to be set as well as the parameter values to choose from in order to make zone control panel 10 easier to use. A user may toggle back and forth between options displayed on display 16 by pressing either the first arrow button 24 and/or the second arrow button 26. In the illustrated embodiment, a user has specified that there is a discharge temperature sensor. Once this has been set, a user may move to the next menu screen in sequence by pressing next button 22.

Figure 17:
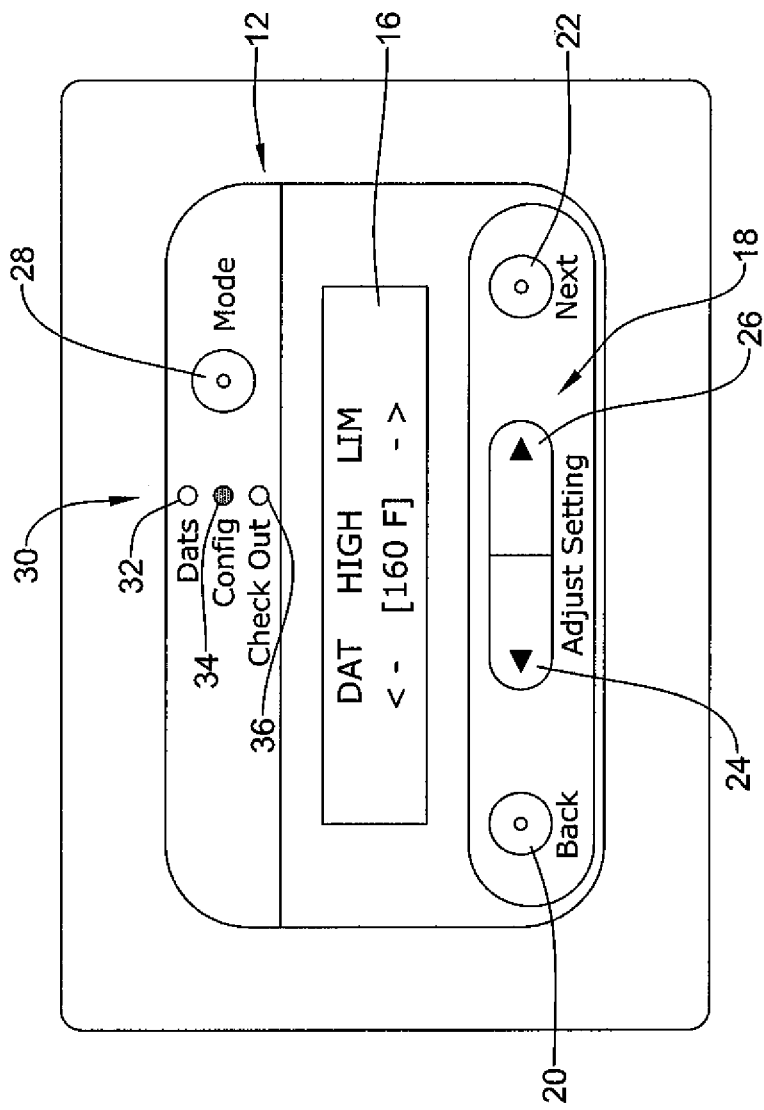

FIG. 17 provides a view of zone control panel 10 displaying the next menu screen. In this menu screen, controller 14 (FIG. 1) asks the user to set a high limit lockout value for the discharge air temperature. Display 16 improves usability by providing both a textual description of the parameter to be set as well as the parameter values to choose from. In some instances, controller 14 may display a numerical value that can be incremented by pressing the second arrow button 26 and/or decremented by pressing the first arrow button 24, rather than simply presenting predetermined options that a user may toggle between. Like above with respect to FIG. 8, display 16 may provide visual representations of the button or buttons that may be used to set or change the displayed parameter. In the illustrated embodiment, a user has set a high limit lockout temperature of 160 degrees Fahrenheit. Once this has been set, a user may move to the next menu screen in sequence by pressing next button 22.

Figure 18:
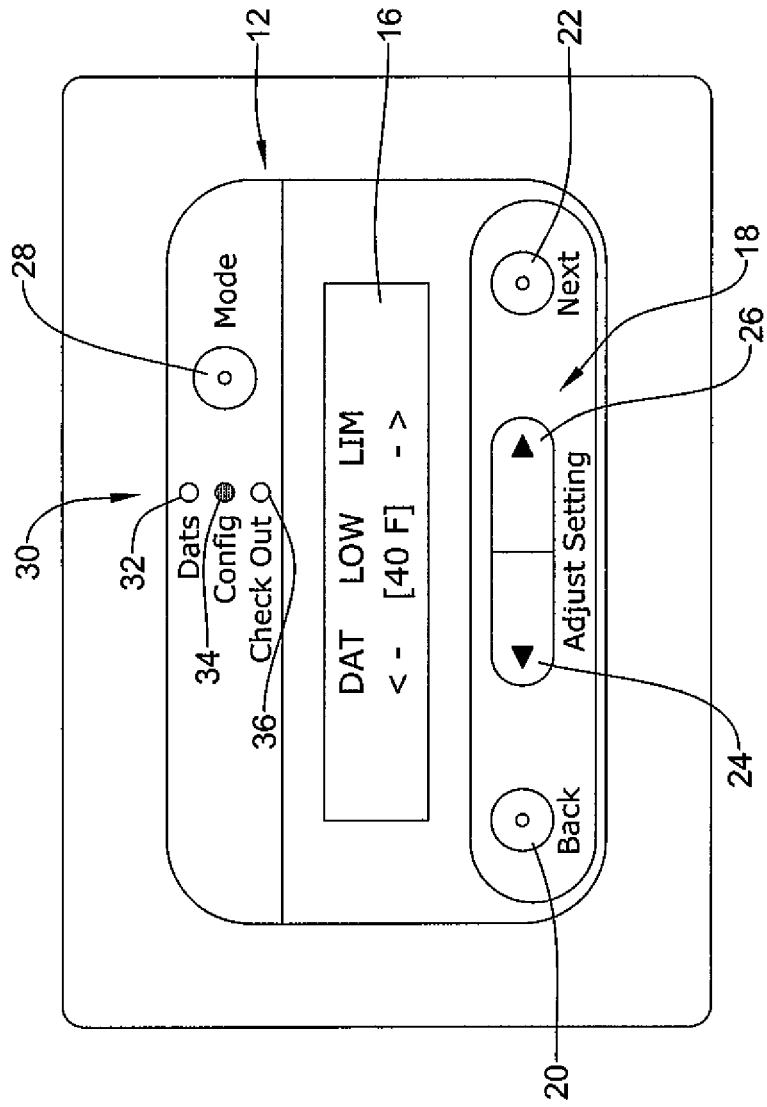

FIG. 18 provides a view of zone control panel 10 displaying the next menu screen. In this menu screen, controller 14 (FIG. 1) asks the user to set a low limit lockout value for the discharge air temperature. Display 16 provides both a textual description of the parameter to be set as well as the parameter values to choose from to improve usability. In some instances, controller 14 may display a numerical value that can be incre- mented by pressing the second arrow button 26 and/or decremented by pressing the first arrow button 24, rather than simply presenting predetermined options that a user may toggle between. Again, display 16 may also provide visual representations of the button or buttons that may be used to set or change the displayed parameter. In the illustrated embodiment, a user has set a low limit lockout temperature of 40 degrees Fahrenheit. Once this has been set, a user may move to the next menu screen in sequence by pressing next button 22.

Figure 19:
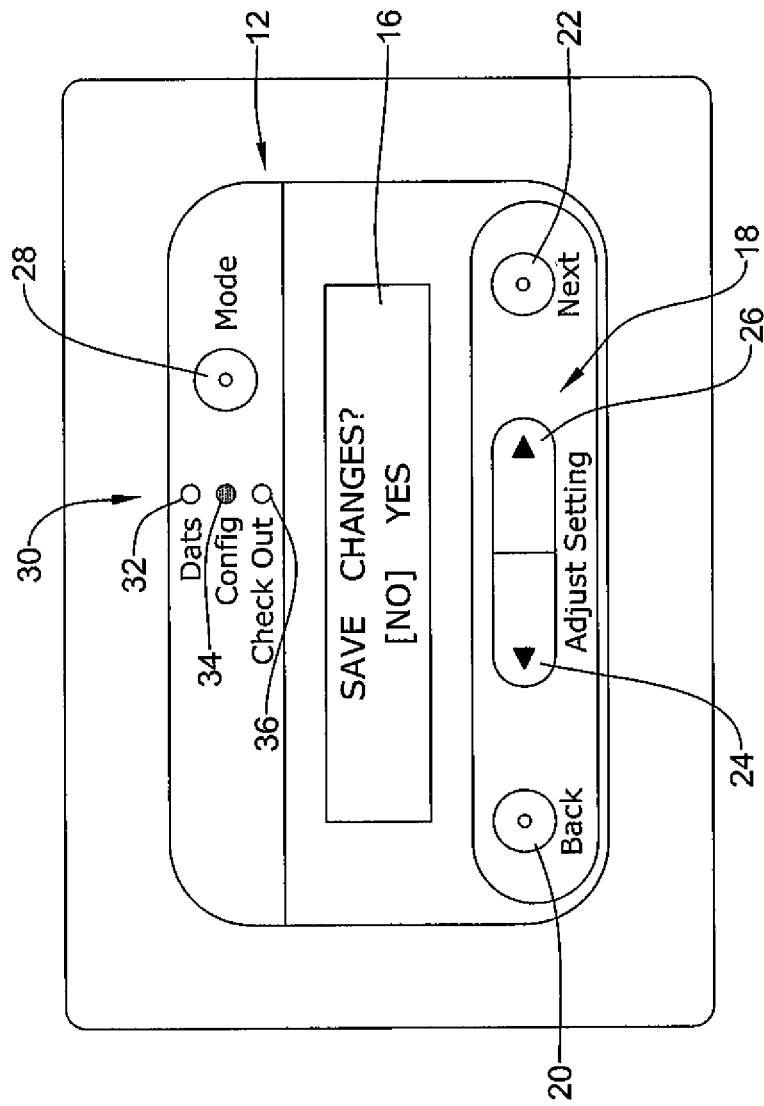

FIG. 19 provides a view of zone control panel 10 displaying the next menu screen. As noted above, if a user decides not to enter the advanced configuration portion of the configuration mode (FIG. 9), FIG. 19 is the next menu screen that will be displayed. Or, if the user passes through the advanced configuration menu screens and, in leaving FIG. 18, presses next button 22, FIG. 19 may be the next menu screen to be displayed.

In FIG. 19, controller 14 (FIG. 1) asks the user if he or she wishes to save any changes that may have been made within the configuration mode. Display 16 provides both a textual description of the question being asked as well as the possible answers to choose from, thereby assisting a user. A user may toggle back and forth between options displayed on display 16 by pressing either the first arrow button 24 and/or the second arrow button 26. In some instances, a user may decide to discard any changes made if, for example, they did not intend to make any changes, or if they are not certain if they made the appropriate changes.

Figure 20:
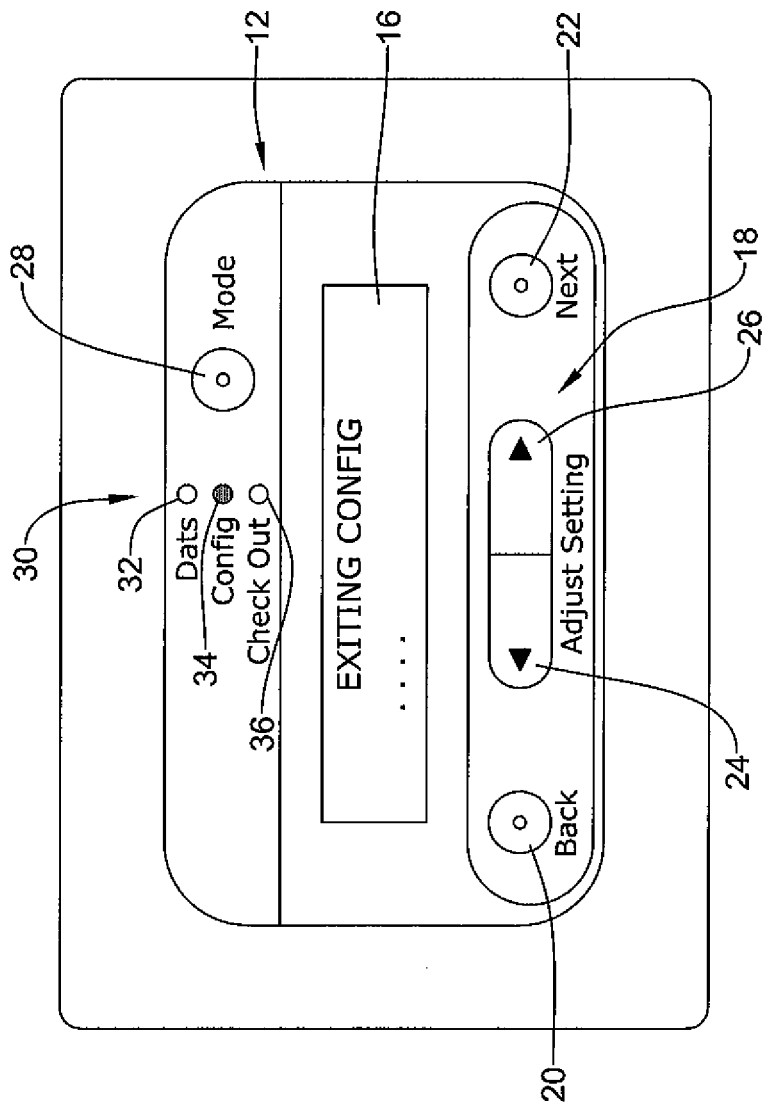

As shown in FIG. 19, a user has elected to discard any changes that may have been intentionally or even unintentionally made within the configuration mode. Pressing the next button 22 causes the next menu screen to be displayed, as shown in FIG. 20. In FIG. 20, display 16 indicates that zone control panel 10 is exiting the configuration mode.

Figure 21:
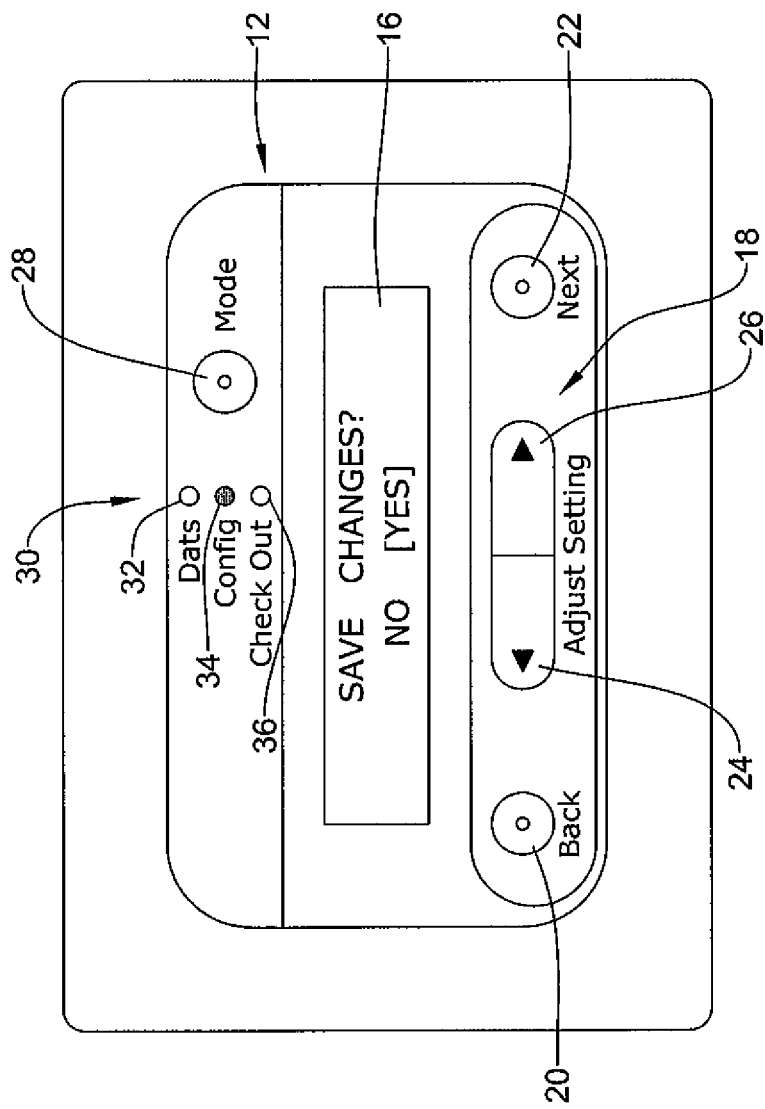
Figure 22:
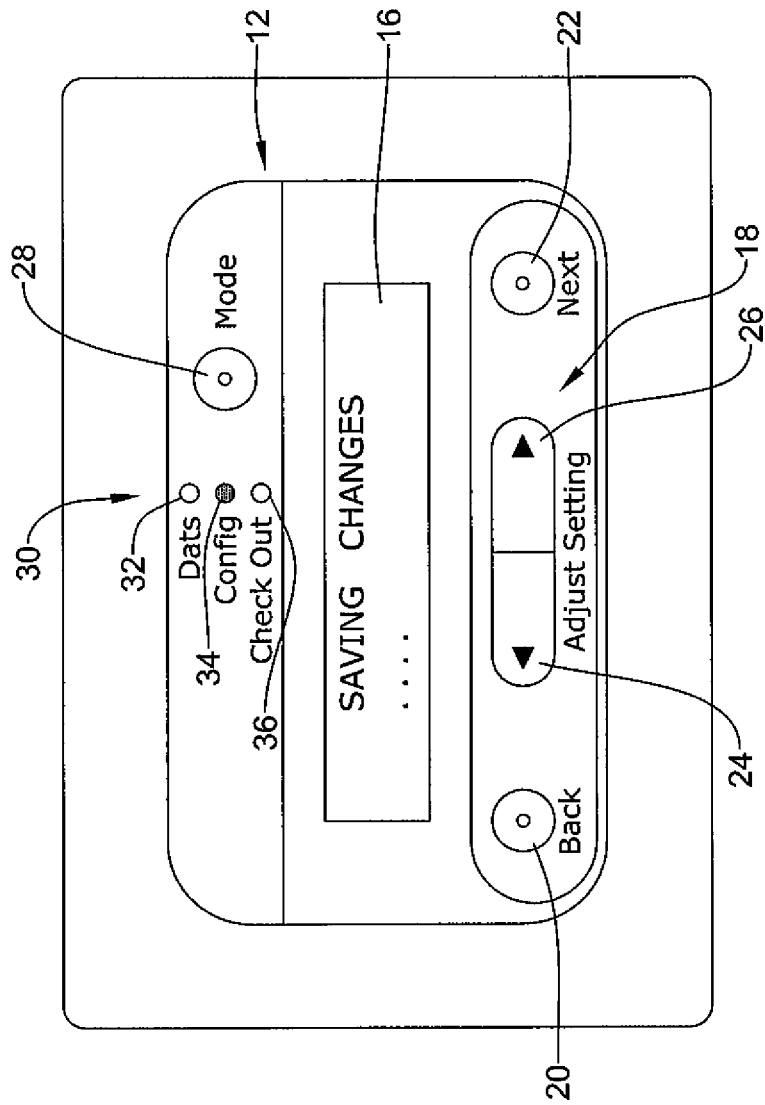

In the case where a user wants to save the changes made while zone control panel 10 was in the configuration mode. As shown in FIG. 21, a user may toggle between options displayed on display 16, and thereby select YES, by pressing either the first arrow button 24 and/or the second arrow button 26. Once this has been set, a user may move to the next menu screen in sequence by pressing next button 22. As shown in FIG. 22, controller 14 (FIG. 1) may cause display 16 to provide confirmation that the changes are, in fact, being saved.

In the above discussion, a user has moved sequentially from menu screen to menu screen, i.e., from FIG. 4 to FIG. 5, from FIG. 5 to FIG. 6, and so on. It should be recognized that a user may also move sequentially backwards through the menu. For example, a user could be at the menu screen depicted in FIG. 8, for example, and return to the menu screen depicted in FIG. 7 simply by pressing the back button 20. In some instances, a user may move forwards and backwards as desired.

A user may scroll through one or more menu screens without making any changes to whatever parameter or setting is shown in a particular menu screen. For example, some menu screens may provide a default setting for a particular parameter. If the default setting is appropriate for a particular situation, a user may scroll through that particular menu screen using the next button 22 and/or the back button 20, as appropriate, without making any selections or changing any parameter values. The controller 14 may track whether any changes were indeed made, and if not, the menu screen shown in FIG. 19 may be skipped, and instead the menu screen shown in FIG. 20 may be displayed.

Also, in some embodiments, if the mode select button 28 is pressed anytime while in the configuration mode, the controller may exit the configuration mode. In some instances, the controller 14 may track whether any changes were made by the user while in the configuration mode, and if so, the menu screen shown in FIG. 19 may displayed in order to query the user as to whether the changes should be saved. If no changes were made, the controller 14 may skip to the menu screen shown in FIG. 20.

Figure 23:
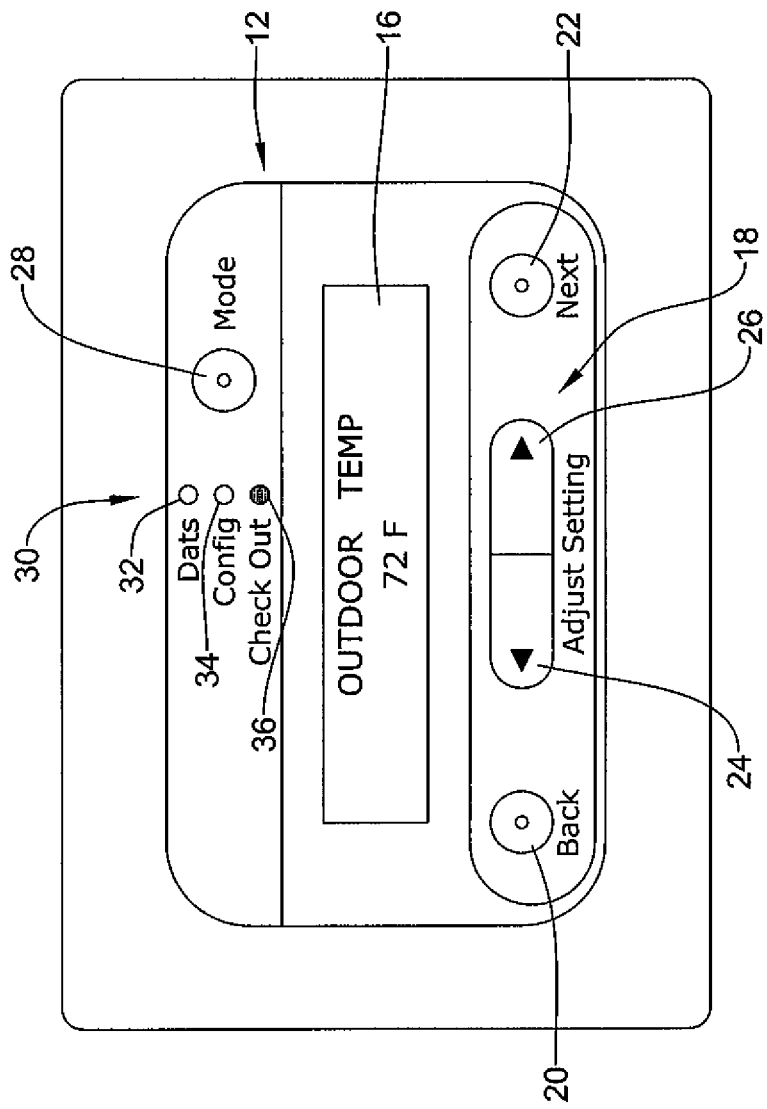
FIGS. 23 through 43 are front views of a portion of the illustrative zone control panel of FIG. 1, showing aspects of a zone control panel checkout mode in accordance with the present invention.

FIGS. 23 through 43 show various illustrative menu screens that may be displayed upon user interface 12 when zone control panel 10 is in its checkout mode. FIG. 23, in particular, shows the menu screen that may appear when mode button 28 is pushed twice from a point in time while zone control panel 10 is in its DATS mode. In FIG. 23, it can be seen that checkout mode light 36 is now illuminated while both operational mode light 32 and configuration mode light 34 are both off.

In some cases, zone control panel 10 may be connected to one or more temperature sensors. In FIG. 23, controller 10 (FIG. 1) is displaying an outdoor temperature reading on display 16 as well as descriptive text identifying the numerical value being displayed. The information displayed on display 16 confirms to a user that an outdoor temperature sensor is connected to zone control panel 10 and appears to be functioning correctly. Similarly, FIG. 24 demonstrates that a discharge temperature sensor is connected to zone control panel 10 and appears to be functioning correctly. A user may move from the menu screen depicted in FIG. 23 to the menu screen depicted in FIG. 24 simply by pressing the next button 22.

In some instances, the checkout mode permits a user, technician or other individual to make sure that the zone control panel 10 is correctly connected to any and/or all HVAC equipment that zone control panel 10 is expected to control, as well as to make sure that the HVAC equipment is functioning correctly. As shown in FIGS. 25 through 38, zone control panel 10 is configured to permit these checks to be made easily and intuitively, without requiring a complicated, hard-to-use, hierarchal menu.

Figure 24:
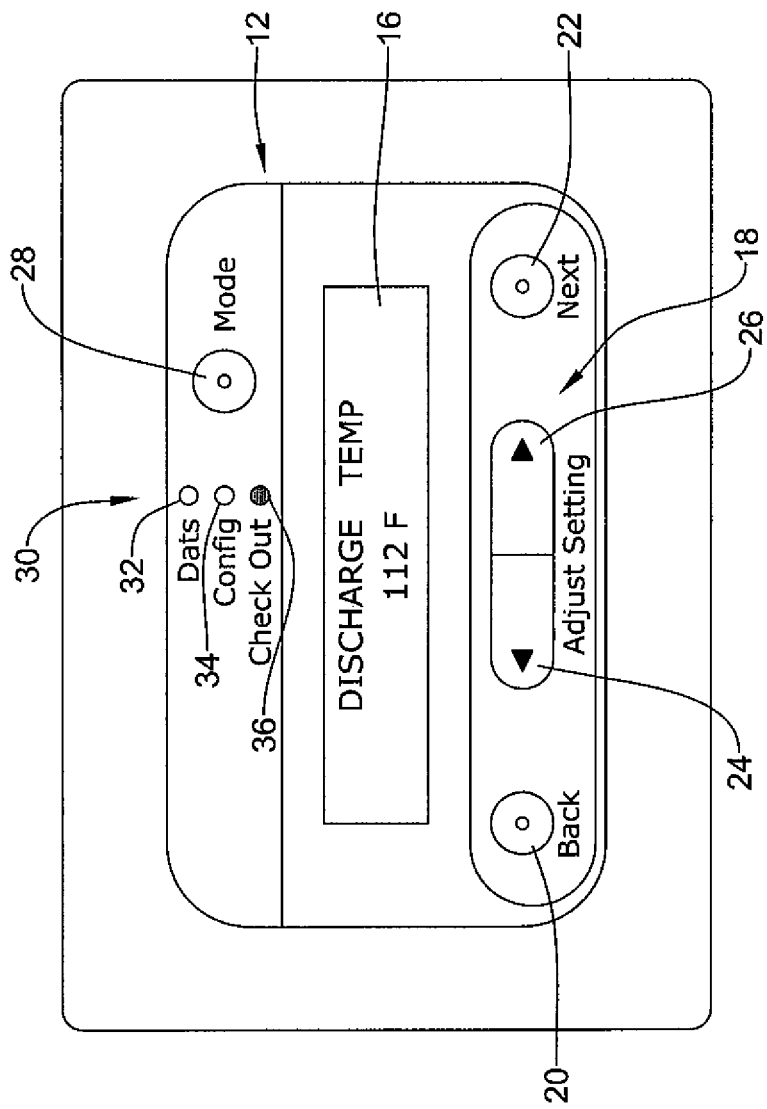
Figure 25:
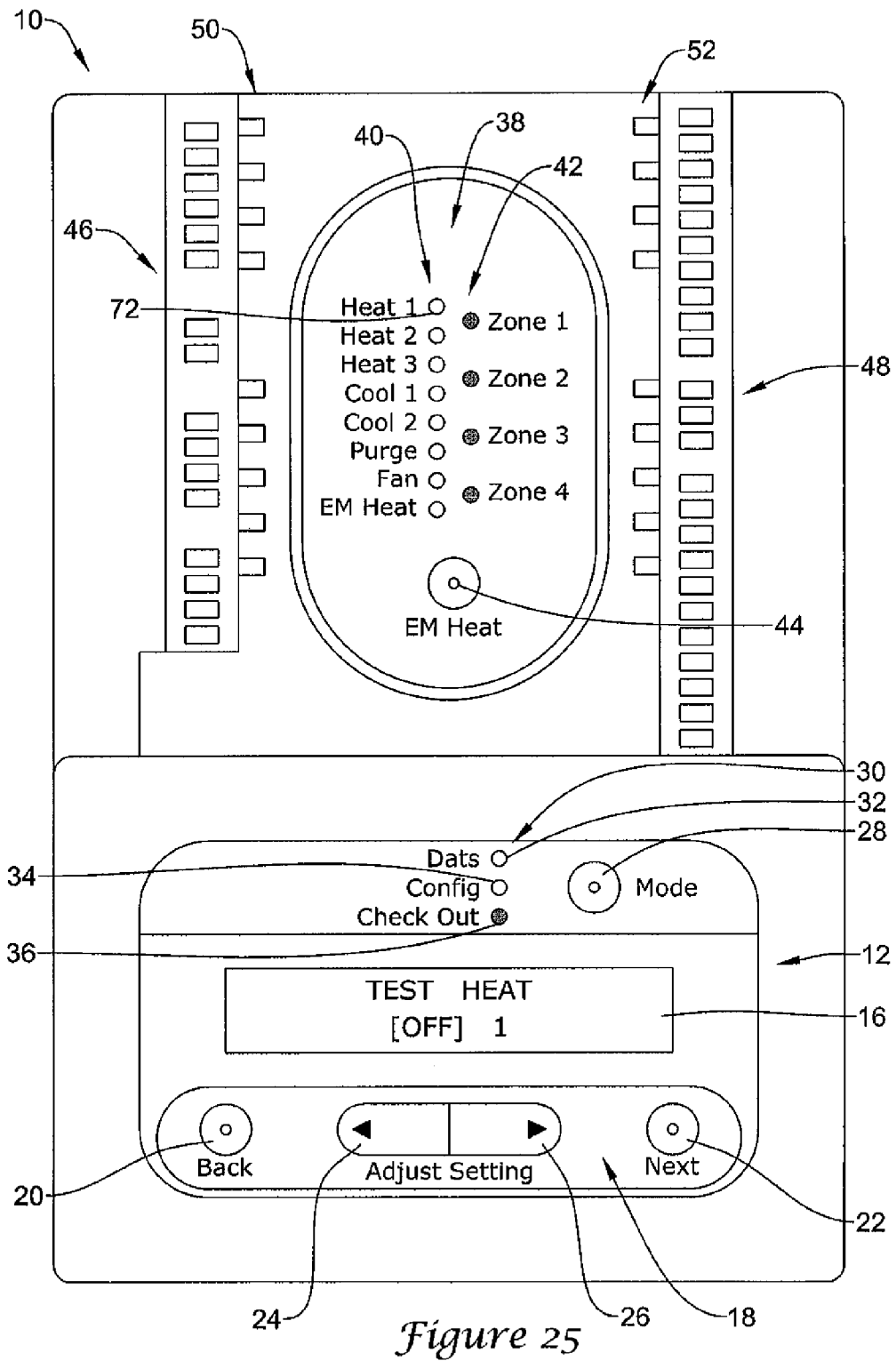

The menu screen depicted in FIG. 25 may, for example, be reached from the menu screen depicted in FIG. 24 by pushing the next button 22. It will be recognized that at least some of the equipment options tested in this series of menu screens may be dependent on how choices were previously made in the configuration mode, if any changes or choices were made. For example, with respect to testing heat stages, it will be remembered that in the menu screen shown in FIG. 7, a user selected a single heat stage. Consequently, only one heat stage is tested in the illustrative checkout mode. If the user had previously selected two heat stages, both could now be tested.

FIG. 25 provides a view of zone control panel 10 displaying a menu screen in which controller 14 (FIG. 1) permits a user to test the heating equipment. Display 16 provides an indication of what HVAC equipment is to be tested, as well as providing options that can be toggled between using the first arrow button 24 and/or the second arrow button 26. In this case, a user can toggle between not energizing the heat, and energizing first stage heat. As shown in FIG. 25, no heat is being energized.

Figure 26:
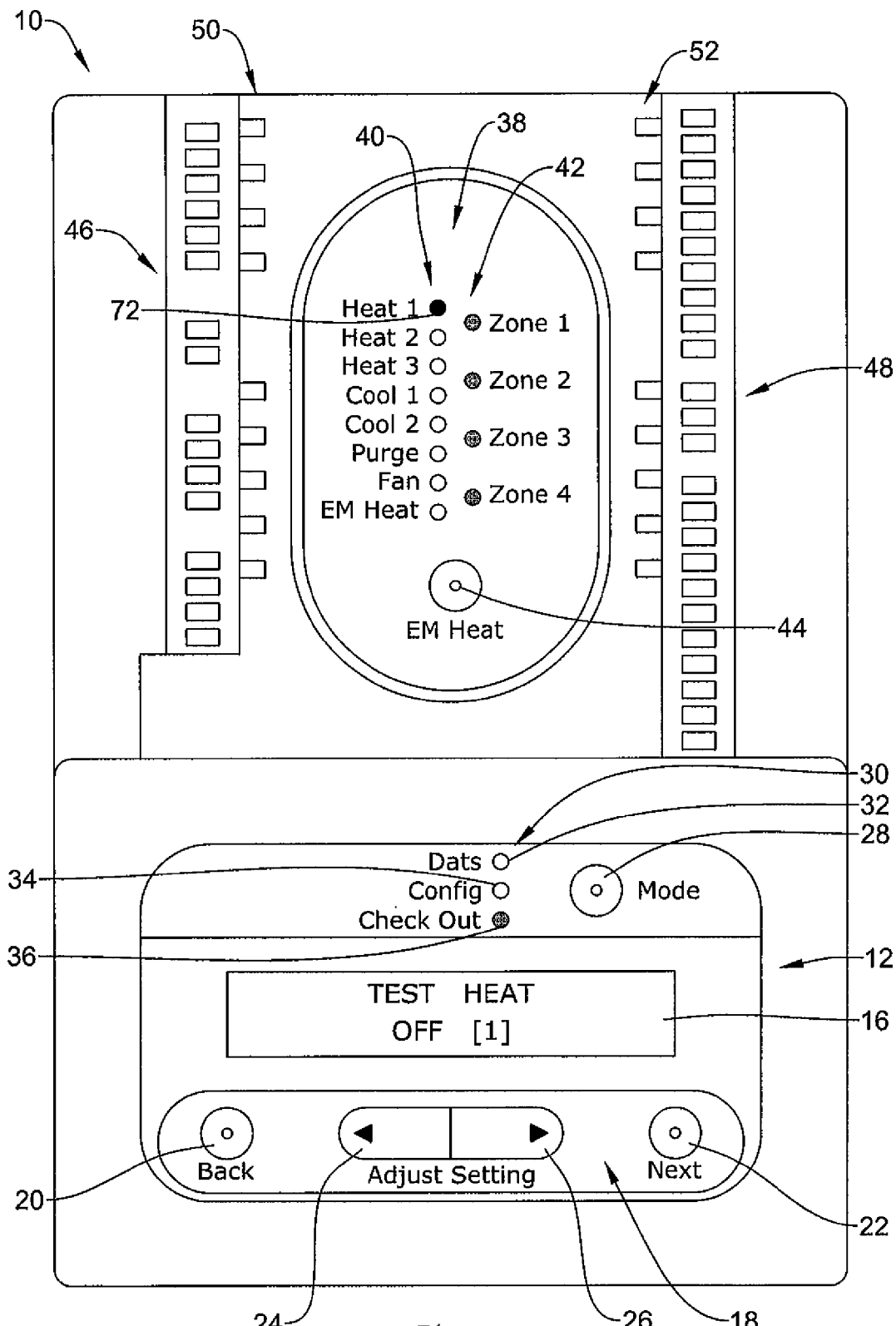

This may be confirmed by reviewing secondary control panel 38, in which none of the HVAC status lights 40 are lit. In particular, heat 1 light 72 is not lit. However, if a user decides to energize the first heat stage, they can so do by toggling to the desired selection, as seen in FIG. 26. In FIG. 26, it can be seen that the heat 1 light 72 has now been lit. In some instances, the heat 1 light 72 may be red, but this is not required. It should be noted that in the illustrated example, and as seen in FIGS. 25 through 30, all of the zone dampers are open as indicated by the zone lights 42 all being lit. In some cases, these lights may be green, but this is not required. Other colors may also be used. In the illustrative diagrams, a dark black fill pattern indicates a red color, and a gray fill pattern indicates a green color. Once the heat has been satisfactorily tested, a user may scroll to the menu screen shown in FIG. 27 by pressing the next button 22.

Figure 27:
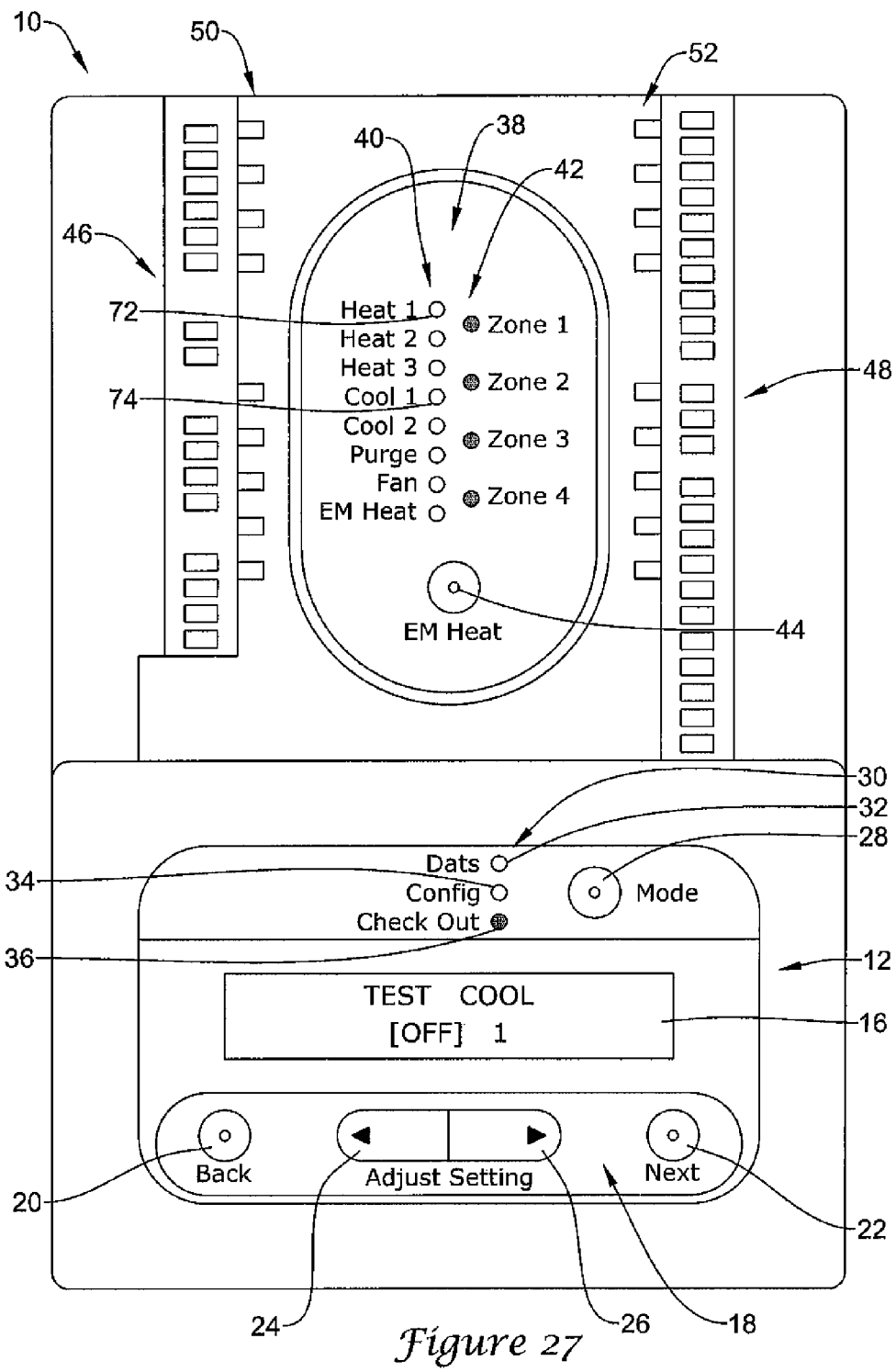

FIG. 27 provides a view of zone control panel 10 displaying a menu screen in which controller 14 (FIG. 1) permits a user to test the cooling equipment. As noted above, at least some of the available equipment options may be dependent on previously made choices. For example, with respect to testing cooling stages, it will be remembered that in the menu screen shown in FIG. 6, a user selected a single cooling stage. Consequently, only one cooling stage is tested in the illustrative checkout mode.

Display 16 provides an indication of what HVAC equipment is to be tested, as well as providing options that can be toggled between using the first arrow button 24 and/or the second arrow button 26. In this case, a user can toggle between not energizing the cooling equipment, and energizing first stage cooling. As shown in FIG. 27, no equipment is being tested.

Figure 28:
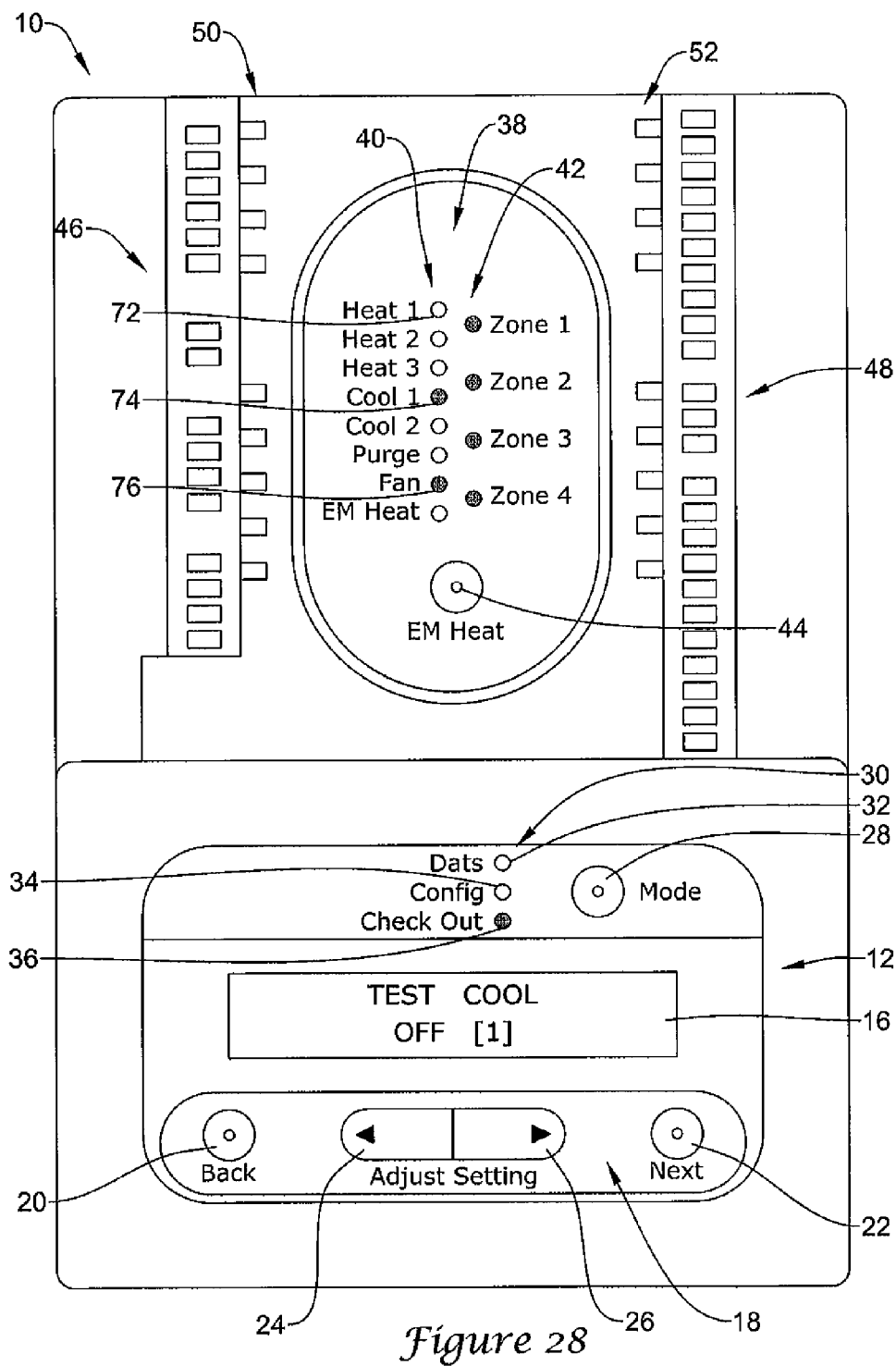

This may be confirmed by reviewing secondary control panel 38, in which none of the HVAC status lights 40 are lit. In particular, cool 1 light 74 is not lit. However, if a user decides to test the first cooling stage, they can so do by toggling to the desired selection, as seen in FIG. 28. In FIG. 28, it can be seen that the cool 1 light 74 has now been lit. In some instances, a fan light 76 may also be lit when the cooling equipment is operating. In some cases, cool 1 light 74 and/or fan light 76 may be green, but this is not required. Once the cooling equipment has been satisfactorily tested, a user may scroll to the menu screen shown in FIG. 29 by pressing the next button 22.

Figure 29:
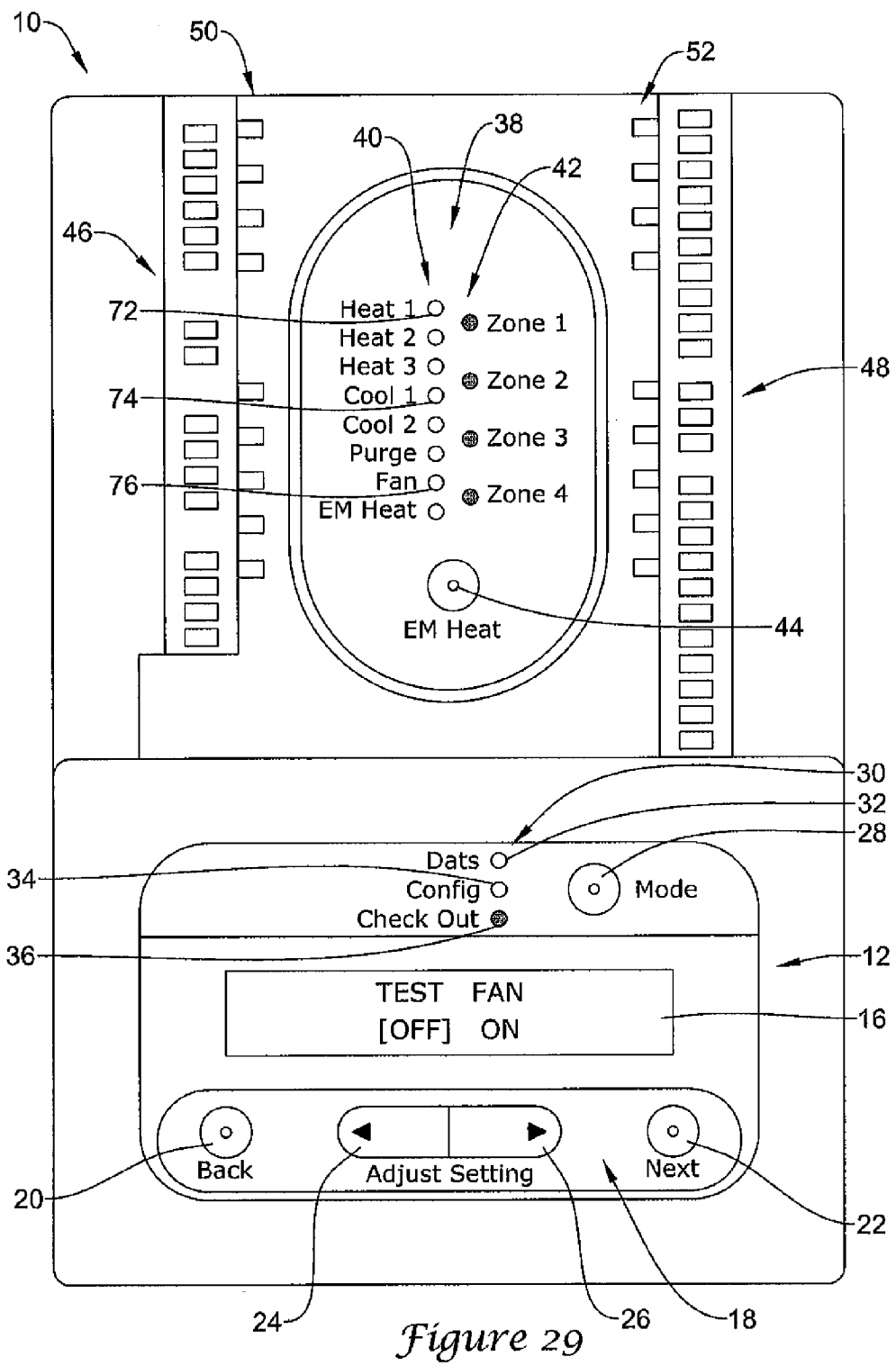

FIG. 29 provides a view of zone control panel 10 displaying a menu screen in which controller 14 (FIG. 1) permits a user to test the HVAC fan. Display 16 provides an indication of what HVAC equipment is to be tested, as well as providing options that can be toggled between using the first arrow button 24 and/or the second arrow button 26. In this case, a user can toggle between not energizing the fan, and energizing the fan. As shown in FIG. 29, no equipment is being energized.

Figure 30:
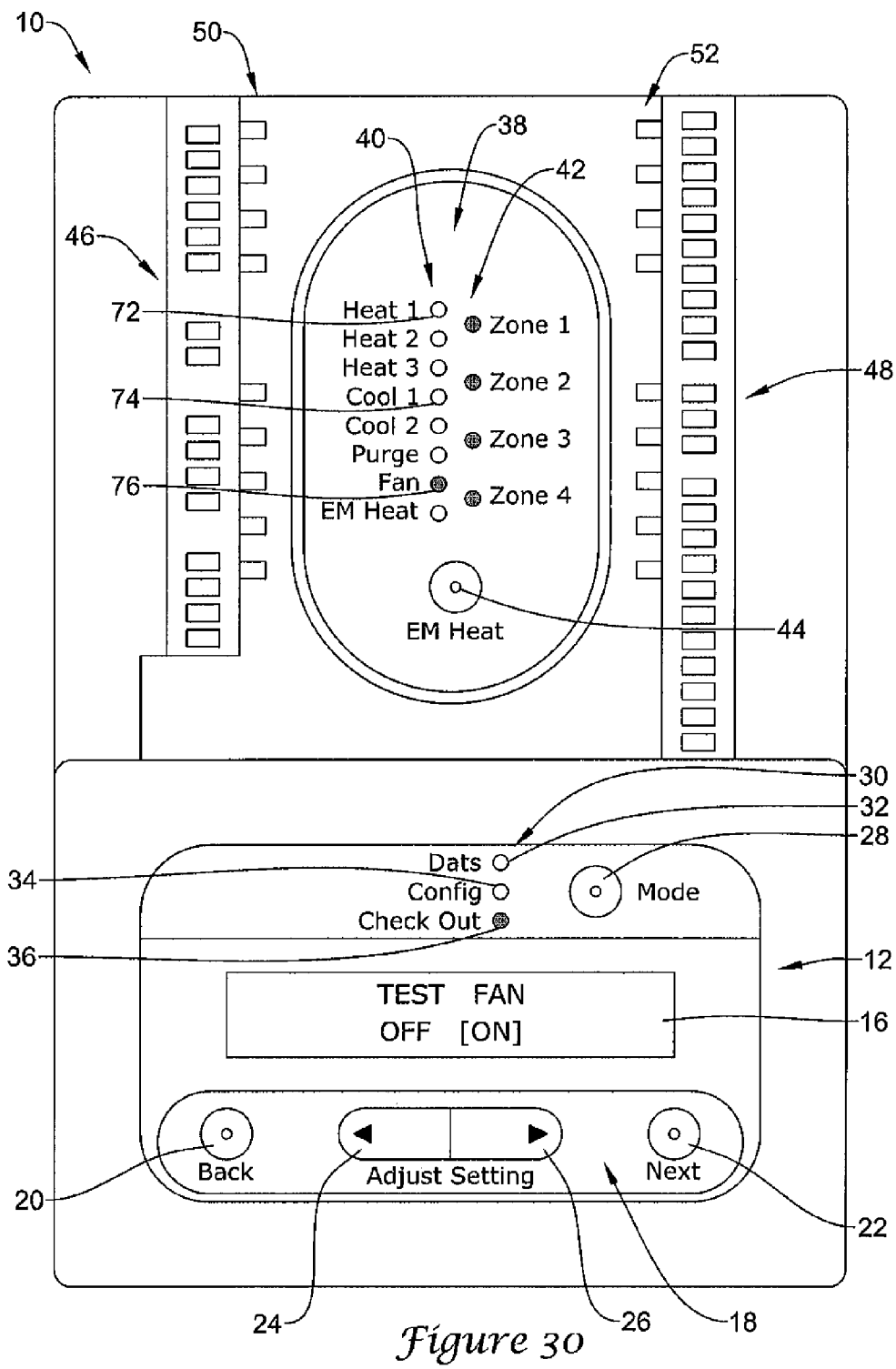

This may be confirmed by reviewing secondary control panel 38, in which none of the HVAC status lights 40 are lit, and in particular fan light 76. However, if a user decides to test the fan, they can so do by toggling to the desired selection, as seen in FIG. 30. In FIG. 30, it can be seen that the fan light 76 has now been lit. Once the cooling equipment has been satisfactorily tested, a user may scroll to the menu screen shown in FIG. 31 by pressing the next button 22.

FIGS. 31 through 38 illustrate menu screens in which a user is permitted to selectively open and/or close the dampers relating to each of the zones that are connected to zone control panel 10, thereby testing the connections as well as the dampers themselves. In some cases, the fan may be energized during the damper test, as evidenced by fan light 76. As illustrated, secondary control panel 38 is configured to provide information pertaining to a total of four zones, but it will be recognized that in some instances, secondary control panel 38 may be configured to accommodate a greater number of zones if desired. In the configuration mode (see FIG. 8), the user specified that there were a total of four zones connected. In the illustrated embodiment, each zone damper defaults to open, but this is not required.

Figure 31:
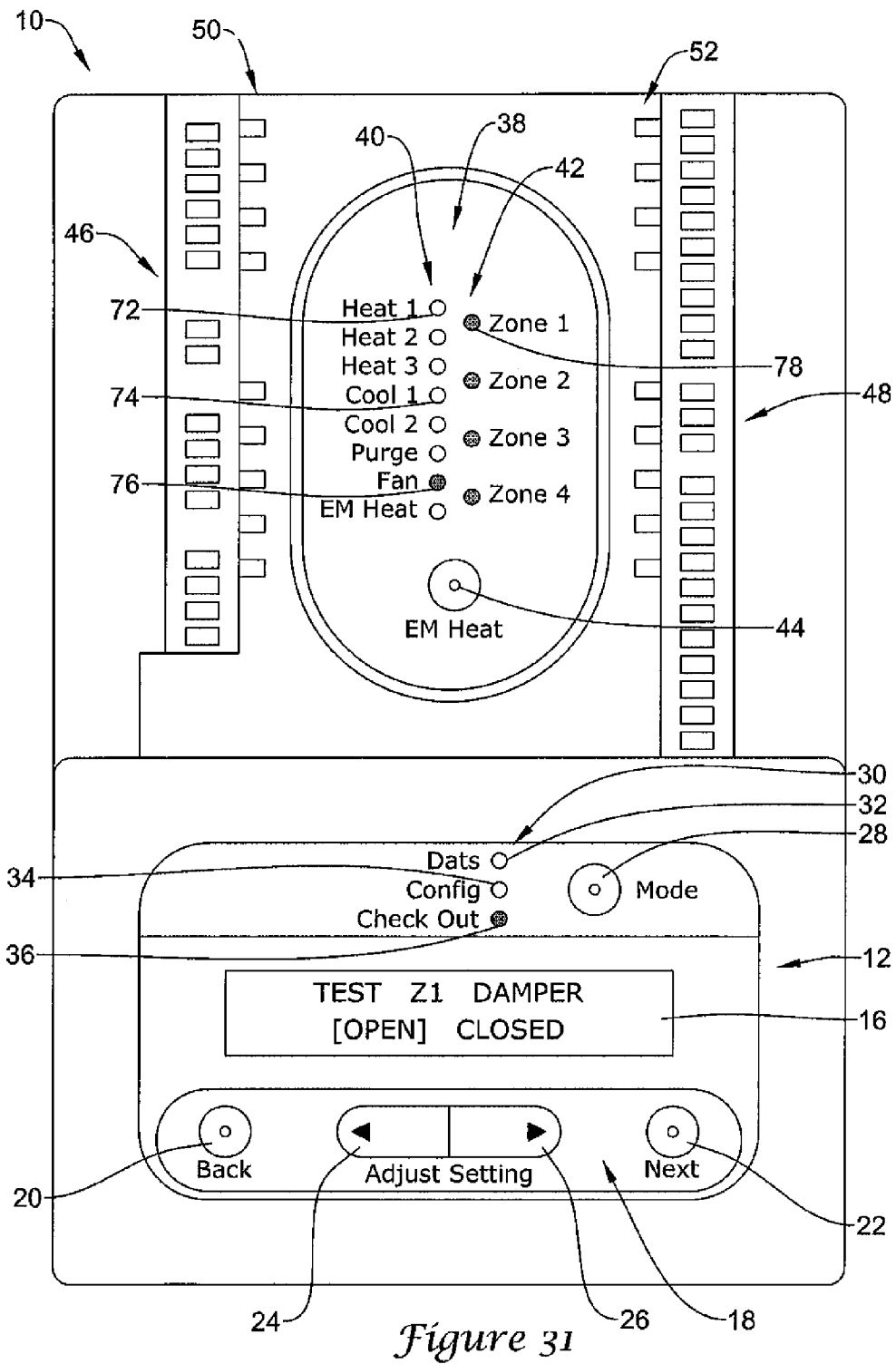

FIG. 31 provides a view of zone control panel 10 displaying a menu screen in which controller 14 (FIG. 1) permits a user to test the zone one damper. Display 16 provides an indication of what HVAC equipment is to be tested, as well as providing options that can be toggled between using the first arrow button 24 and/or the second arrow button 26. In this case, a user can toggle between opening the damper and closing the damper. As shown in FIG. 31, the damper is left open.

Figure 32:
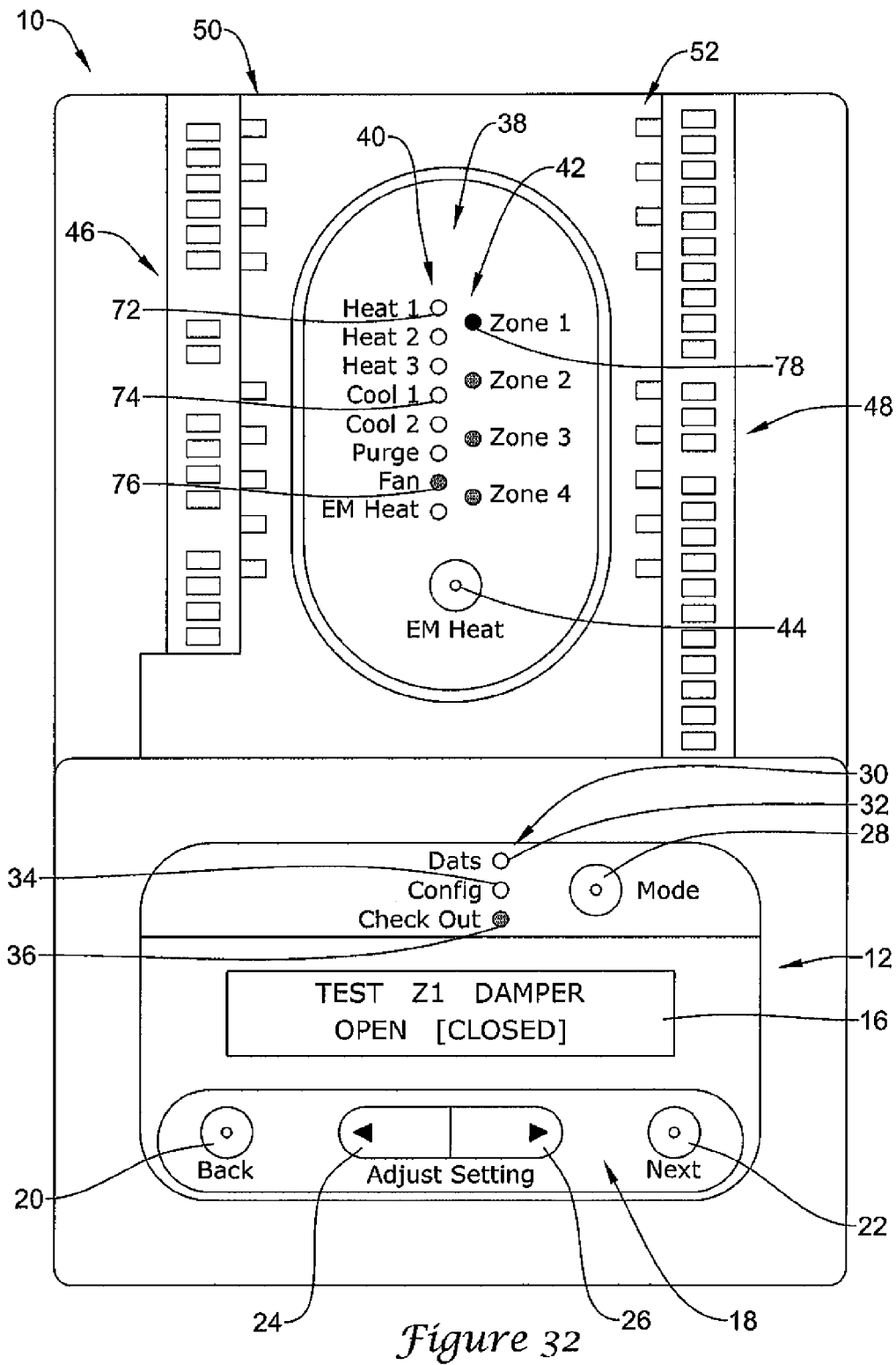

This may be confirmed by reviewing secondary control panel 38, in which all of the zone lights 42 are lit. In particular, zone 1 light 78 is lit green indicating that the damper is open. However, if a user decides to close the first zone damper, they can so do by toggling to the desired selection, as seen in FIG. 32. In FIG. 32, it can be seen that the zone 1 light 78 has now changed colors to red. In some instances, a green light may indicate an open damper while a red light may indicate a closed damper, but this is not required. Once the first zone damper has been satisfactorily tested, a user may scroll to the menu screen shown in FIG. 33 by pressing the next button 22.

Figure 33:
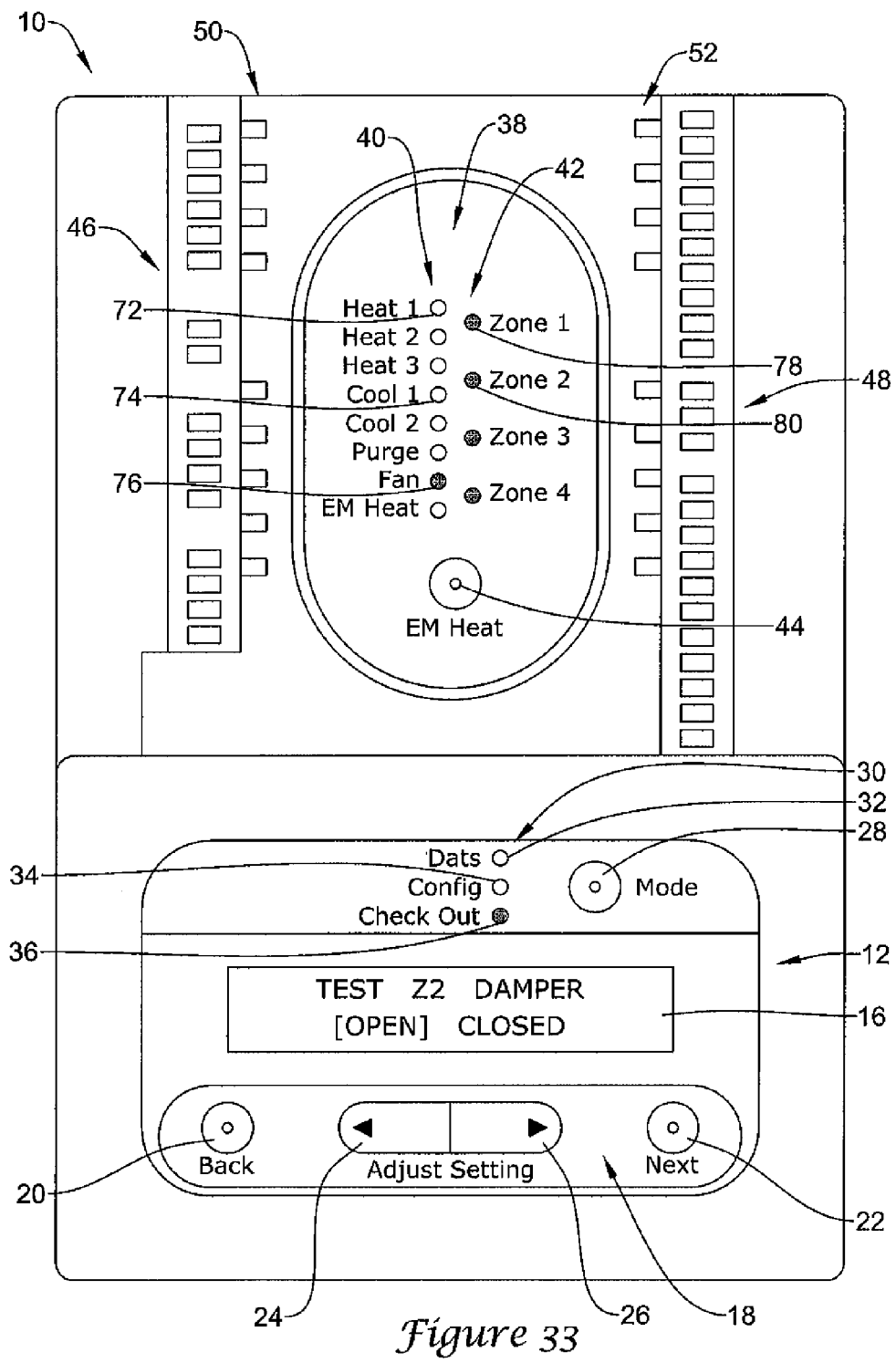

FIG. 33 provides a view of zone control panel 10 displaying a menu screen in which controller 14 (FIG. 1) permits a user to test the zone two damper. Display 16 provides an indication of what HVAC equipment is to be tested, as well as providing options that can be toggled between using the first arrow button 24 and/or the second arrow button 26. In this case, a user can toggle between opening the damper and closing the damper. As shown in FIG. 33, the damper is left open.

Figure 34:
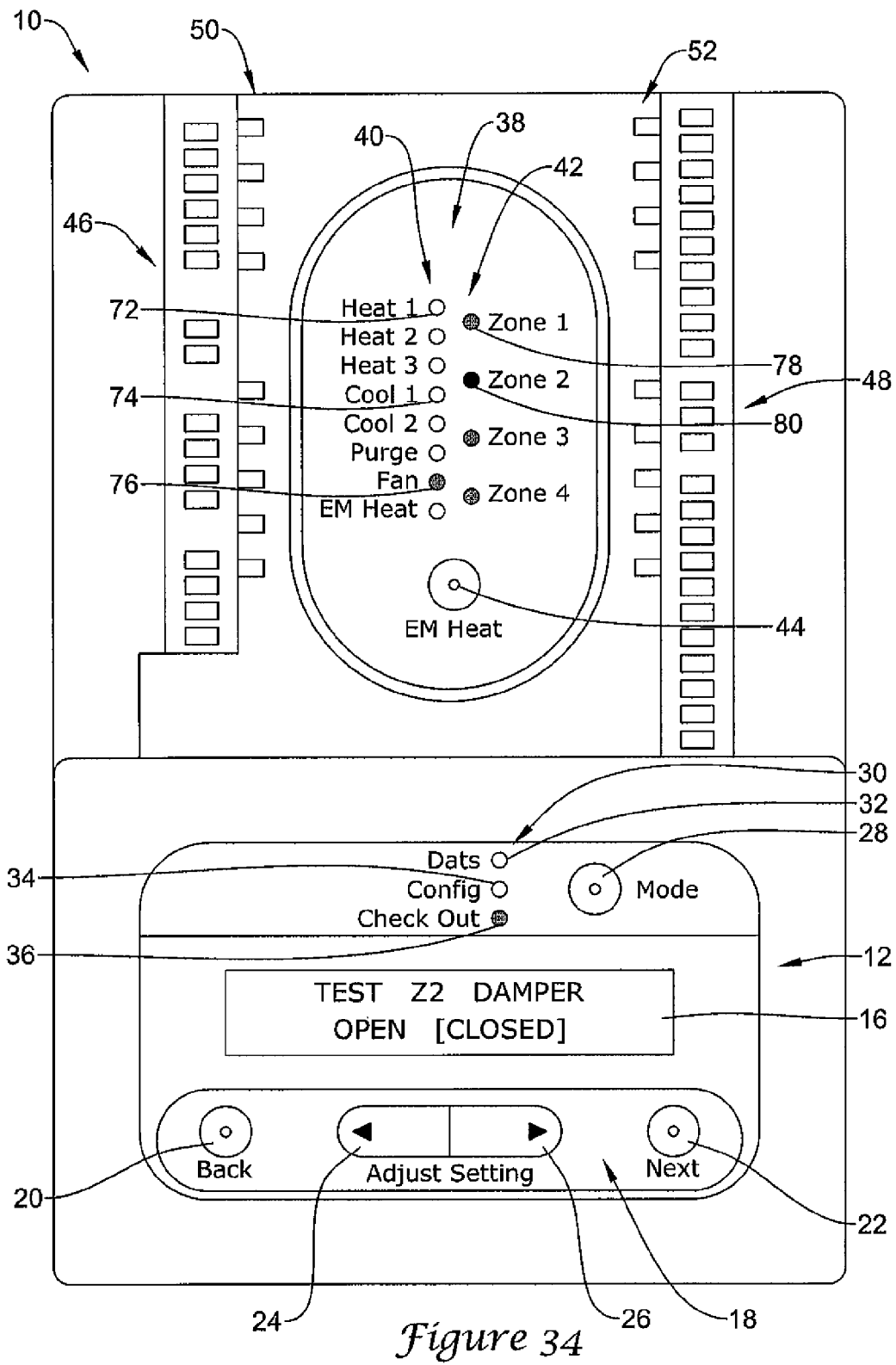

This may be confirmed by reviewing secondary control panel 38, in which all of the zone lights 42 are lit in green, and in particular, zone 2 light 80 is lit green. However, if a user decides to close the second zone damper, they can so do by toggling to the desired selection, as seen in FIG. 34. In FIG. 34, it can be seen that the zone 2 light 80 has now changed colors or red, indicating that the zone two damper is closed. In some instances, a green light may indicate an open damper while a red light may indicate a closed damper, but this is not required. Once the second zone damper has been satisfactorily tested, a user may scroll to the menu screen shown in FIG. 35 by pressing the next button 22.

Figure 35:
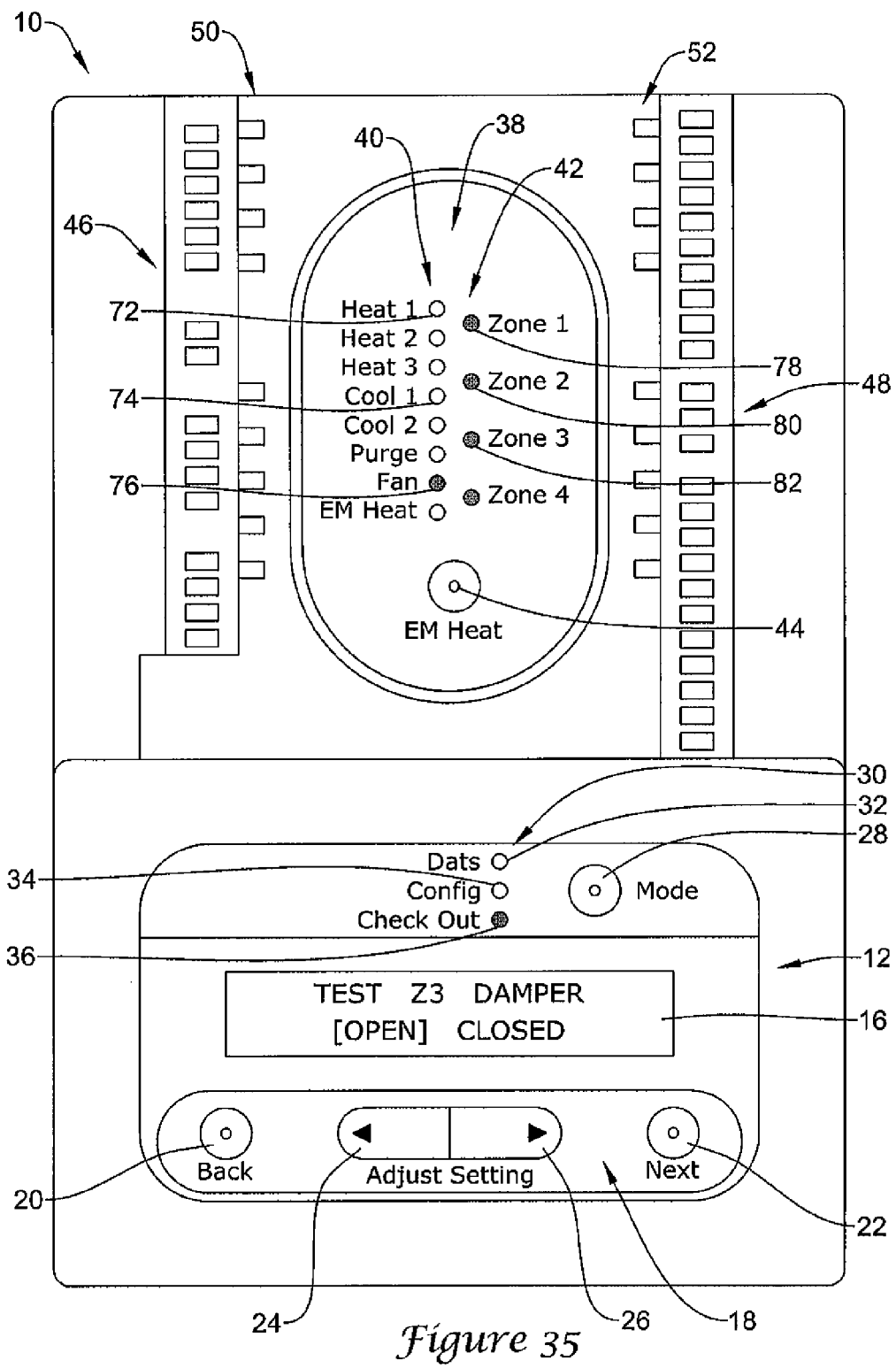

FIG. 35 provides a view of zone control panel 10 displaying a menu screen in which controller 14 (FIG. 1) permits a user to test the zone three damper. Display 16 provides an indication of what HVAC equipment is to be tested, as well as providing options that can be toggled between using the first arrow button 24 and/or the second arrow button 26. In this case, a user can toggle between opening the damper and closing the damper. As shown in FIG. 35, the damper is left open.

Figure 36:
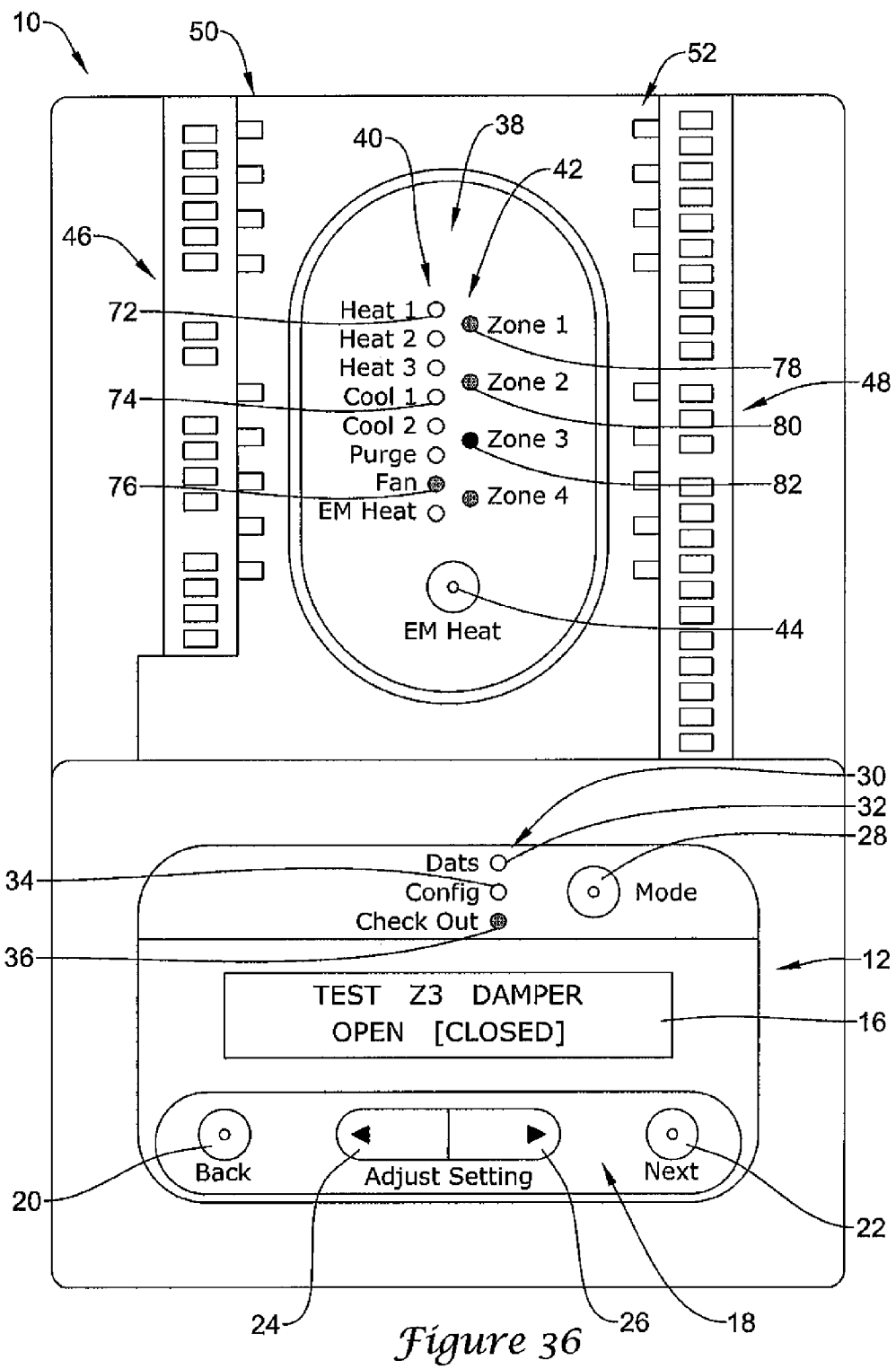

This may be confirmed by reviewing secondary control panel 38, in which all of the zone lights 42 are lit green, and in particular, zone 3 light 82 is lit green. However, if a user decides to close the third zone damper, they can so do by toggling to the desired selection, as seen in FIG. 36. In FIG. 36, it can be seen that the zone 3 light 82 has now changed colors to red. In some instances, a green light may indicate an open damper while a red light may indicate a closed damper, but this is not required. Once the third zone damper has been satisfactorily tested, a user may scroll to the menu screen shown in FIG. 37 by pressing the next button 22.

Figure 37:
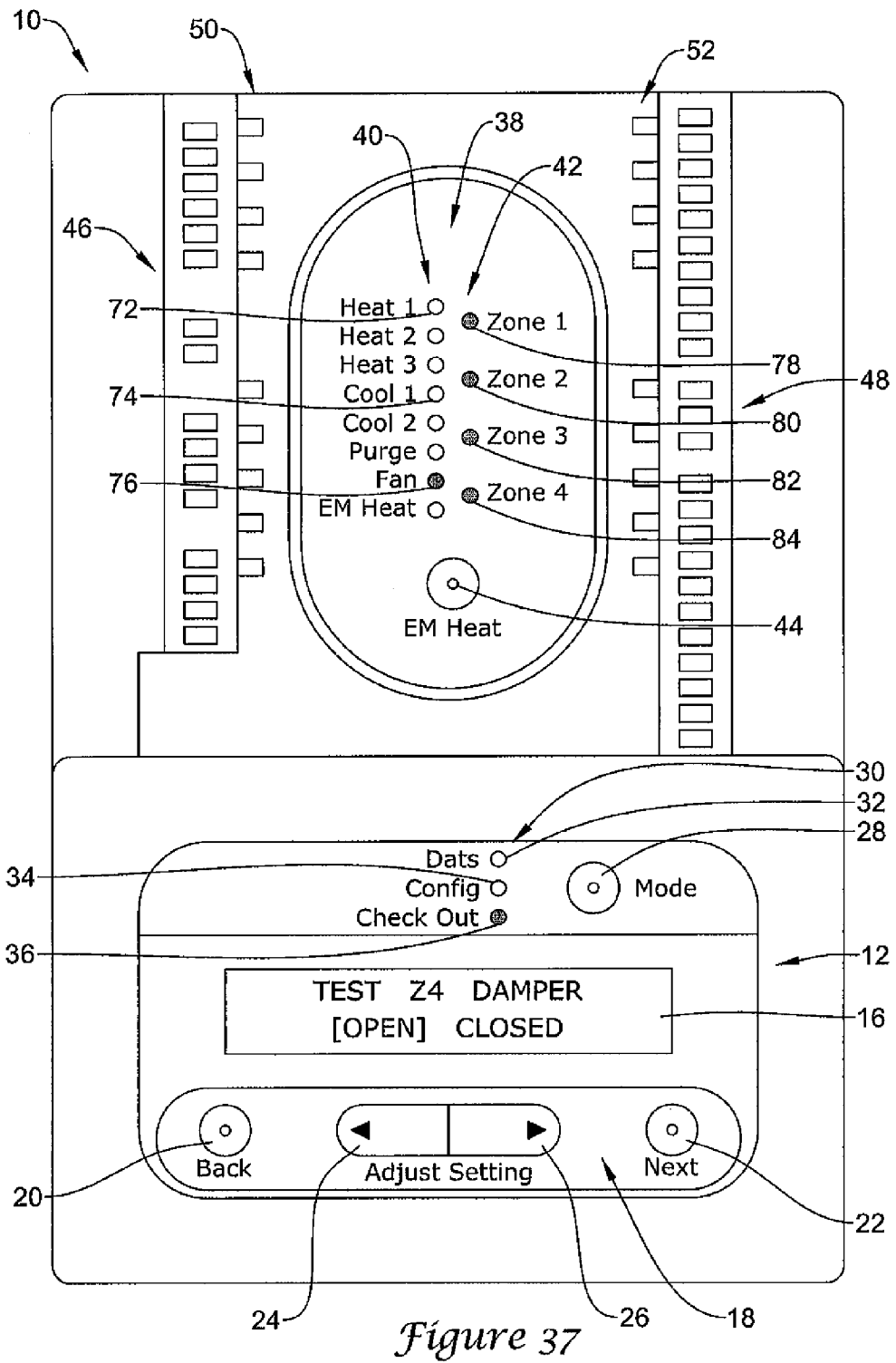

FIG. 37 provides a view of zone control panel 10 displaying a menu screen in which controller 14 (FIG. 1) permits a user to test the zone four damper. Display 16 provides an indication of what HVAC equipment is to be tested, as well as providing options that can be toggled between using the first arrow button 24 and/or the second arrow button 26. In this case, a user can toggle between opening the damper and closing the damper. As shown in FIG. 37, the damper is left open.

Figure 38:
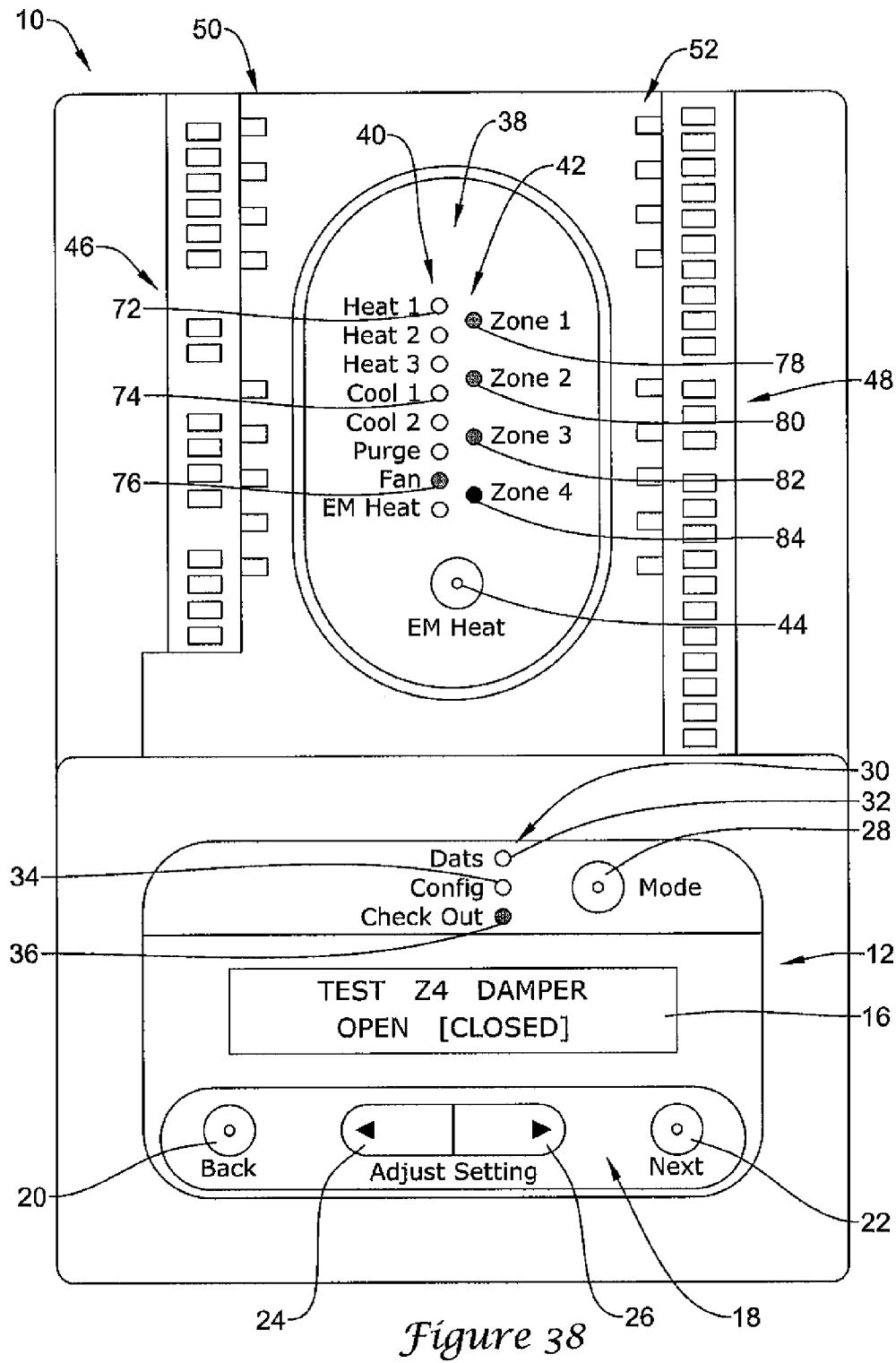

This may be confirmed by reviewing secondary control panel 38, in which all of the zone lights 42 are lit green, and in particular, zone 4 light 84 is lit green. However, if a user decides to close the fourth zone damper, they can so do by toggling to the desired selection, as seen in FIG. 38. In FIG. 38, it can be seen that the zone 4 light 84 has now changed colors to red. In some instances, a green light may indicate an open damper while a red light may indicate a closed damper, but this is not required. Once the fourth zone damper has been satisfactorily tested, a user may scroll to the menu screen shown in FIG. 39 by pressing the next button 22.

FIGS. 39 through 42 illustrate menu screens in which a user is permitted to check connections between zone control panel 10 and the thermostats that are connected to zone control panel 10. In some cases, each of the thermostats such as first thermostat 56, second thermostat 58, third thermostat 60 and fourth thermostat 62 (see FIG. 3) may be individually set to a particular operating condition. Zone control panel 10 is configured to permit an individual to scroll through a series of menu screens to confirm that zone control panel 10 is receiving appropriate signals from each of the thermostats and therefore a user is able to easily confirm that each of the thermostats are correctly connected (e.g. wired) to zone control panel 10 and that each of the thermostats are functioning correctly.

Figure 39:
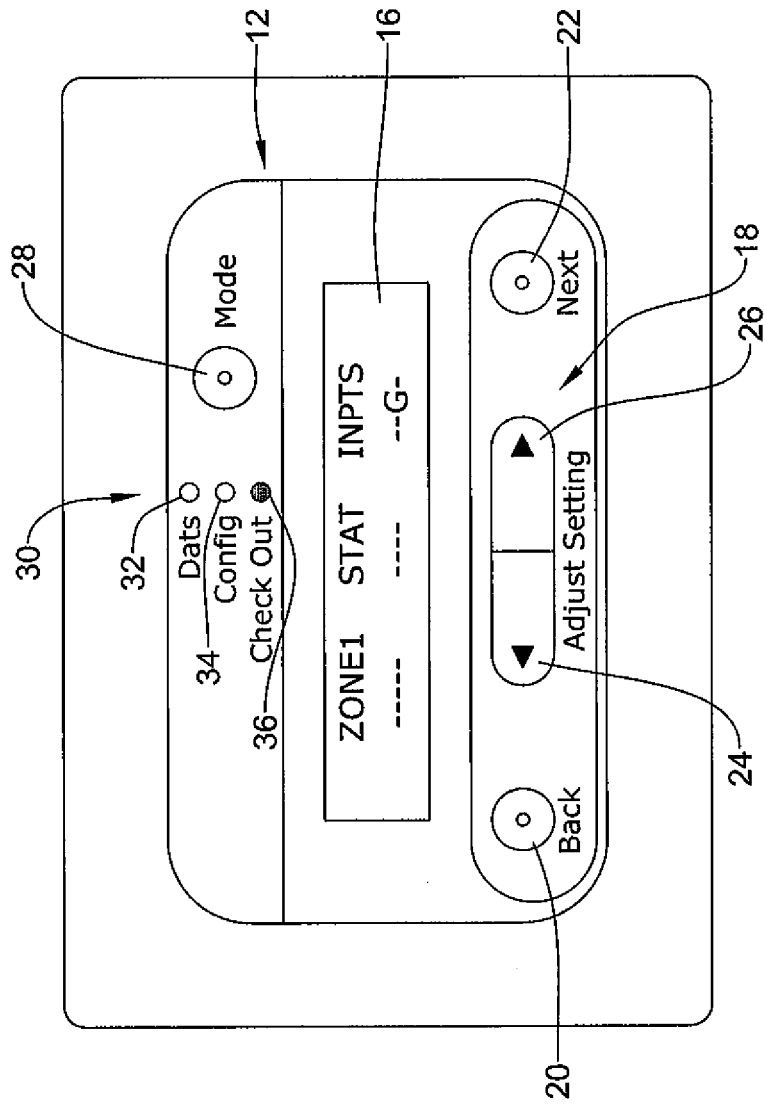

In FIG. 39, controller 14 (FIG. 1) is providing a menu screen in which display 16 provides information relating to the signals being received from the thermostat for zone one. It can be seen that the thermostat in zone one has been set to call for the fan to operate, as indicated by the G pin being energized. If the zone control panel indicates that a different pin is energized, such as a W1 pin, then the user may need to diagnose a wiring error between the thermostat and the zone control panel. Pushing the next button 22 may result in the display of the menu screen shown in FIG. 40.

Figure 40:
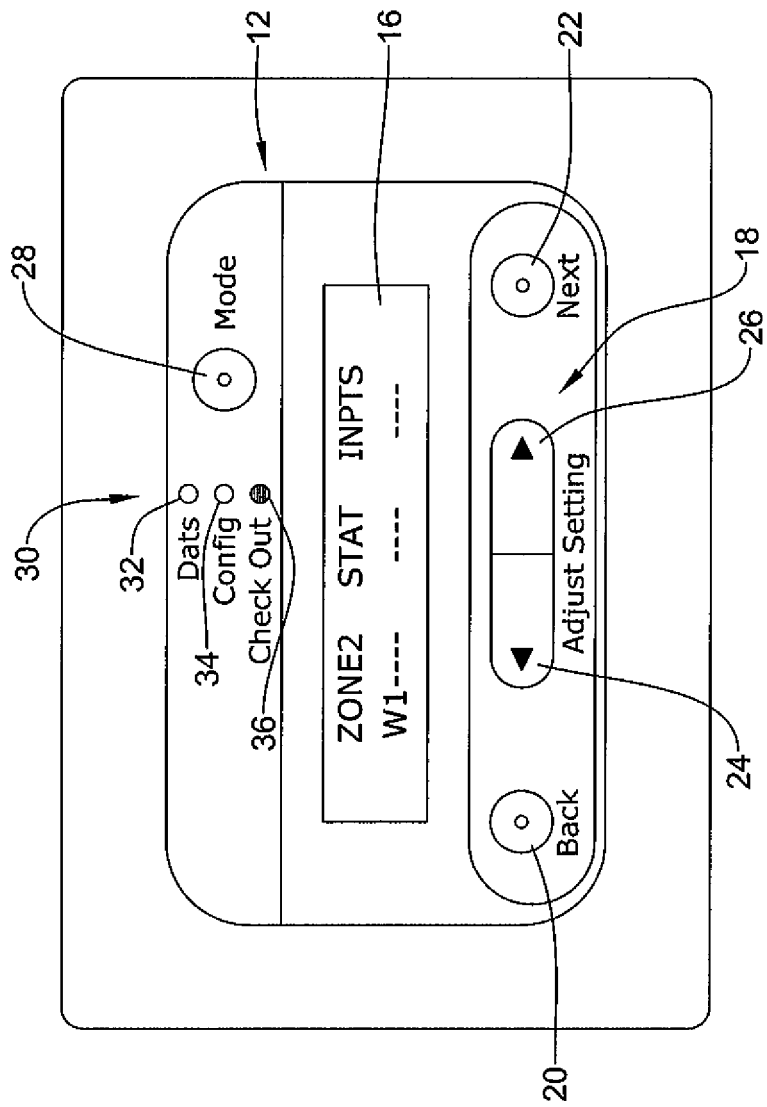

In FIG. 40, controller 14 (FIG. 1) is providing a menu screen in which display 16 provides information relating to the signals being received from the thermostat in zone two. It can be seen that the thermostat in zone two has been set to call for first stage heating, as indicated by the W1 pin being energized. Again, if the zone control panel indicates that a different pin is energized, then the user may need to diagnose a wiring error between the thermostat and the zone control panel. Pushing the next button 22 will permit a user to scroll to the menu screen shown in FIG. 41.

Figure 41:
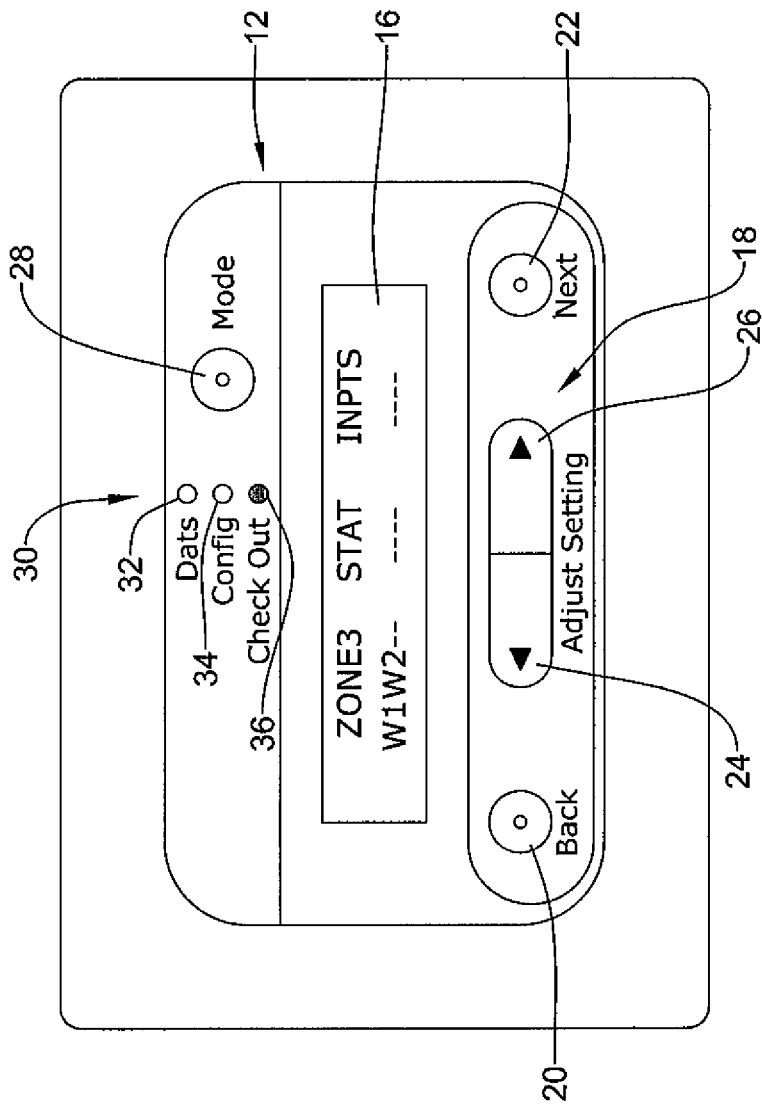

In FIG. 41, controller 14 (FIG. 1) is providing a menu screen in which display 16 provides information relating to the signals being received from the thermostat in zone three. It can be seen that the thermostat in zone three has been set to call for first and second stage heating, as indicated by the W1 pin and the W2 pin being energized. Like above, if the zone control panel indicates that a different pin or set of pins is energized, then the user may need to diagnose a wiring error between the thermostat and the zone control panel. Pushing the next button 22 will permit a user to scroll to the menu screen shown in FIG. 42.

Figure 42:
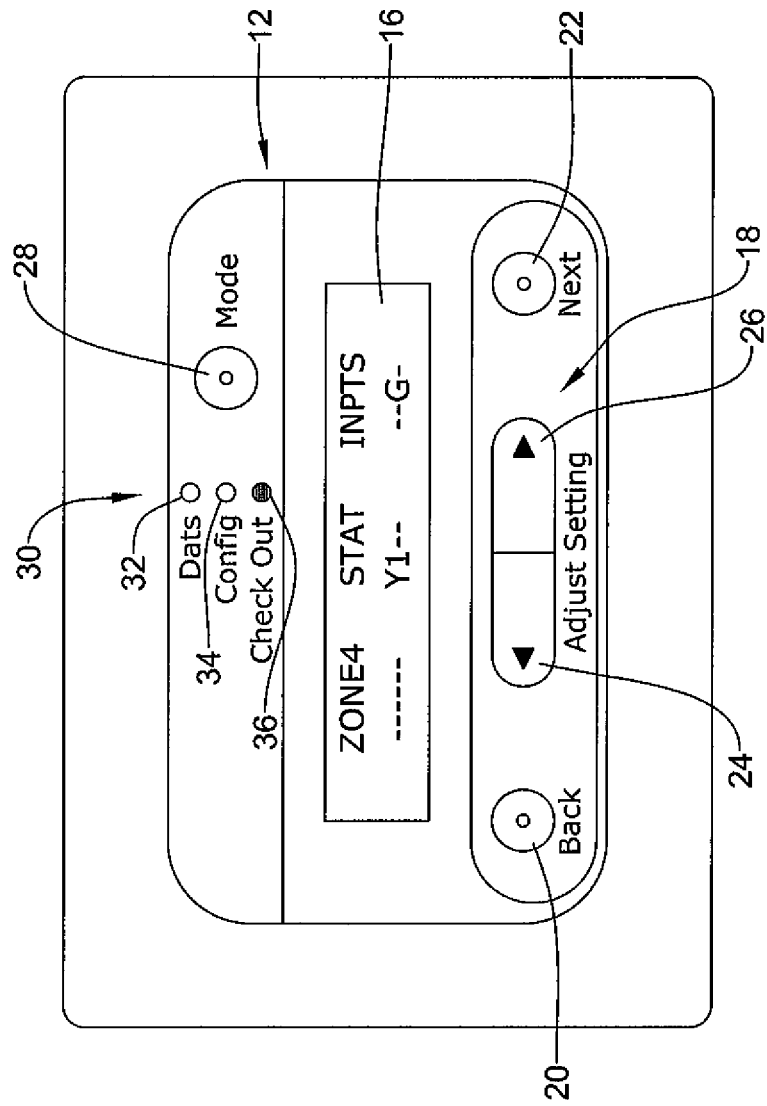

In FIG. 42, controller 14 (FIG. 1) is providing a menu screen in which display 16 provides information relating to the signals being received from the thermostat in zone four. It can be seen that the thermostat in zone four has been set to call for first stage cooling, and that the fan is operational, as indicated by the Y1 pin and the G pin being energized. If the zone control panel indicates that a different pin or set of pins is energized, then the user may need to diagnose a wiring error between the thermostat and the zone control panel. Pushing the next button 22 will permit a user to scroll to the menu screen shown in FIG. 43.

Figure 43:
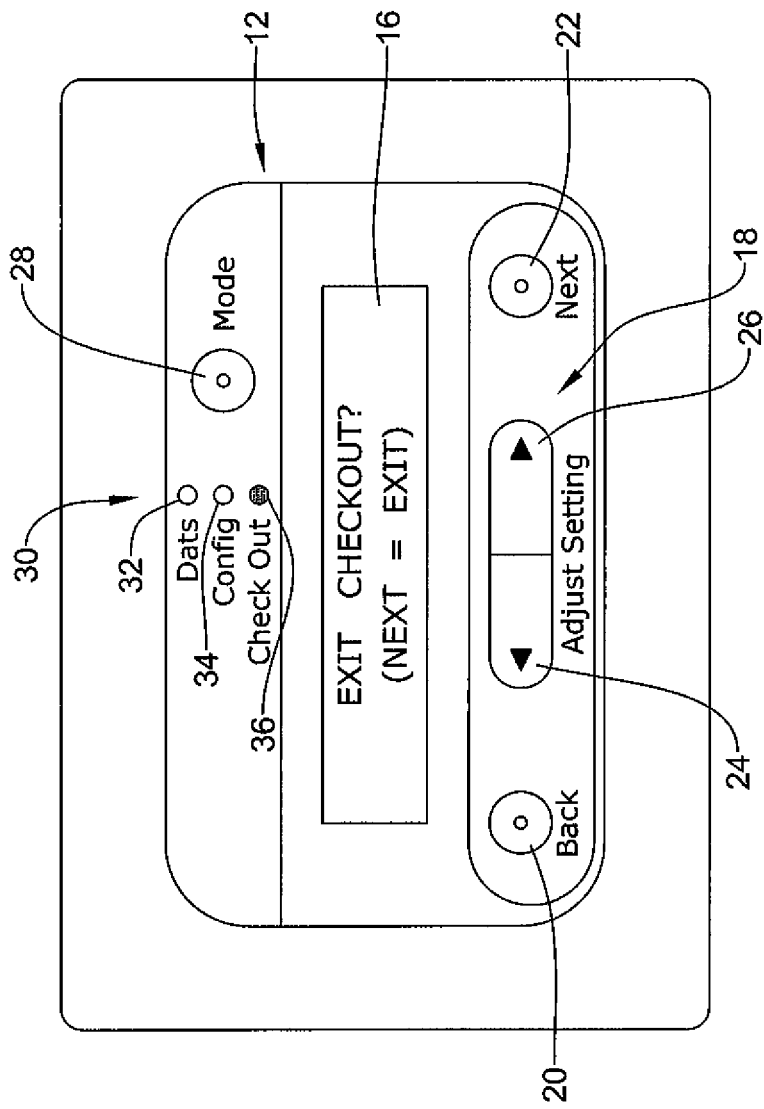

In FIG. 43, controller 14 (FIG. 1) is providing a menu screen in which display 16 provides a user with information regarding how to exit the checkout mode. At this point, a user could decide to scroll backwards through one or more menu screens by pushing the back button 20 an appropriate number of times if, for example, he/she wanted to recheck and/or change one or more items within the checkout mode. However, if the user decides to exit the checkout mode, they may do so by pressing the next button 22.

In the illustrative checkout mode discussed above, a user has moved sequentially from menu screen to menu screen, i.e., from FIG. 30 to FIG. 31, from FIG. 31 to FIG. 32, and so on. It will be recognized that a user may also move sequentially backwards through the menu. For example, a user could be at the menu screen depicted in FIG. 35, for example, and return to the menu screen depicted in FIG. 34 simply by pressing the back button 20. In some instances, a user may move forwards and backwards as desired.

A user may scroll through one or more menu screens within the checkout mode without selecting/changing any equipment, zone damper and/or thermostat tests, if desired, by using the next button 22 and/or the back button 20, as appropriate. For example, perhaps all equipment, zone dampers and thermostats have already been tested, and an error was found. Once the error has been corrected, a user may wish to test only the affected equipment, zone damper or thermostat without taking the time to retest everything else.

In the Figures discussed thus far, a user may change between one or more modes programmed or otherwise present within zone control panel 10 via mode selector button 28 and may receive visible confirmation of the selected mode via mode light set 30, which may, if desired, include one or more of operational mode light 32, configuration mode light 34 and checkout mode light 36. FIGS. 44 through 49 provide illustrative alternatives to one or both of mode selector button 28 and mode indicator light set 30.

Figure 44:
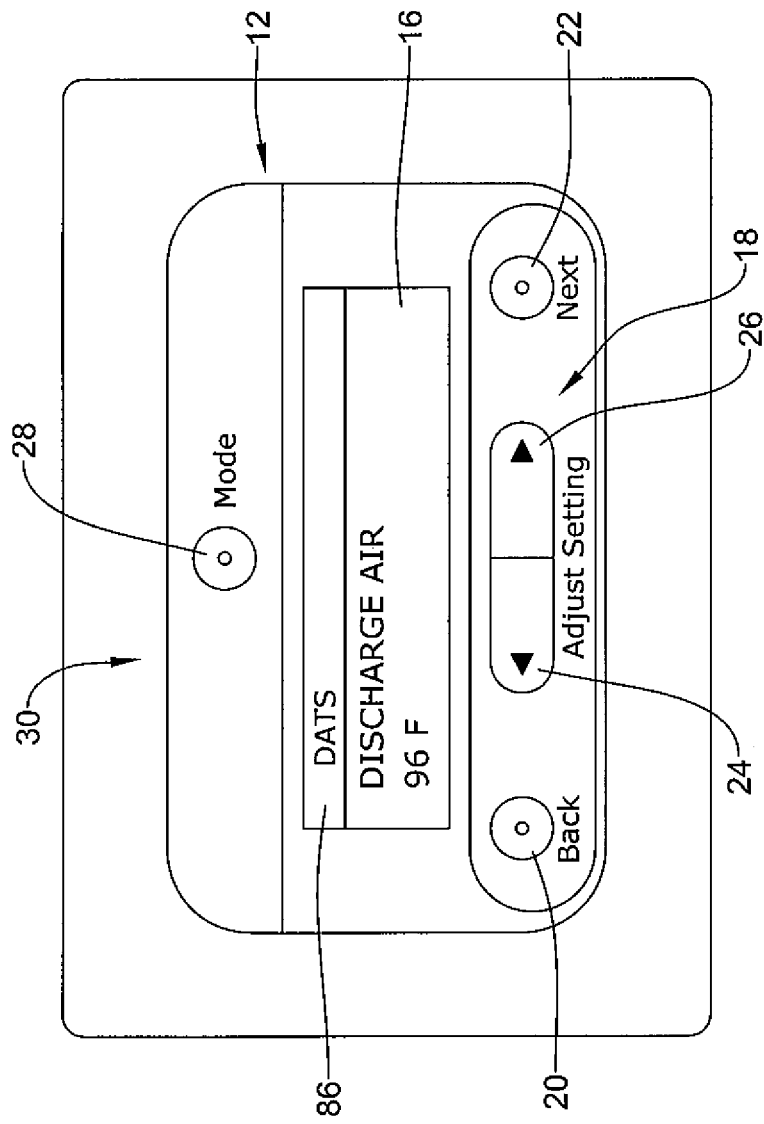
FIGS. 44 through 49 are front views of a portion of a zone control panel, showing examples of mode selection and mode indicator elements.

In some cases, zone control panel 10 may include mode selector button 28 but not include mode indicator light set 30. FIG. 44 shows a portion of zone control panel 10 in which display 16 includes an additional display section 86. In some instances, controller 14 may generate an alphanumeric or iconic image within display section 86 that informs a user as to what mode zone control panel 10 is in. In some cases, additional display section 86 may be adjacent to display 16. In some instances, additional display section 86 may be an integral part of display 16. Like the mode indicator light set 30, it is contemplated that the additional display section 86 may be considered a mode indicator.

While text is displayed in the illustrated embodiment, it will be recognized that distinctive icons could be displayed. For example, display section 86 could display an image of a hard hat to denote the configuration mode, or perhaps an image of a checkmark to denote the checkout mode. Any informative icon or clip art could be used, as desired.

In the embodiment shown in FIG. 44, zone control panel 10 is in the DATS, or operational, mode. This Figure may be compared to FIG. 4, which as previously discussed, also demonstrates zone control panel 10 in the DATS, or operational, mode. In FIG. 44, controller 14 (FIG. 1) indicates the mode by displaying "DATS", or some other indicator, within display section 86 while in FIG. 4, controller 14 provides similar information by illuminating operational mode light 32.

Figure 45:
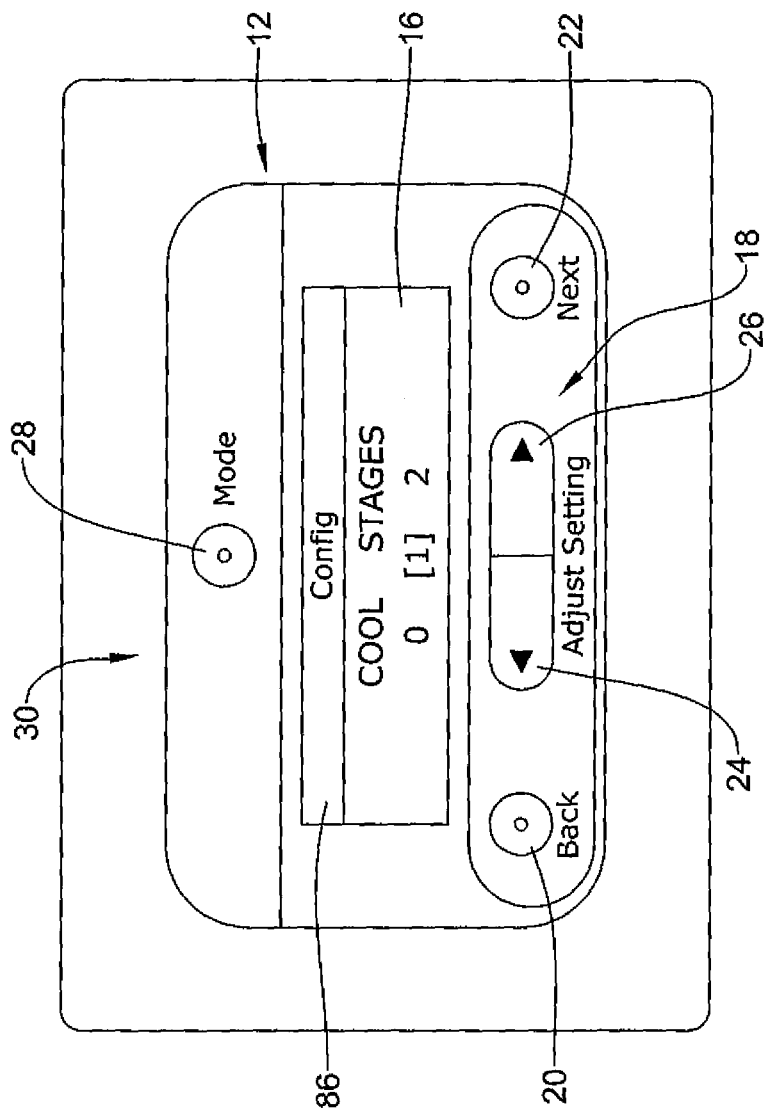

Similarly, FIG. 45 shows a portion of zone control panel 10 in which additional display section 86 provides an indication that zone control panel 10 is in the configuration mode. In FIG. 45, controller 14 (FIG. 1) indicates the mode by displaying "Config", or some other indicator, within display section 86. This can be compared to FIG. 6, in which controller 14 provides similar information by illuminating configuration mode light 34.

Figure 46:
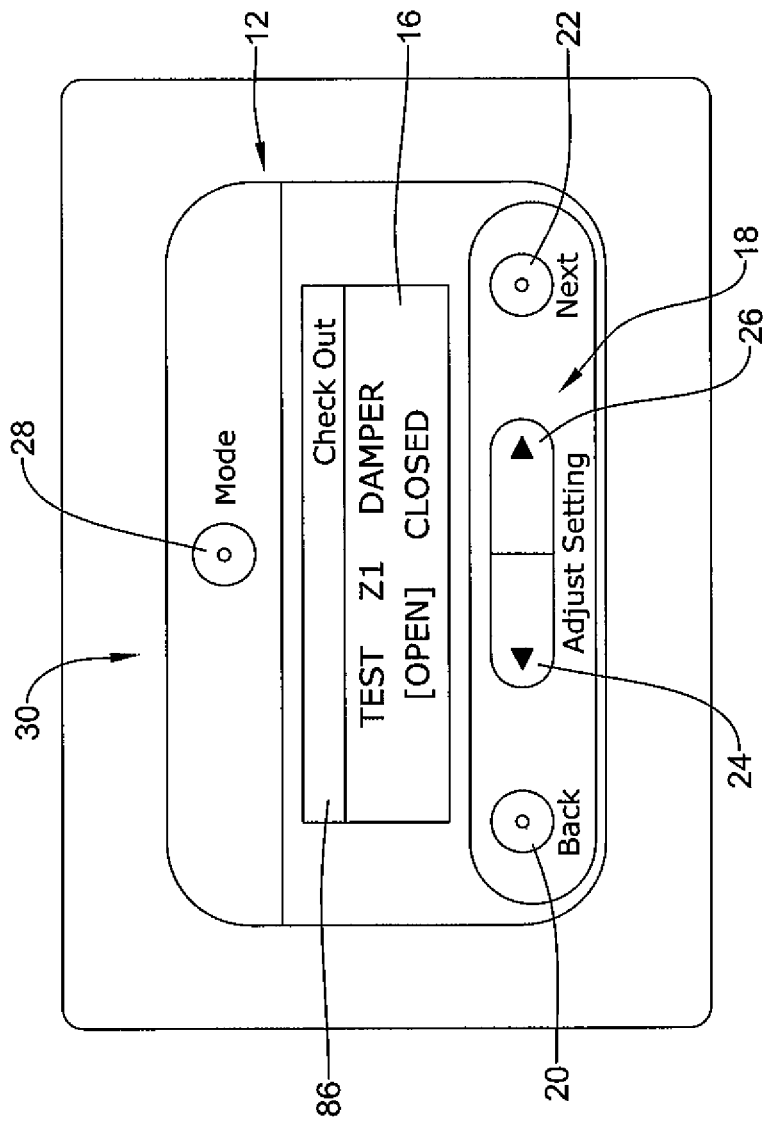

FIG. 46 shows a portion of zone control panel 10 in which additional display section 86 provides an indication that zone control panel 10 is in the checkout mode. In FIG. 46, controller 14 (FIG. 1) indicates the mode by displaying "Check Out", or some other indicator, within display section 86. This can be compared to FIG. 23, in which controller 14 provides similar information by illuminating checkout mode light 36.

Figure 47:
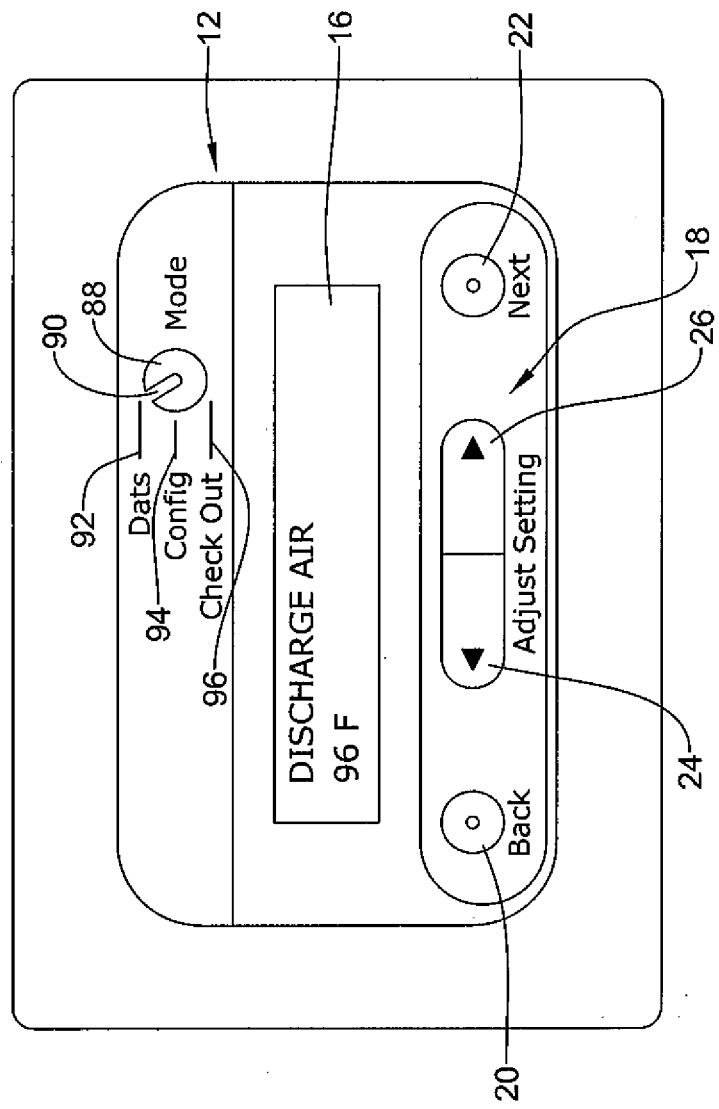
Figure 48:
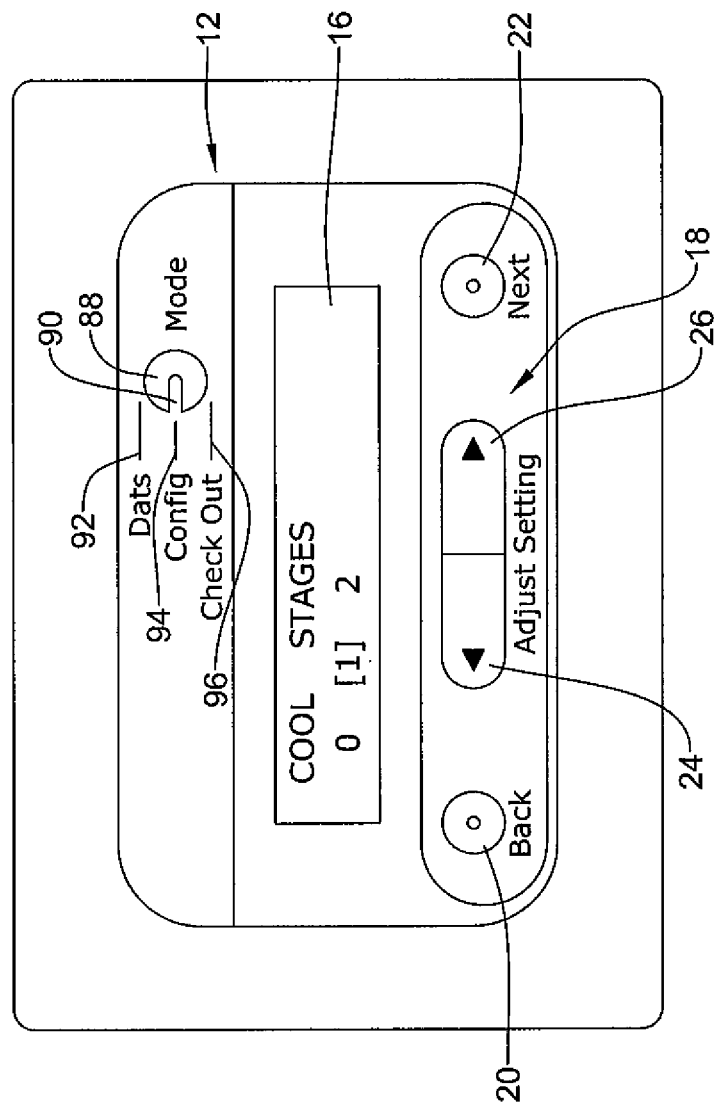
Figure 49:
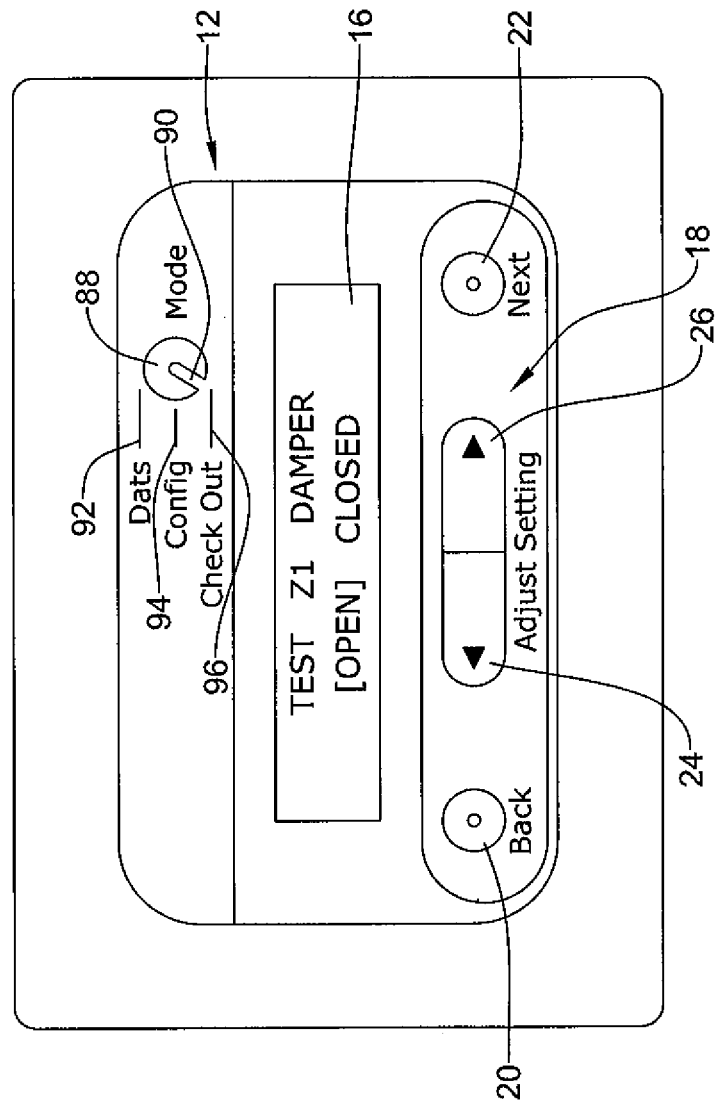

FIGS. 47 through 49 show a portion of zone control panel 10 including another illustrative mode selector and mode indicator. In some cases, and as illustrated, user interface 12 may include a mode selector 88 that may be a rotary dial or switch. A rotary dial or switch may include an electro-mechanical rotary dial or switch, or any other type of rotary dial or switch as desired. In some instances, mode selector 88 may include one or more detents (not shown) that may assist a user in rotating mode selector 88 an appropriate amount. User interface 12 may also include a mode indicator including a pointer 90 that may be a marking on mode selector 88, an indentation within mode selector 88, or the like. Indicia such as a DATS mode indicia 92, a configuration mode indicia 94 and a checkout mode indicia 96 may be disposed proximate mode selector 88 such that pointer 90 in combination with the aforementioned indicia provide an indication of the mode that has been selected.

In the embodiment shown in FIG. 47, zone control panel 10 is in the DATS, or operational, mode. Mode selector 88 has been rotated such that pointer 90 points to (or aligns with) DATS mode indicia 92, thereby showing what mode has been selected. This can be compared with the menu screen shown in FIG. 4, in which controller 14 provides similar information by illuminating operational mode light 32.

Similarly, in FIG. 48, it can be seen that zone control panel 10 is in the configuration mode. Mode selector 88 has been rotated such that pointer 90 points to (or aligns with) configuration mode indicia 94, thereby showing what mode has been selected. This can be compared to FIG. 6, in which controller 14 provides similar information by illuminating configuration mode light 34.

In FIG. 49, it can be seen that zone control panel 10 is in the checkout mode. Mode selector 88 has been rotated such that pointer 90 points to (or aligns with) checkout mode indicia 96, thereby showing what mode has been selected. This can be compared to FIG. 23, in which controller 14 provides similar information by illuminating checkout mode light 36.

In these Figures, mode selector 88 has been illustrated as a rotary dial or switch. In some instances, it is contemplated that mode selector 88 could instead be a slider switch. For example, a slider switch could be mounted in an orientation such that its motion is vertical. In some cases, a slider switch could have an upper position corresponding to DATS mode indicia 92, an intermediate position corresponding to configuration mode indicia 94 and a lower position corresponding to checkout mode indicia 96. It is also contemplated that such a slider switch could be mounted in a horizontal or any other orientation, as desired.

It should also be noted that the Figures show a total of three distinct modes. In some cases, zone control panel 10 may have more or less than three distinct modes. For example, zone control panel 10 may have a history mode, which would permit a user to review operational data going back any desired period of time, such as a day, a week, a month or the like. In some cases, zone control panel 10 may be configured to include a future mode, which may permit an additional mode to be programmed into zone control panel 10 at some future date. Any number of potential modes are contemplated, which may be dependent on the desired application and/or expected use of the zone control panel 10.

Figure 50:
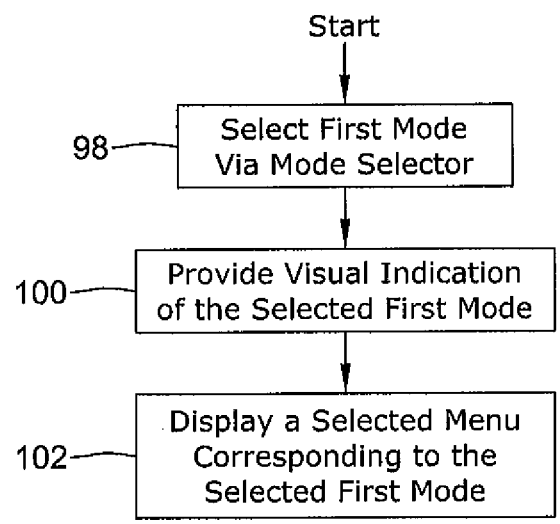
FIG. 50 is a flow diagram showing an illustrative method that may be carried out using the illustrative zone control panel of FIG. 1.

FIG. 50 shows a method that may be carried out using illustrative zone control panel 10. At block 98, a first mode may be selected using a mode selector such as mode selector 28 (FIG. 2) or mode selector 88 (FIGS. 47-49), for example. Control passes to block 100, where a visual indication of the selected mode is provided. In some instances, controller 14 (FIG. 1) may provide textual or graphical information on display 16 (FIG. 1) and/or display section 86 (FIGS. 44-46). In some cases, a visual indication of the selected mode may be provided via mode selector 88 in combination with pointer 90 and indicia 92, 94 and 96 (FIGS. 47-49). Control then passes to block 102, where a selected menu that corresponds to the selected mode is displayed. In some cases, controller 14 may display one or more menu screens that correspond to the selected mode on display 16.

Figure 51:
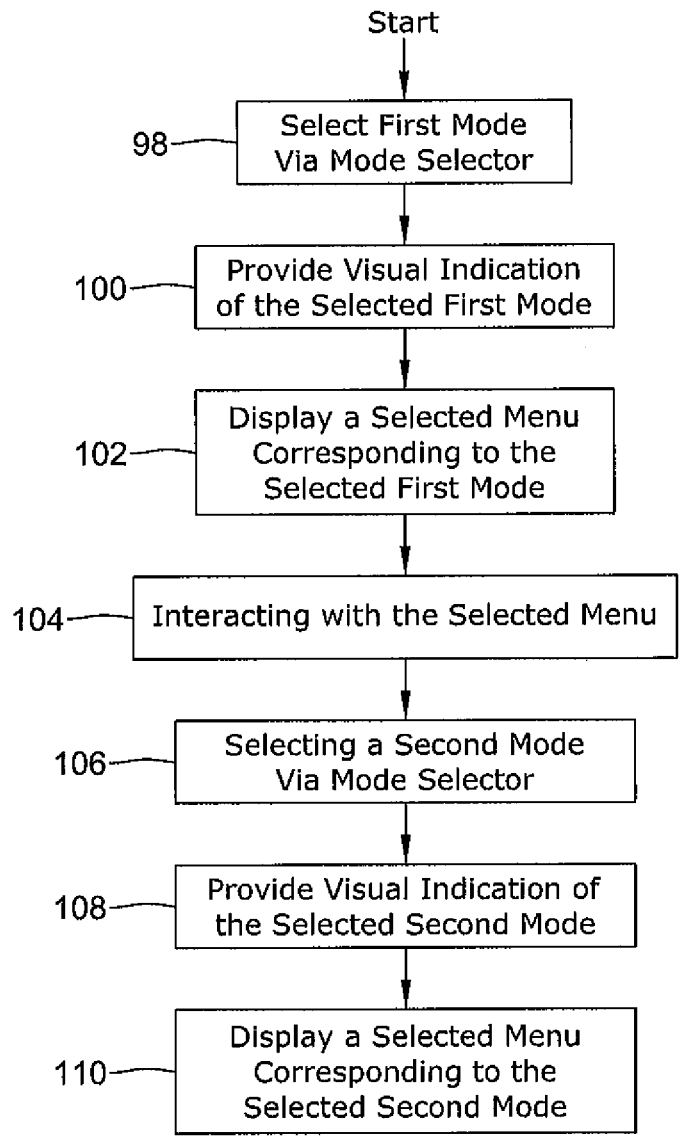
FIG. 51 is a flow diagram showing an illustrative method that may be carried out using the illustrative zone control panel of FIG. 1.

FIG. 51 shows a method that may be carried out using illustrative zone control panel 10. At block 98, a first mode may be selected using a mode selector such as those discussed above with respect to FIG. 50. Control passes to block 100, where a visual indication of the selected mode is provided as discussed above. At block 102, a selected menu that corresponds to the selected mode may be displayed.

Control passes to block 104, where a user is permitted to interact with the selected menu. For example, a user may scroll through the selected menu using the back button 20 (FIG. 2) and the next button 22 (FIG. 2), and/or the user may change parameter settings using the first arrow button 24 (FIG. 2) and the second arrow button 26 (FIG. 2) as discussed with respect to the previous Figures. At block 106, a second mode may be selected using a mode selector. Control then passes to block 108, where a visual indication of the selected mode is provided as discussed above. At block 110, a selected menu that corresponds to the selected mode may be displayed, as discussed above.

Figure 52:
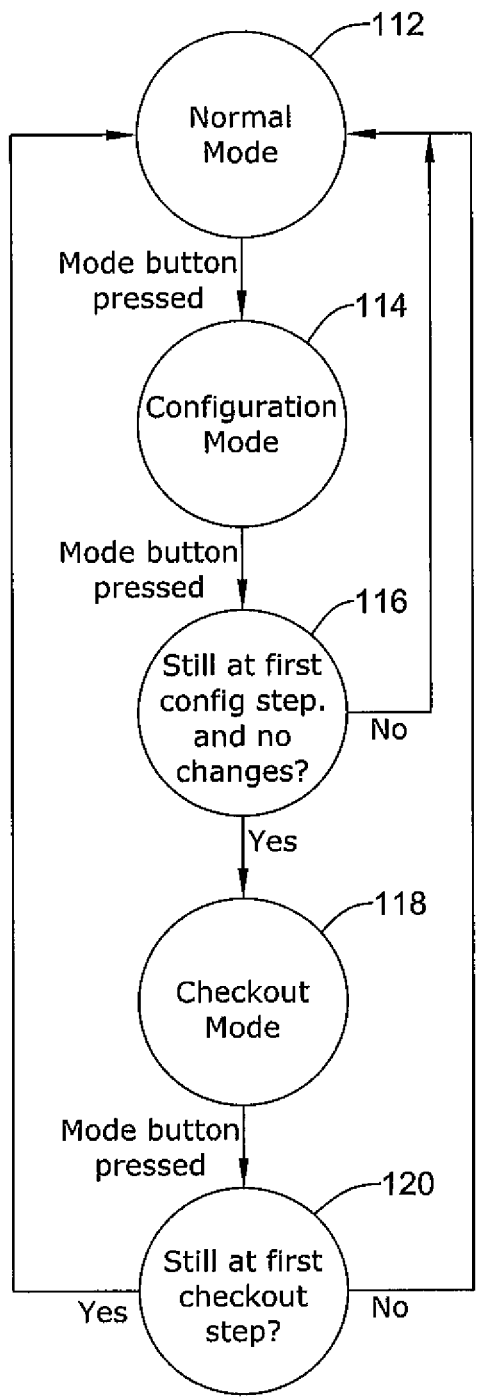
FIG. 52 is a flow diagram showing an illustrative method that may be carried out using the illustrative zone control panel of FIG. 1.

FIG. 52 is a flow diagram that outlines how a user may, if desired, navigate between different modes using zone control panel 10. At block 112, zone control panel 10 may be considered as being in a normal or operational mode. Control passes to block 114 as a mode button (such as mode selector 28 or mode selector 88) is pressed once. At block 114, zone control panel 10 is in a configuration mode as previously discussed. If the mode button is pressed again, control passes to block 116, where controller 14 determines if the user is still at the first configuration step and if no changes have been made. If not, control returns to block 112. If the answer is yes, control passes to block 118 where zone control panel 10 enters a checkout mode. If the mode button is pressed again, control passes to block 120 where controller 14 (FIG. 1) determines if the user is still at an initial or first checkout step. In either event, pressing the mode button while in the checkout mode causes control to return to block 112.

Figure 53:
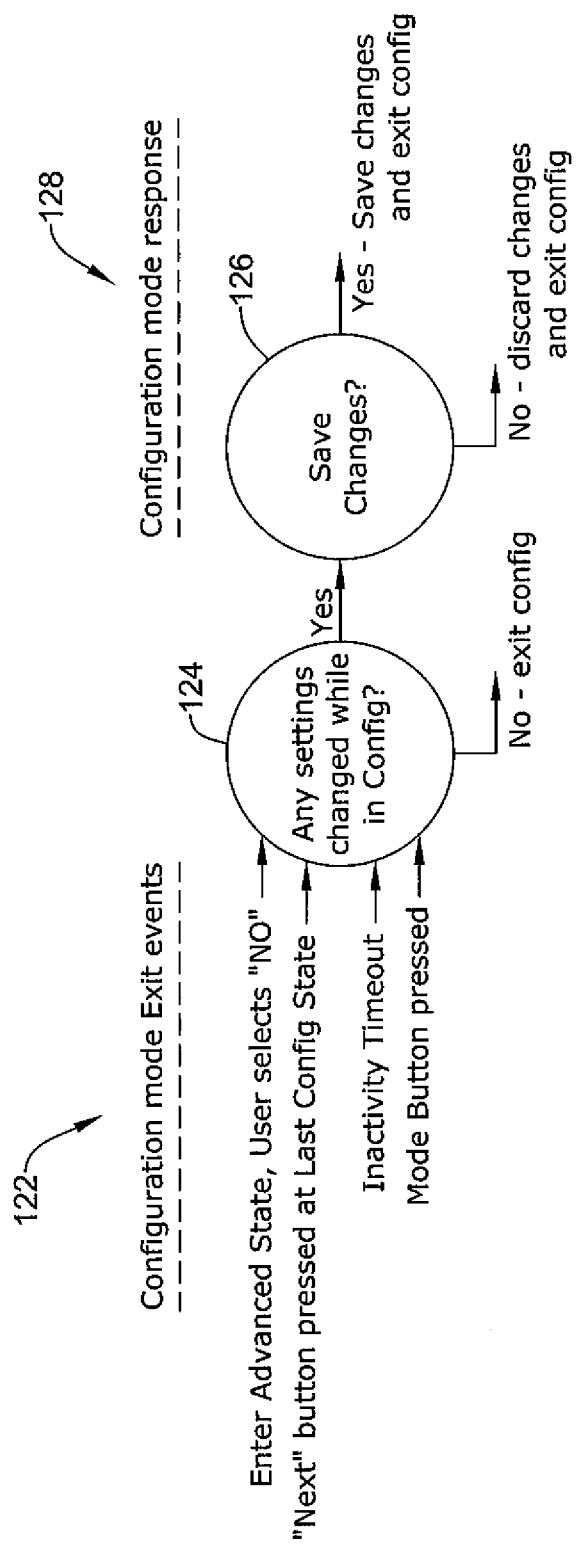
FIG. 53 is a flow diagram showing an illustrative method that may be carried out using the illustrative zone control panel of FIG. 1.

FIG. 53 is a flow diagram that illustrates some navigational aspects of, for example, the configuration mode. At block 122, an event has occurred that may cause zone control panel 10 to exit the configuration mode. Examples of such events include declining entry into an advanced configuration mode, pressing the next button 22 (FIG. 2) at a last configuration mode menu screen, pressing the mode button anytime after entering the configuration mode, and/or an inactivity timeout.

At block 124, a determination is made as to whether any parameters or parameter values have been changed while zone control panel 10 was in the configuration mode. If no changes were made, zone control panel 10 exits the configuration mode.

However, if changes were made to any parameters or parameter values while zone control panel 10 was in the configuration mode, control passes to block 126, where controller 14 (FIG. 1) asks the user if the changes should be saved. A query may, for example, be provided on display 16 (FIG. 1), such as shown in FIG. 21. Control passes to response block 128. At block 128, if the changes are not to be saved, the changes are discarded and zone control panel 10 exits the configuration mode. If the changes are to be saved, the changes are saved and then zone control panel 10 exits the configuration mode. In some cases, the display 16 may show a confirmation message to the user that the changes are being saved, as shown in, for example, FIG. 22.

Figure 54:
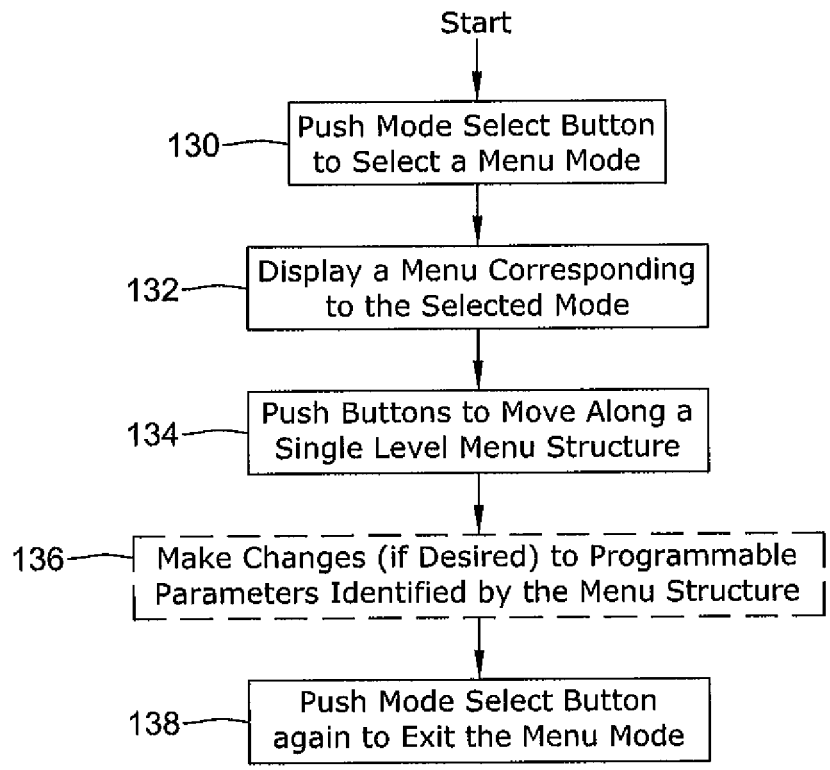
FIG. 54 is a flow diagram showing an illustrative method that may be carried out using the illustrative zone control panel of FIG. 1.

FIG. 54 shows an illustrative method that may be carried out using illustrative zone control panel 10. At block 130, a menu select button may be pushed to select a menu mode. Control passes to block 132, where controller 14 (FIG. 1) displays a menu that corresponds to the menu mode that was selected at block 130. The menu may be displayed on display 16 (FIG. 1), but this is not required. At block 134, push buttons may be pushed to move along a single menu level menu structure. In some cases, at optional block 136, changes may be made to programmable parameters that are identified by the menu structure. Control passes to block 138, where pressing the mode select button causes zone control panel 10 to exit the menu mode.

Figure 55:
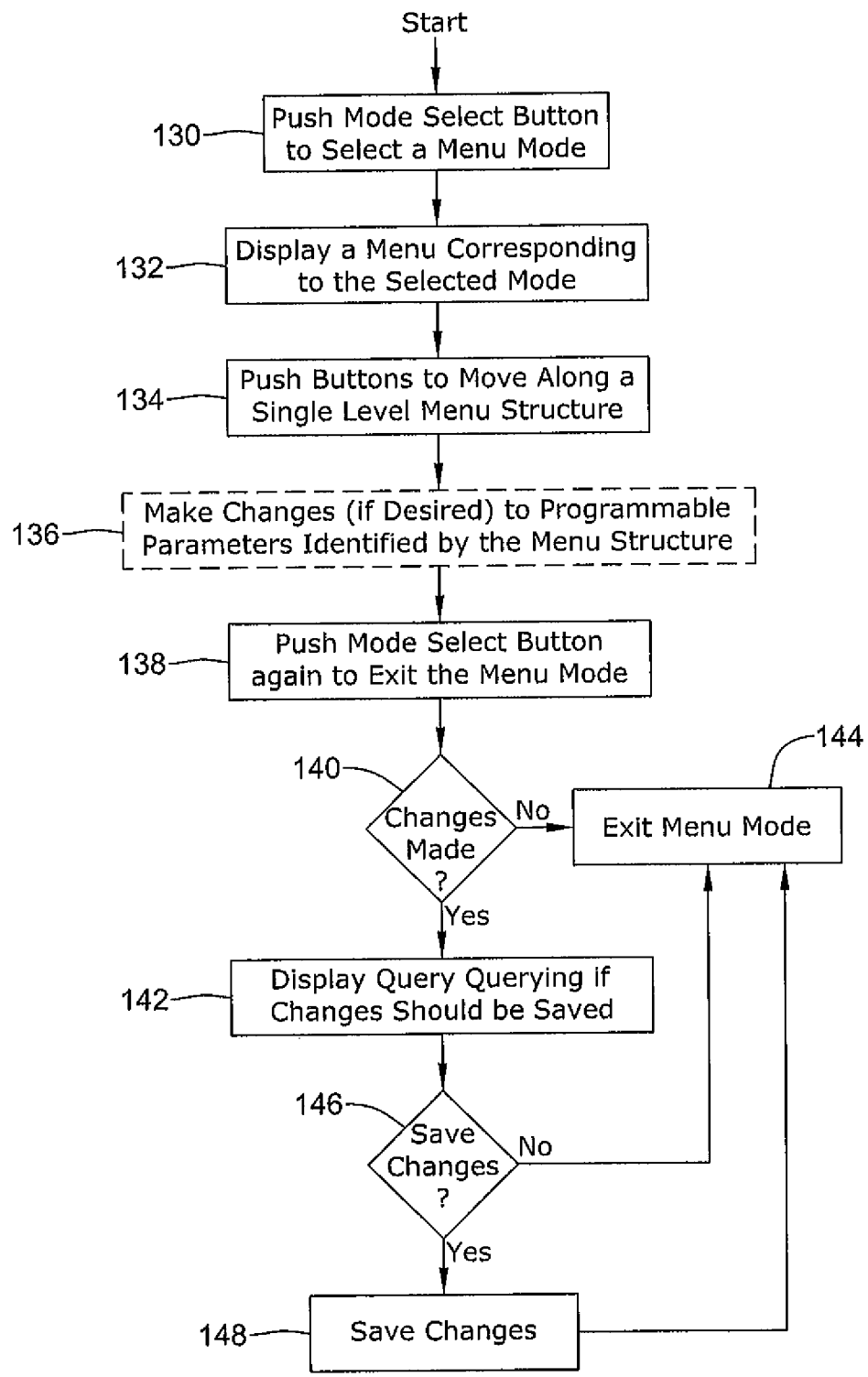
FIG. 55 is a flow diagram showing an illustrative method that may be carried out using the illustrative zone control panel of FIG. 1.

FIG. 55 shows another illustrative method that may be carried out using illustrative zone control panel 10. At block 130, a menu select button may be pushed to select a menu mode. In some embodiments, the menu select button may correspond to the mode button 28 discussed above, and the menu mode may correspond a corresponding mode of the zone control panel 10. Control then passes to block 132, where controller 14 (FIG. 1) displays a menu that corresponds to the menu mode that was selected at block 130. At block 134, push buttons may be pushed to move along a single menu level menu structure. In some cases, at optional block 136, changes may be made to programmable parameters that are identified by the menu structure. Control passes to block 138, where pressing the mode select button causes zone control panel 10 to exit the selected menu mode.

Upon pressing the mode select button at block 138, control passes to decision block 140, where controller 14 (FIG. 1) determines whether any changes were made. If no changes were made, control passes to block 144 and the selected menu mode is exited. However, if changes were made, control passes to block 142, where zone control panel 10 displays a query asking whether or not the changes should be saved. At decision block 146, controller 14 examines the answer. If the changes are not to be saved, control passes to block 144 and the selected menu mode is exited. If the changes are to be saved, control passes to block 148 and the changes are saved. In some cases, the menu mode may be exited after the changes are saved.

Figure 56:
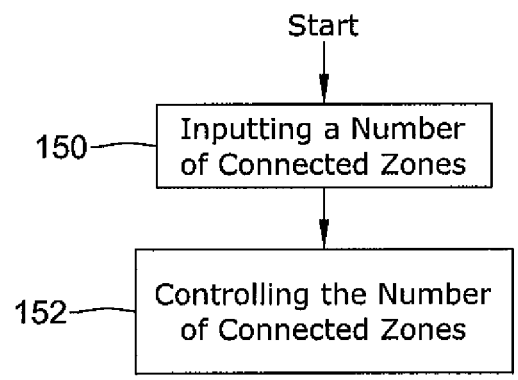
FIG. 56 is a flow diagram showing an illustrative method that may be carried out using the illustrative zone control panel of FIG. 1.

FIG. 56 shows another illustrative method that may be carried out using illustrative zone control panel 10. At block 150, a number of connected zones may be inputted. In some cases, zone control panel 10 may be configured to accommodate a particular maximum number of zones. In some instances, zone control panel 10 may be connected to a number of zones that is less than the maximum number of zones. In some cases, controller 14 (FIG. 1) may display a query on display 16 (FIG. 1), and a user may input an answer using control pad 18 (FIG. 1), as previously discussed. Control then passes to block 152, where zone control panel 10 controls the number of connected zones. In some cases, the zone control panel may have a controller that uses a control algorithm that accepts as an input the number of zones to actually control, as previously discussed. The control algorithm may control the zones differently depending on the number of selected zones.

Figure 57:
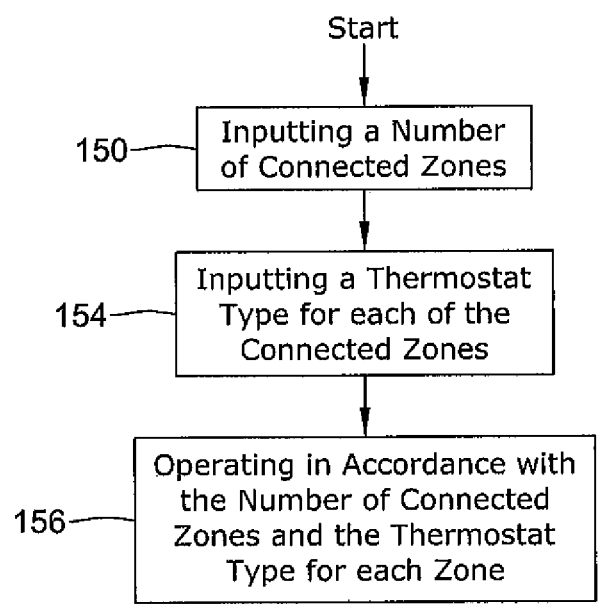
FIG. 57 is a flow diagram showing an illustrative method that may be carried out using the illustrative zone control panel of FIG. 1.

FIG. 57 shows yet another illustrative method that may be carried out using illustrative zone control panel 10. At block 150, a number of connected zones may be inputted, if desired. In some cases, the number of connected zones may be less than the maximum number of zones. Control passes to block 154, where a thermostat type may be inputted for each of the connected zones. In some cases, controller 14 (FIG. 1) may display a query on display 16 (FIG. 1), and a user may input an answer using control pad 18 (FIG. 1), as previously discussed. It will be recognized, for example, that a thermostat controlling a particular zone may be set up as a conventional thermostat, a heat pump thermostat, and/or any other suitable thermostat type.

Control passes to block 156, where zone control panel 10 operates in accordance with the number of connected zones (as inputted at block 150) as well as the types of thermostats (as inputted at block 154). In some cases, different thermostat types will make a heating call or a cooling call, for example, by energizing different pins or pin combinations. The pins energized by a conventional thermostat, for example, may be different from the pins energized by a heat pump thermostat. Informing zone control panel 10 of the number and types of zones and/or the types of thermostats connected to zone control panel 10, controller 14 (FIG. 1) may be better suited to operating the HVAC system to which it may be connected.

Figure 58:
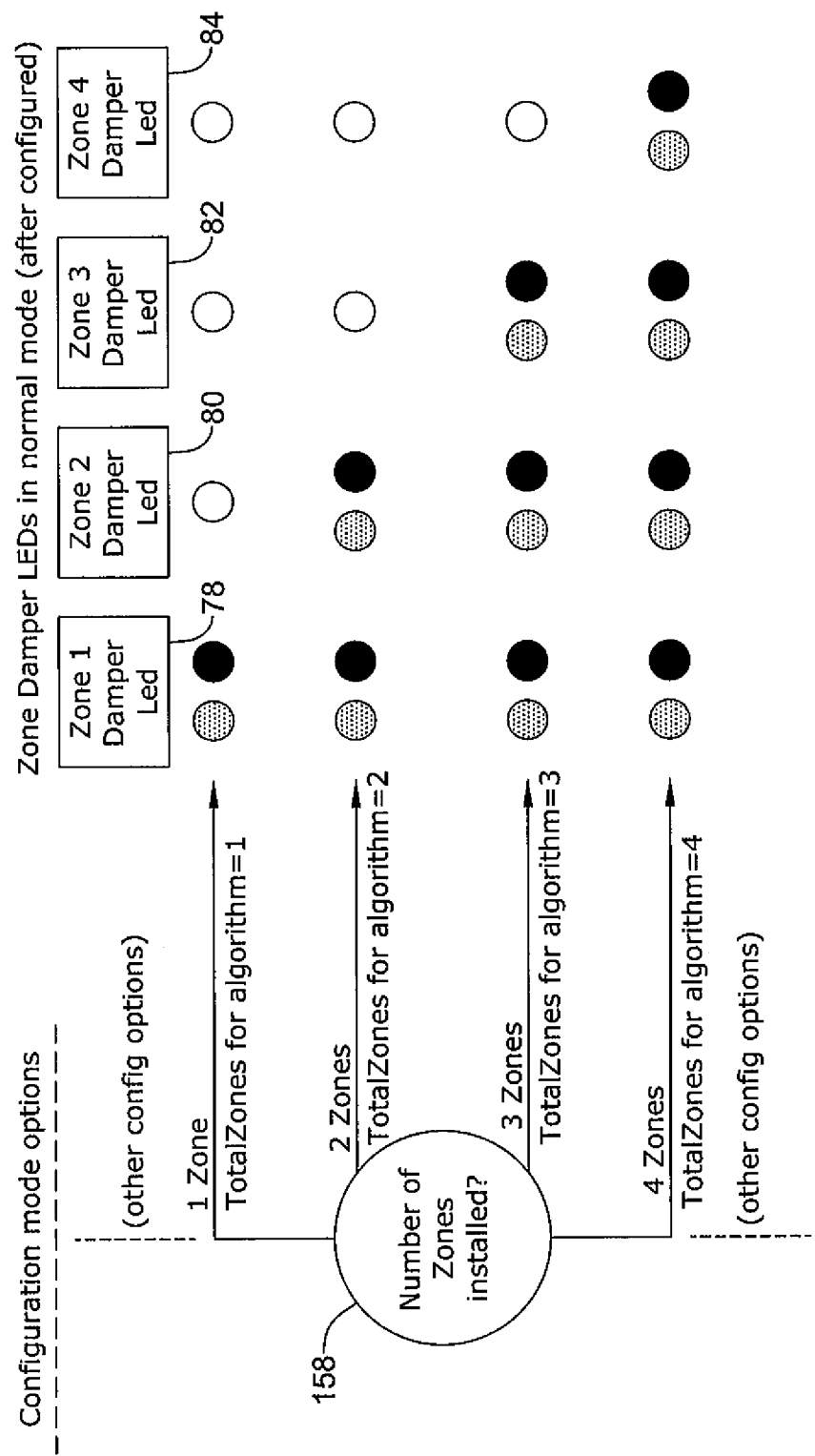
FIG. 58 shows aspects of a method that may be carried out using the illustrative zone control panel of FIG. 1.

FIG. 58 shows some aspects of the methods shown in FIGS. 56 and 57. At block 158, a determination is made regarding the number of installed and/or connected zones. In some cases, the number of installed and/or connected zones may be utilized in various control algorithms used by zone control panel 10. For example, and as shown, if only one zone is installed, zone control panel 10 may use that number in operational control algorithms. Similarly, if there are two, three or four zones installed and/or connected, that number will be used in the operational control algorithms. The operational control algorithms may control the zones differently depending on the number of selected zones.

The number of installed and/or connected zones may be visually confirmed. As seen in FIG. 58, if for example only zone one is connected, zone 1 light 78 may be a first color (e.g. green) to signify that the damper is open and a second color (e.g. red) to signify that the damper is closed. Zone 2 light 80, zone 3 light 82 and zone 4 light 84 may remain off, or not illuminated.

Similarly, zone 1 light 78 and zone 2 light 80 may be illuminated if two zones are connected while zone 3 light 82 and zone 4 light 84 remain off. If three zones are present, zone 1 light 78, zone 2 light 80 and zone 3 light 82 may be illuminated while zone 4 light 84 may remain off. If four zones are installed and/or connected, of course all four zone lights 78, 80, 82 and 84 may be illuminated.

Figure 59:
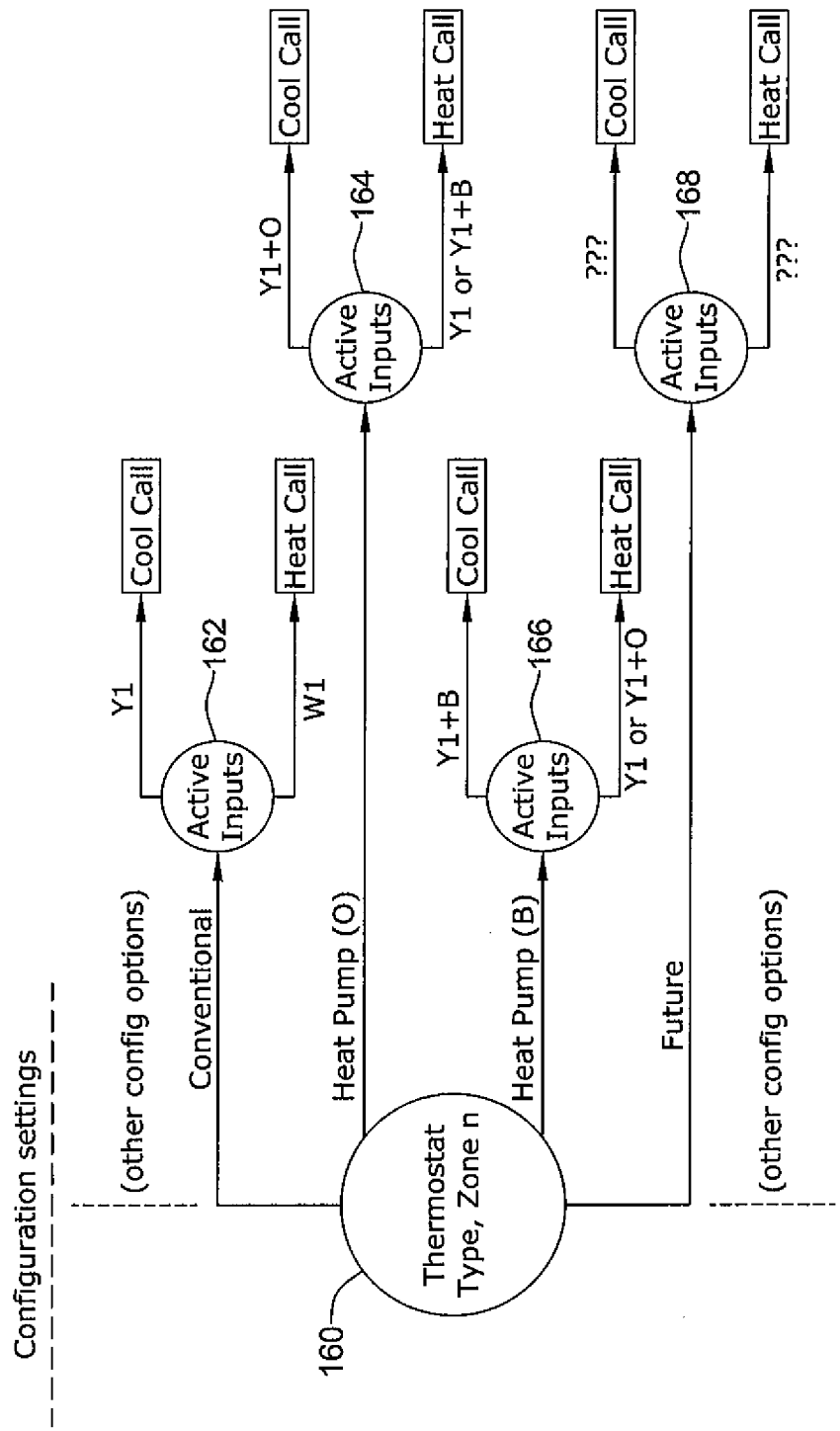
FIG. 59 shows aspects of a method that may be carried out using the illustrative zone control panel of FIG. 1.

FIG. 59 shows some aspects of the methods shown in FIGS. 56 and 57. At block 160, a thermostat type has been specified for a particular zone. Depending on what type of thermostat has been specified, it will be recognized that zone control panel 10 may receive different inputs for a particular desired effect. For example, if the specified thermostat type is a conventional thermostat, its active inputs (block 162) may include energizing the Y1 pin for a cooling call and the W1 pin for a heating call. If there are two cooling stages and/or two heating stages, block 162 may include energizing the Y1 and the Y2 pins for second stage cooling and/or energizing the W1 and the W2 pins for second stage heating, for example.

If the specified thermostat is a type O heat pump, its active inputs (block 164) may include energizing the Y1 and the O pins for a cooling call and the Y1 pin or the Y1 and the B pins for a heating call. For a type B heat pump thermostat, its active inputs (block 166) may include energizing the Y1 and the B pins for a cooling call and energizing the Y1 or the Y1 and the O pins for a heating call. In some instances, as shown at block 168, zone control panel 10 may be configured to accommodate other or future thermostat types, if desired.

Figure 60:
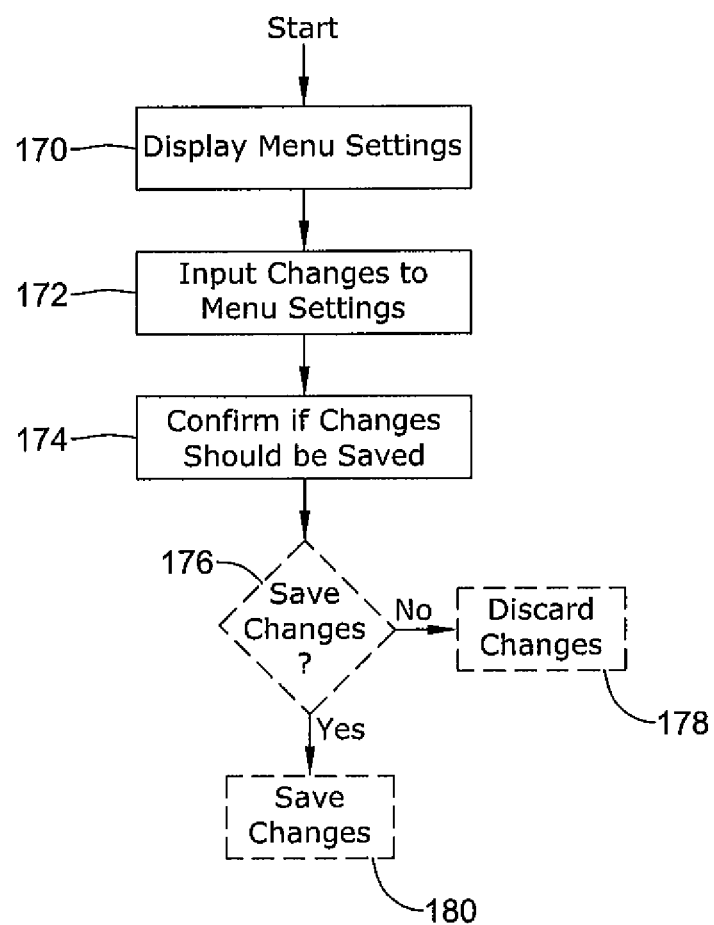
FIG. 60 is a flow diagram showing an illustrative method that may be carried out using the illustrative zone control panel of FIG. 1.
Figure 61A:
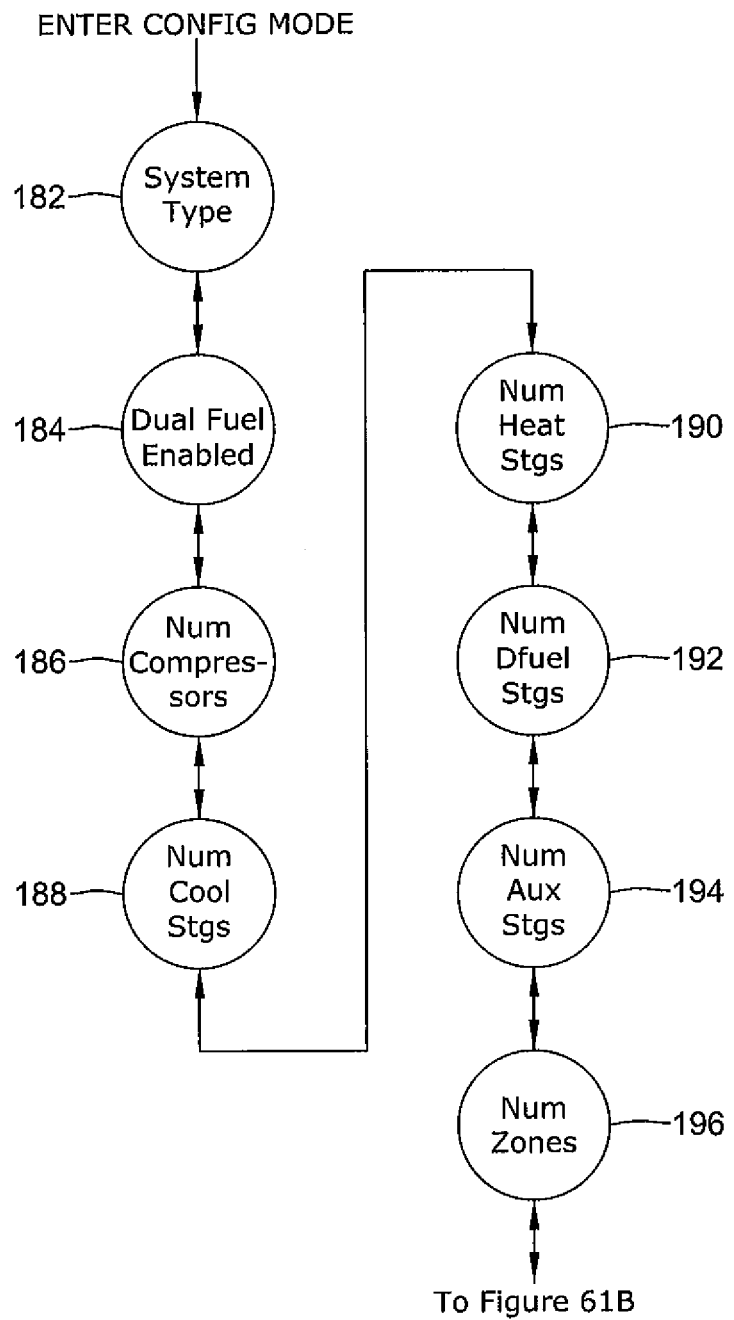
FIGS. 61A-61D provide a flow diagram showing an illustrative zone control panel configuration mode that may be carried out using the illustrative zone control panel of FIG. 1.
Figure 61B:
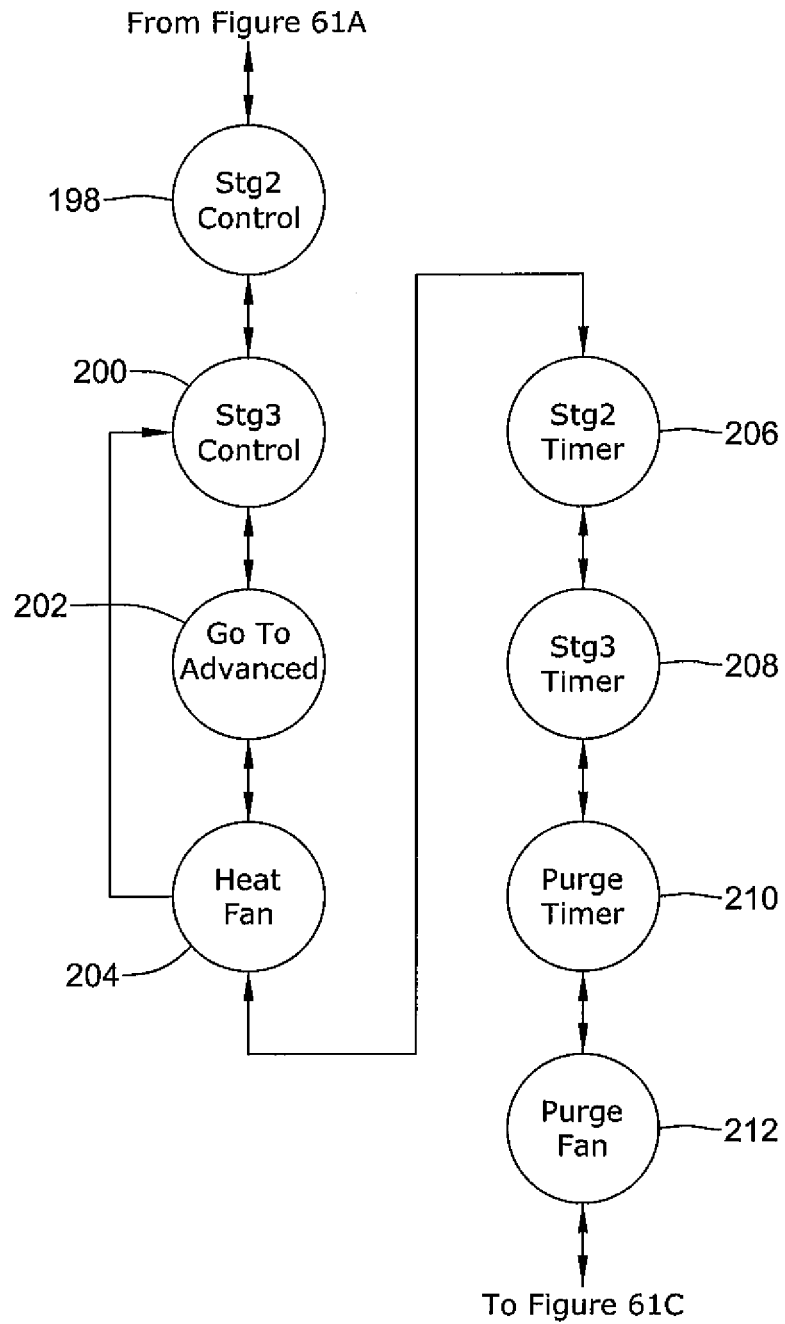
Figure 61C:
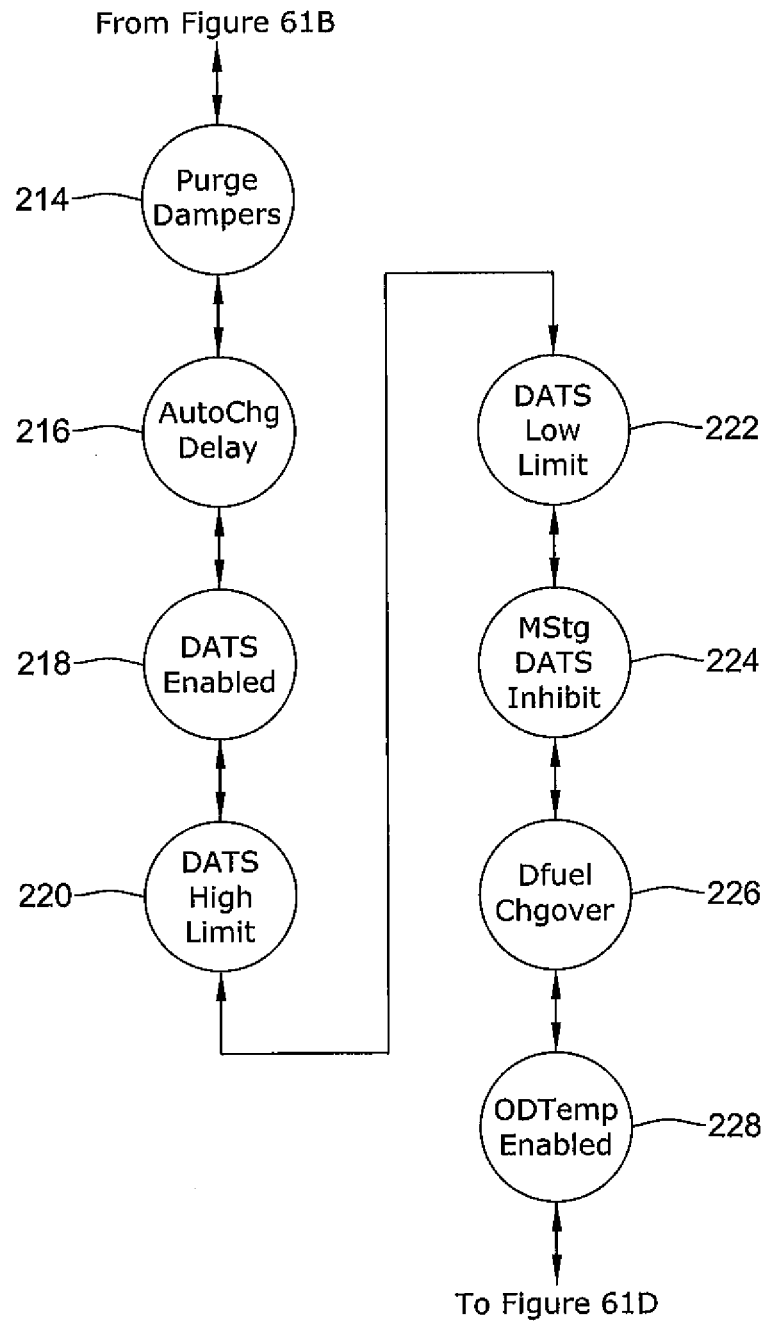
Figure 61D:
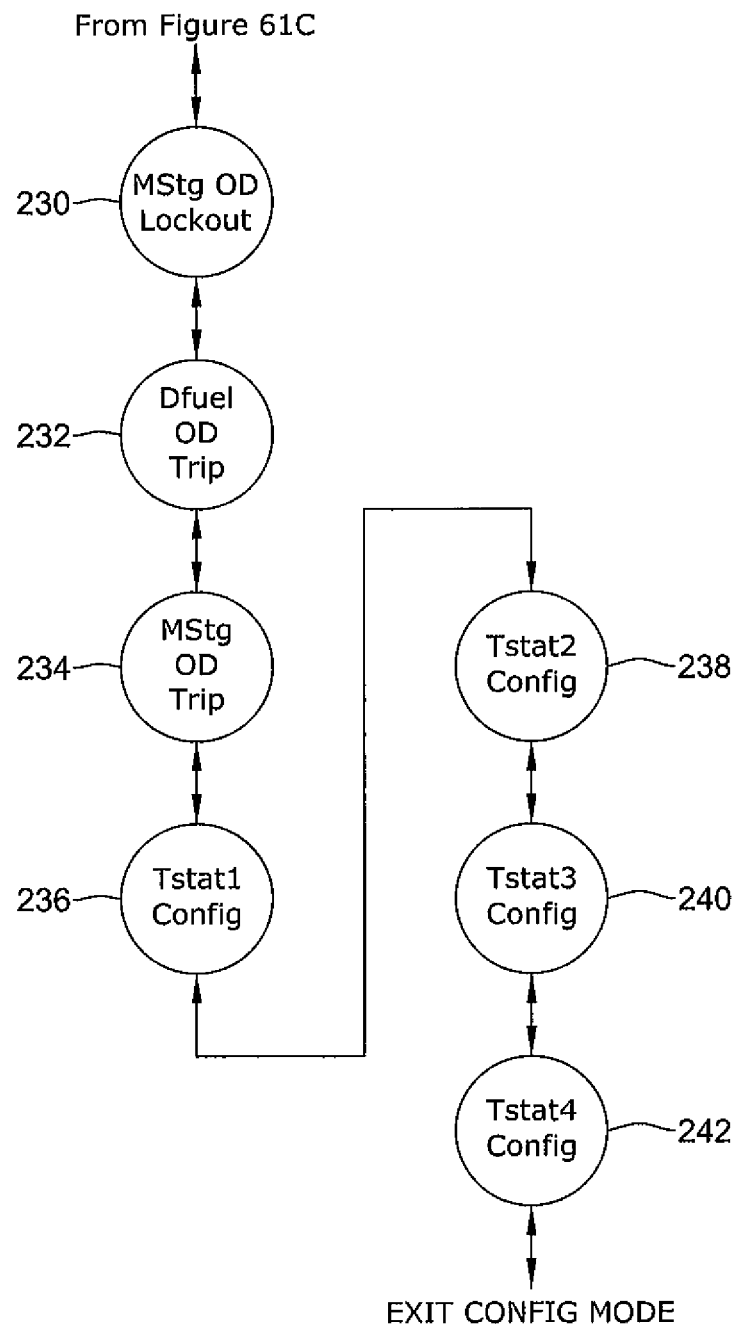

FIG. 60 shows an illustrative method that may be carried out using illustrative zone control panel 10. At block 170, menu settings may be displayed. This may include displaying a menu screen or a sequence of menu screens on a display such as display 16 (FIG. 1). At block 172, changes may be inputted to the menu settings. In some instances, this may include a user inputting changes using user interface 12, as discussed with respect to previous Figures. Control passes to block 174, where controller 14 (FIG. 1) asks if changes should be saved.

In some instances, although not required, control may pass to optional decision block 176, where zone control panel 10 may determine the answer to the question asked at block 174. If the answer is no, control may pass to optional block 178 where the changes are discarded. Otherwise, control may pass to optional block 180, where the changes are saved.

FIGS. 61A-61D show an illustrative sequence of menu screens that may be scrolled through while zone control panel 10 is in a configuration mode. It will be recognized that while the menu screens are in a particular sequence, not all menu screens may be accessed and displayed, depending at least in part on how previous settings were or were not changed. For example, if a particular menu screen requests information regarding HVAC system type, and a user answers conventional, any menu screens pertaining to heat pump settings may be skipped. It should also be recognized that these are only illustrative menu screens, and that other menu screens may be employed, and in a different order, if desired.

Further, it should be recognized that the menu screens may be scrolled through either forwards or backwards using the back button 20 (FIG. 2) and/or the next button 22 (FIG. 2), as desired. For example, if a user inadvertently specified that the system is a heat pump type (when it should be conventional), subsequent menu screens pertaining to heat pump configuration may prompt the user to scroll backwards and correct their answer to the system type question.

In any event, and in the illustrative flow diagram, menu screen 182 pertains to system type, i.e., conventional, heat pump, or perhaps other system types as well. In some cases, menu screen 184 and menu screen 186 deal with fuel types and number of compressors, respectively, and may be skipped if the system type is conventional. Menu screen 188 and menu screen 190 pertain to the number of cooling stages and the number of heating stages, respectively. Menu screen 192 pertains to the number of duel fuel stages and menu screen 194 deals with the number of auxiliary stages, respectively. It will be recognized that menu screen 192, for example, may be skipped if a user answers no to the duel fuel enabled question posed in menu screen 184. Menu screen 196 pertains to specifying a number of zones that are to be controlled by the zone control panel 10.

Menu screen 198 and menu screen 200 pertain to stage 2 control and stage 3 control, respectively. Menu screen 202 permits a user to enter to skip an advanced settings portion of the menu, if desired. A number of the following menu screens may be skipped if a user does not enter the advanced settings portion. Menu screens 204, 206, 208, 210 and 212 pertain to heat fan, stage 2 timer, stage 3 timer, purge timer and purge fan settings, respectively. Menu screens 214, 216, 218, 220, 222, 224, 226 and 228 pertain to purge damper, auto change delay, DATS enablement, DATS high limit, DATS low limit, MStg DATS Inhibit, Duel fuel changeover and ODTemp enablement, respectively. Menu screens 230, 232 and 234 pertain to MStg OD lockout, Duel fuel OD Trip, and MStg OD trip, respectively.

Menu screen 236 permits a user to enter and/or display information pertaining to the thermostat type connected to zone one. Similarly, menu screens 238, 240 and 242 permit a user to enter and/or display information pertaining to the thermostat types connected to zones two, three, and four, respectively. In some instances, menu screen 242 may be the final menu screen in sequence within the configuration mode.

Figure 62A:
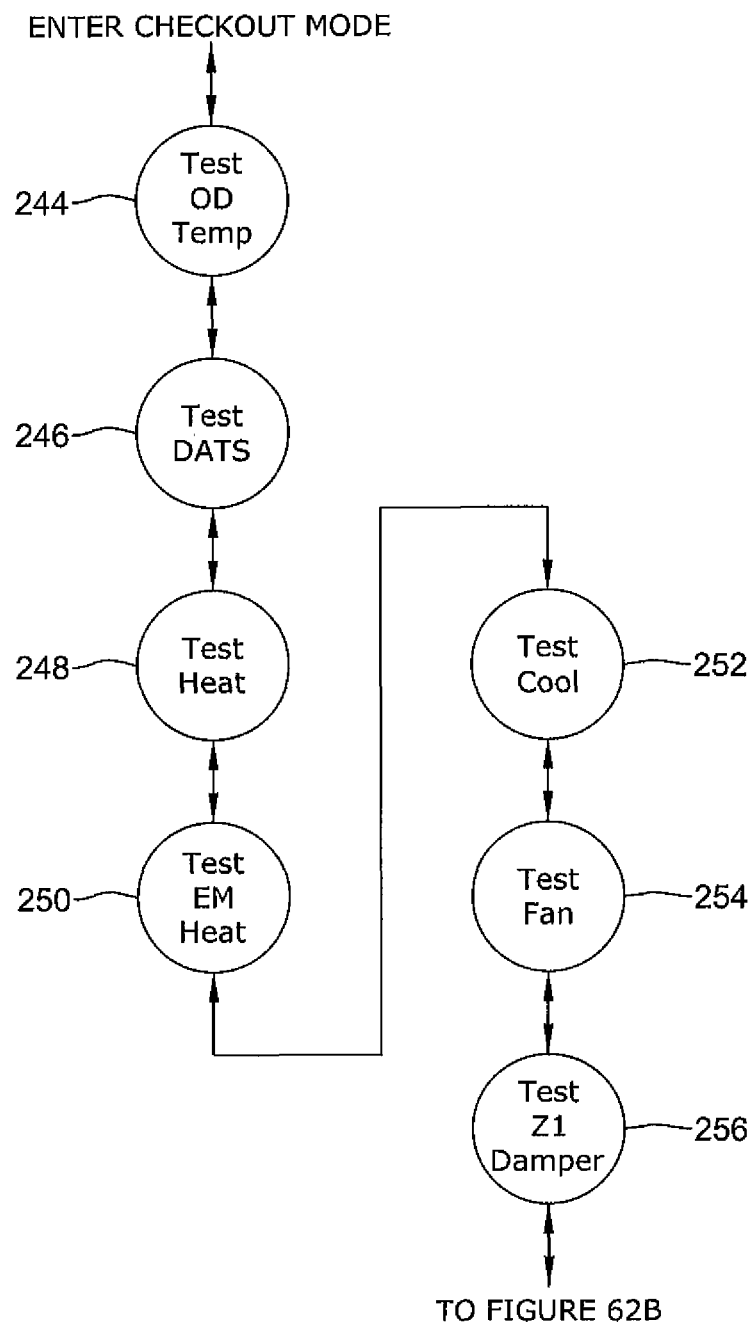
FIGS. 62A-62B provide a flow diagram showing an illustrative zone control panel checkout mode that may be carried out using the illustrative zone control panel of FIG. 1.
Figure 62B:
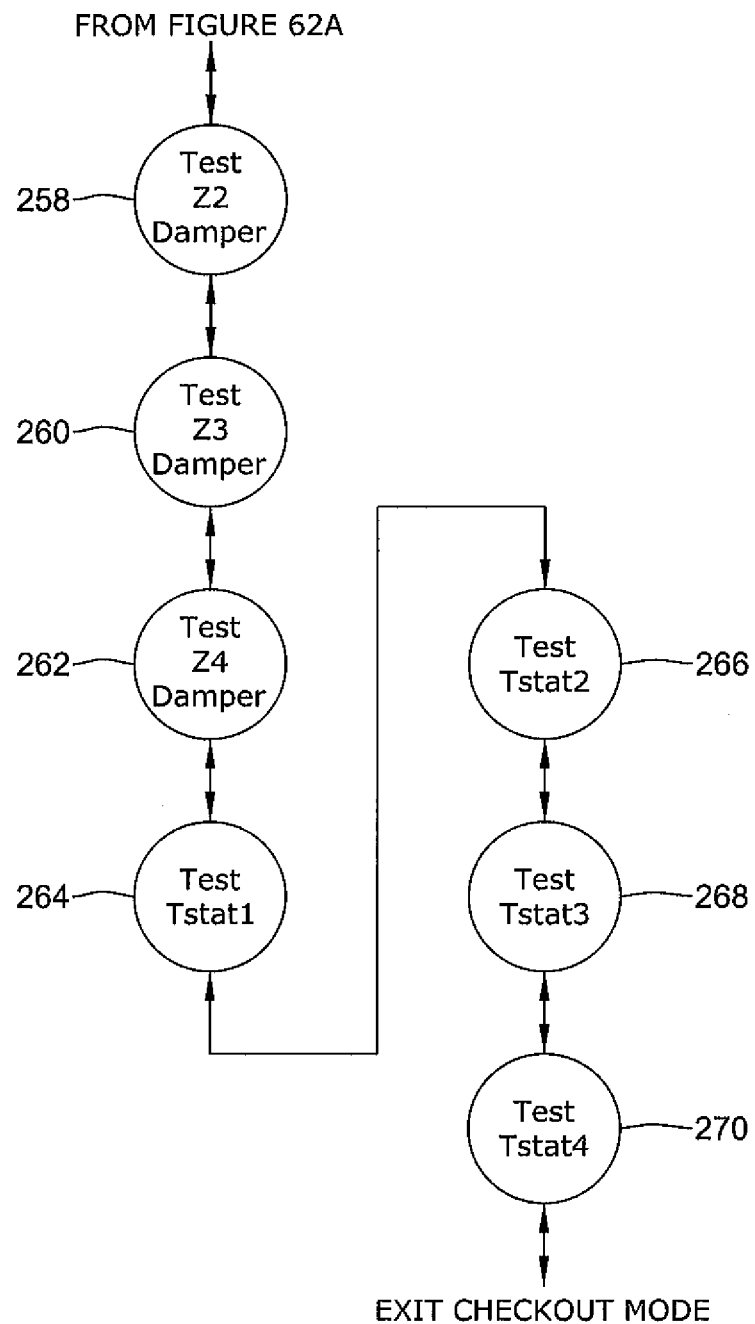

FIGS. 62A-62B show an illustrative sequence of menu screens that may be scrolled through while zone control panel 10 is in a checkout mode. It will be recognized that while the menu screens are in a particular sequence, not all menu screens may be accessed and displayed, depending at least in part on how previous settings were or were not changed in the configuration mode. Further, it should be recognized that the menu screens may be scrolled through either forwards or backwards using the back button 20 (FIG. 2) and/or the next button 22 (FIG. 2), as desired. It should also be recognized that these are only illustrative menu screens, and that other menu screens may be employed, and in a different order, if desired.

Menu screen 244 pertains to testing an outdoor temperature sensor, if one is present, while menu screen 246 pertains to testing the discharge air temperature sensor. The heating equipment may be tested at menu screen 248. It will be recognized that if only a single heating stage was specified in the configuration mode, only a single heating stage may be tested in menu screen 248. If additional heating stages were specified, they may be tested here as well. Emergency heat, if present, may be tested in menu screen 250. If no emergency heat capability is present, menu screen 250 may be skipped. Similarly, any and all installed and specified cooling stages may be tested in menu screen 252 while the fan may be tested in menu screen 254.

The zone one, zone two, zone three and zone four dampers may be tested in menu screens 256, 258, 260 and 262, respectively, assuming that all four zones are present and have been configured accordingly. The thermostats in zone one, zone two, zone three and zone four, if present and configured accordingly, may be tested in menu screens 264, 266, 268 and 270, respectively.

The invention should not be considered limited to the particular examples described above, but rather should be understood to cover all aspects of the invention as set out in the attached claims. Various modifications, equivalent processes, as well as numerous structures to which the invention can be applicable will be readily apparent to those of skill in the art upon review of the instant specification.

What is claimed is:

1. A zone control panel for controlling two or more pieces of heating, ventilation, and air conditioning (HVAC) equipment, the zone control panel comprising:
   a controller having two or more modes including an operating mode and a checkout mode, wherein in the checkout node, the controller is configured to allow a user to traverse through two or more corresponding menu screens;

a display for displaying the two or more menu screens when the controller is in the checkout mode;
a bank of HVAC status indicators remote from the display that indicate operational status of at least one of the two or more pieces of HVAC equipment;
a bank of zone indicators remote from the display that indicate operational status of each of two or more zones;
a first one of the menu screens identifies a first piece of HVAC equipment, along with two or more corresponding test options that can be selected by a user via the first menu screen;
a second one of the menu screens identifies a second piece of HVAC equipment, along with two or more corresponding test options that can be selected by the user via the second menu screen;
wherein, when the first menu screen is displayed, the controller is configured to operate the first piece of equipment in accordance with the corresponding test option selected via the first menu screen; and
when the second menu screen is displayed, the controller is configured to operate the second piece of equipment in accordance with the corresponding test option selected via the second menu screen.

2. The zone control panel of claim 1, wherein when the first menu screen is displayed, the controller is configured to not operate the second piece of HVAC equipment, and when the second menu screen is displayed, the controller is configured to not operate the first piece of HVAC equipment.

3. The zone control panel of claim 1, wherein the first piece of HVAC equipment includes a heating component, and the second piece of HVAC equipment includes a cooling component.

4. The zone control panel of claim 1, wherein the first piece of HVAC equipment is a first zone damper, and the second piece of HVAC equipment is a second zone damper.

5. A zone control panel for controlling a multi-zone heating, ventilation, and/or air conditioning (HVAC) system having HVAC equipment, the zone control panel comprising:
a controller having two or more modes including an operating mode and a checkout mode, wherein in the checkout node, the controller is configured to sequentially traverse through two or more corresponding menu screens between a first menu screen and a last menu screen;
a display for sequentially displaying the two or more menu screens when the controller is in the checkout mode;
a bank of HVAC status indicators remote from the display that indicate operational status of the two or more pieces of HVAC equipment;
a bank of zone indicators remote from the display that indicate operational status of each of two or more zones;
a first one of the menu screens identifies a first piece of HVAC equipment, along with two or more corresponding test options that can be selected by a user;
a second one of the menu screens identifies a second piece of HVAC equipment, along with two or more corresponding test options that can be selected by the user; and
wherein, in the checkout mode, the controller is configured to operate the first piece of equipment in accordance with the corresponding test option selected by the user via the first menu screen.

6. The zone control panel of claim 5, wherein the controller operates the first piece of equipment in accordance with the corresponding test option selected by the user via the first menu screen when the first menu screen is displayed on the display, and operates the second piece of equipment in accordance with the corresponding test option selected by the user via the second menu screen when the second menu screen is displayed on the display.

7. The zone control panel of claim 6, wherein the controller does not operate the second piece of equipment in accordance with the corresponding test option selected by the user via the second menu screen when the first menu screen is displayed on the display, and the controller does not operate the first piece of equipment in accordance with the corresponding test option selected by the user via the first menu screen when the second menu screen is displayed on the display.

8. The zone control panel of claim 5, wherein the first piece of equipment includes a heating component and wherein the two or more corresponding test options for the heating component include activating the heating component and deactivating the heating component.

9. The zone control panel of claim 5, wherein the first piece of equipment includes a heating component and wherein the two or more corresponding test options for the heating component include activating a first stage of the heating component and activating a second stage of the heating component.

10. The zone control panel of claim 8, wherein the second piece of equipment includes a cooling component and wherein the two or more corresponding test options for the cooling component include activating the cooling component and deactivating the cooling component.

11. The zone control panel of claim 8, wherein the second piece of equipment includes a cooling component and wherein the two or more corresponding test options for the cooling component include activating a first stage of the cooling component and activating a second stage of the cooling component.

12. The zone control panel of claim 5, wherein:
the first piece of equipment includes a first zone damper, wherein the two or more corresponding test options for the first zone damper include opening the first zone damper and closing the first zone damper; and
the second piece of equipment includes a second zone damper, wherein the two or more corresponding test options for the second zone damper include opening the second zone damper and closing the second zone damper.

* * * * *